United States Patent
Louch

(10) Patent No.: US 11,112,959 B2
(45) Date of Patent: Sep. 7, 2021

(54) LINKING MULTIPLE WINDOWS IN A USER INTERFACE DISPLAY

(71) Applicant: Apple Inc., Cupertino, CA (US)

(72) Inventor: John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/694,936

(22) Filed: Nov. 25, 2019

(65) Prior Publication Data

US 2020/0097164 A1 Mar. 26, 2020

Related U.S. Application Data

(63) Continuation of application No. 14/854,243, filed on Sep. 15, 2015, now Pat. No. 10,558,344.

(60) Provisional application No. 62/169,476, filed on Jun. 1, 2015.

(51) Int. Cl.
| | |
|---|---|
| *G06F 3/0484* | (2013.01) |
| *G06F 3/0488* | (2013.01) |
| *G06F 3/0481* | (2013.01) |
| *G06F 3/0486* | (2013.01) |
| *G06F 3/14* | (2006.01) |

(52) U.S. Cl.
CPC ........ *G06F 3/04847* (2013.01); *G06F 3/0481* (2013.01); *G06F 3/0486* (2013.01); *G06F 3/0488* (2013.01); *G06F 3/14* (2013.01); *G06F 2203/04803* (2013.01); *G06F 2203/04806* (2013.01)

(58) Field of Classification Search
CPC .. G06F 3/04847; G06F 3/0481; G06F 3/0486; G06F 3/0488; G06F 3/14; G06F 2203/04803; G06F 2203/04806
See application file for complete search history.

(56) References Cited

U.S. PATENT DOCUMENTS

| | | | | |
|---|---|---|---|---|
| 2007/0250788 | A1* | 10/2007 | Rigolet | ................. G06F 3/0483 715/788 |
| 2011/0173566 | A1* | 7/2011 | Ubillos | ............... G06F 3/04845 715/800 |
| 2014/0337794 | A1* | 11/2014 | Vranjes | ................. G06F 3/0481 715/800 |

(Continued)

*Primary Examiner* — Andrew T Chiusano
(74) *Attorney, Agent, or Firm* — Fernando & Partners, LLP

(57) ABSTRACT

A first window generated by a first application is displayed concurrently with a second window generated by a second application. A first window-movement request associated with the second window is received. In response, the second window is displayed adjacent to and touching the first window and a spatial relationship is established between the first window and the second window. While the first window is linked to the second window, a second window-movement request associated with the first window is received. The first window and second window are moved in accordance with the second window-movement request such that the spatial relationship is maintained. A third window-movement request is received. In accordance with a determination that the third window-movement request is associated with the second window, the first window and second window are unlinked and the second window is moved away from the first window such that the spatial relationship changes.

20 Claims, 51 Drawing Sheets

(56) References Cited

U.S. PATENT DOCUMENTS

2016/0034156 A1\* 2/2016 Vranjes ............... G06F 3/04842
  715/800
2016/0202852 A1\* 7/2016 Park .................... G06F 3/04886
  715/781

\* cited by examiner

LINKING MULTIPLE WINDOWS IN A USER INTERFACE DISPLAY

CROSS-REFERENCE TO RELATED APPLICATIONS

This application claims priority to U.S. patent application Ser. No. 14/854,243 filed on Sep. 15, 2015, which itself claims priority to U.S. Provisional Patent App. No. 62/169,476 filed on Jun. 1, 2015, both of which are incorporated herein by reference in their entirety.

TECHNICAL FIELD

This relates generally to user interfaces, and in particular to user interfaces for managing multiple windows.

BACKGROUND

Electronic devices often display multiple windows concurrently, which may be generated by multiple different applications executing on the electronic devices. Typically the user may move or resize the windows to facilitate the user's interactions with content displayed in the windows. However, windows displayed by electronic devices are typically operated independently from one another. For example, an electronic device typically moves or resizes a single window in response to a corresponding user input. Thus, a user interacting with multiple windows concurrently may provide several inputs to move or resize windows as desired.

SUMMARY

Accordingly, an improved user interface for displaying and managing multiple windows is needed. Devices, methods, and graphical user interfaces for advanced window management enables users of electronic devices to use a windowed user interface more effectively and efficiently, reducing cognitive burden on the users and improving a speed of user interactions with the windows (thereby decreasing energy used by the electronic devices).

In accordance with some embodiments, a method is performed by an electronic device for linking multiple windows. The electronic device includes a display and an input device. The method comprises displaying on the display, a first window generated by a first application concurrently with a second window generated by a second application. The method also includes receiving, with the input device, a first window-movement request associated with the second window. Responsive to receiving the first window-movement request, the method includes displaying on the display, the second window adjacent to and touching the first window. In accordance with a determination that a window linking criterion has been met, the method comprises linking the first window and the second window, wherein the linking includes establishing a spatial relationship between the first window and the second window. The window linking criterion is, for example, a threshold speed or distance of movement of the second window. While the first window is linked to the second window, the method includes receiving, with the input device, a second window-movement request associated with the first window. Responsive to receiving the second window-movement request, the method includes moving the first window and the second window in accordance with the second window-movement request such that the spatial relationship is maintained. The method further includes, after moving the first window and the second window while maintaining the spatial relationship, receiving, with the input device, a third window-movement request. Responsive to the third window-movement request, the method includes, in accordance with a determination that the third window-movement request is associated with the first window, moving the first window and the second window in accordance with the third window-movement request such that the spatial relationship is maintained. In accordance with a determination that the third window-movement request is associated with the second window, the method includes unlinking the first window and the second window and moving the second window away from the first window such that the spatial relationship changes.

In accordance with some embodiments, a method is performed by an electronic device for aligning multiple windows. The method includes displaying a first window generated by a first application concurrently with a second window generated by a second application. The method also includes receiving a window-movement request that is associated with the second window. Responsive to receiving the window-movement request, the method includes displaying the second window proximate to the first window and establishing a spatial relationship between the first window and the second window. While the spatial relationship is established, the method includes receiving a window-enlargement request. Responsive to receiving the window-enlargement request, in accordance with a determination that the window-enlargement request is associated with the first window, the method includes enlarging the first window such that the spatial relationship is maintained and a size of the second window is maintained.

In accordance with some embodiments, a method is performed by an electronic device for displaying multiple windows in a specified region of a display. The method includes displaying a first window, generated by a first application, at a first size such that the first window occupies a region of a display. While displaying the first window at the first size, the method includes displaying a second window, generated by a second application, concurrently with the first window and receiving a window-movement request associated with the second window. Responsive to receiving the window-movement request, in accordance with a determination that the window-movement request meets a window-resizing criterion, the method includes resizing the first window and displaying the second window in the region of the display.

The features and advantages described in this summary and the following detailed description are not all-inclusive. Many additional features and advantages will be apparent to one of ordinary skill in the art in view of the drawings, specification, and claims.

DETAILED DESCRIPTION

Figure 1A:
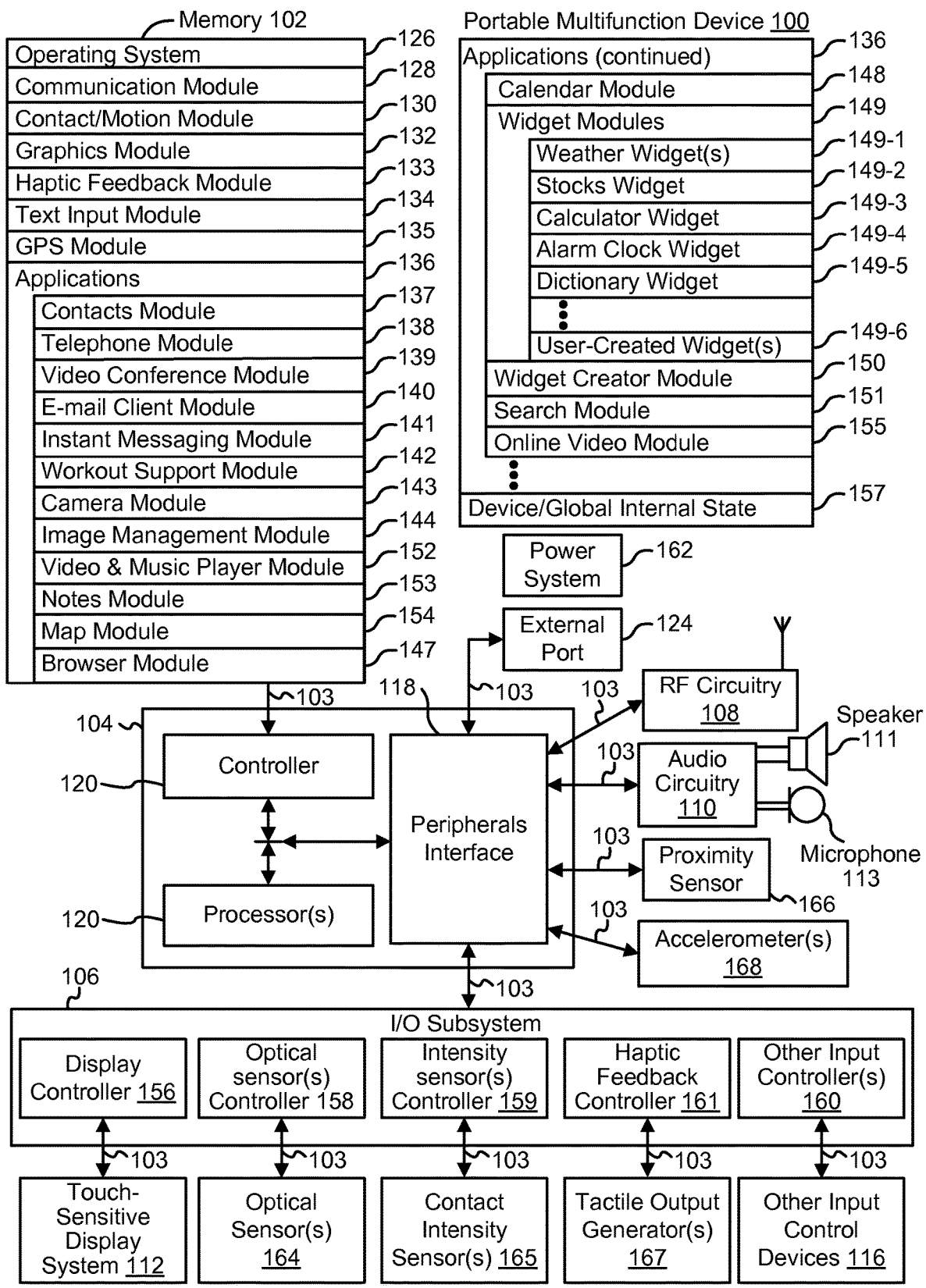
FIG. 1A is a block diagram illustrating a portable multifunction device with a touch-sensitive display in accordance with some embodiments.

An electronic device displays a user interface for a user to view and manage multiple windows associated with multiple applications executing on the electronic device. The devices, methods, and graphical user interfaces described herein provide advanced window management enabling users to use a windowed user interface more effectively and efficiently.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in some embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. IA and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MIMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some embodiments, the menu button is a physical push button or other physical input control device instead of a touchpad.

Figure 1B:
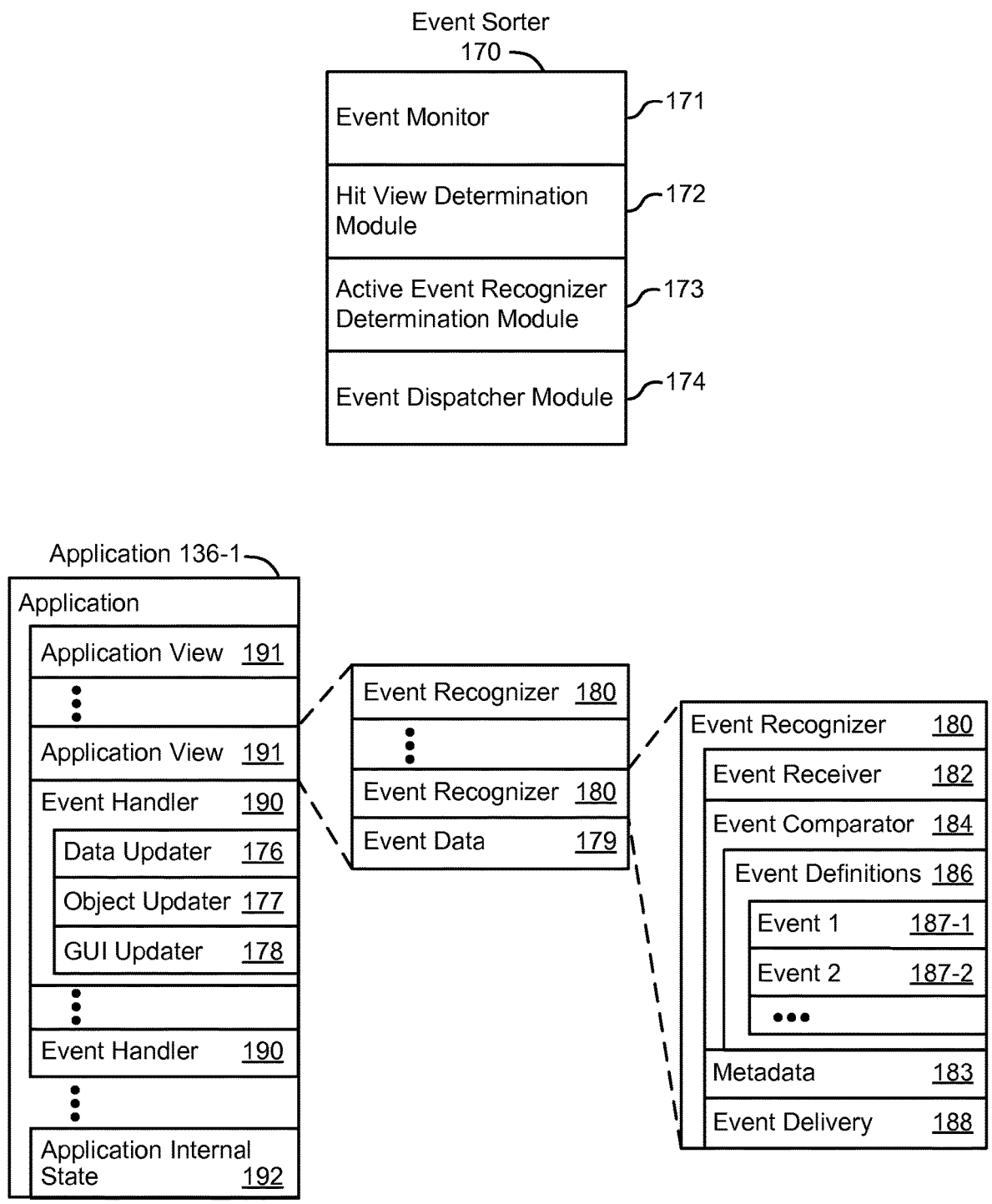
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In some embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
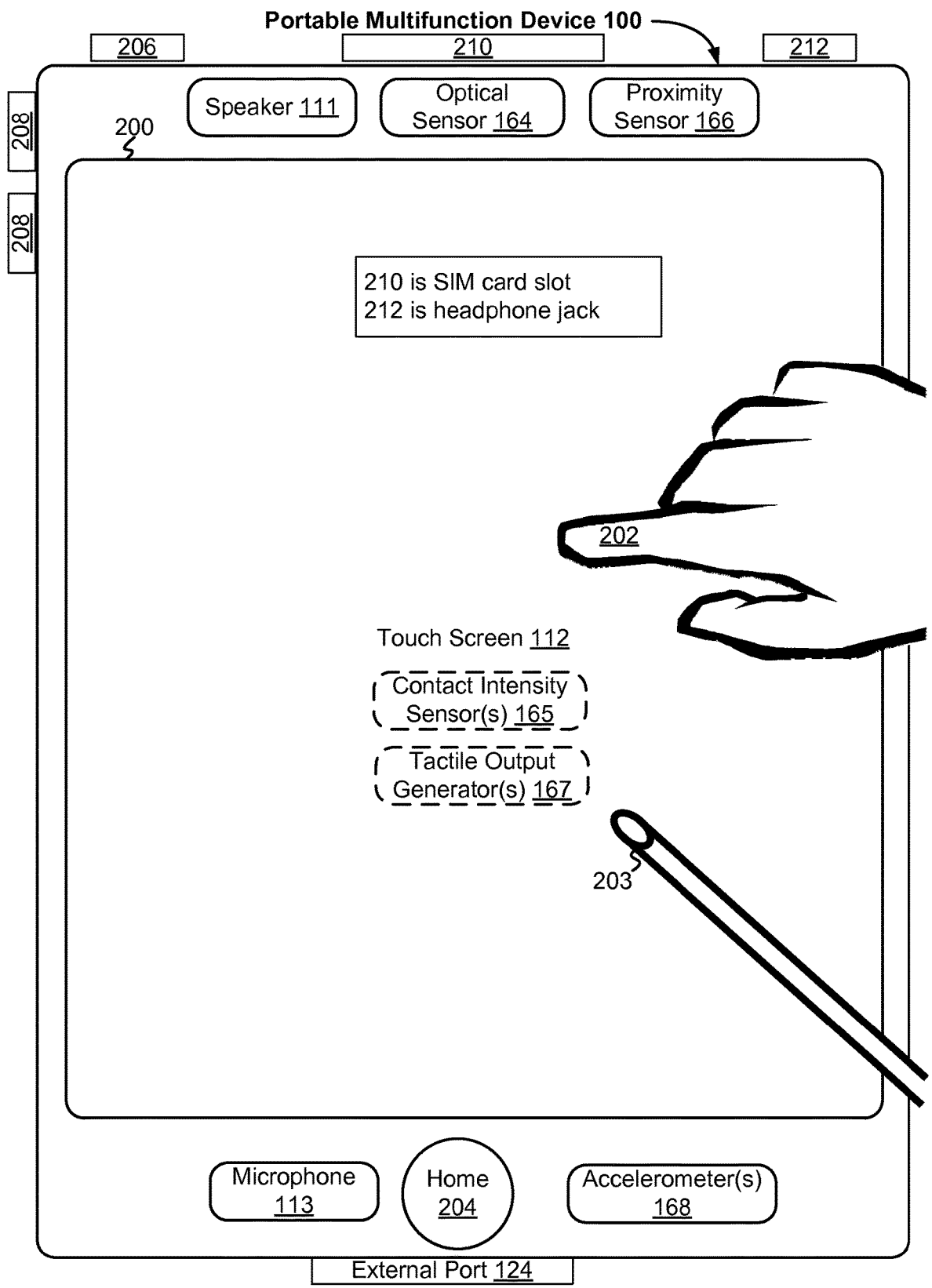
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 3:
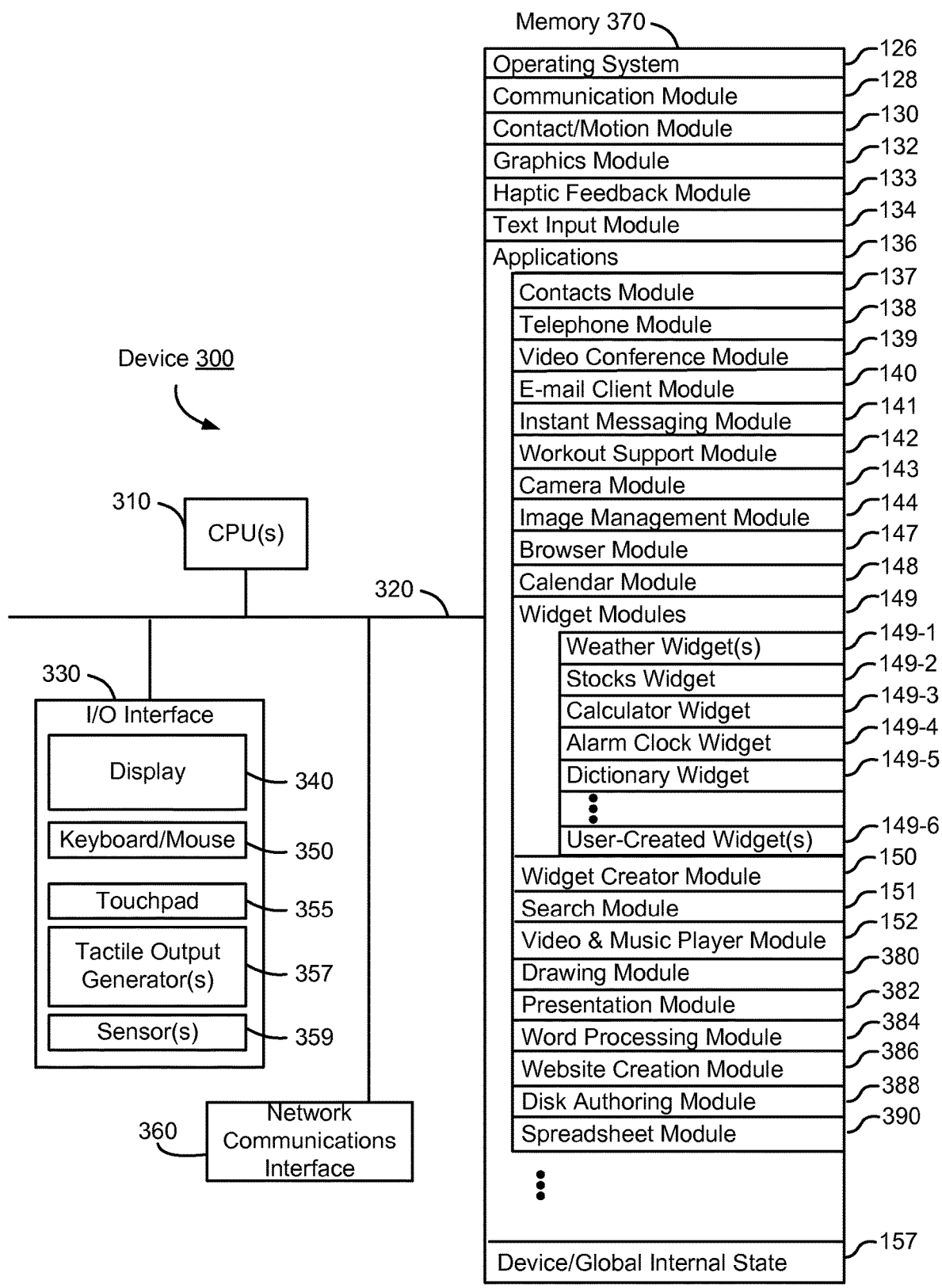
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. IA). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
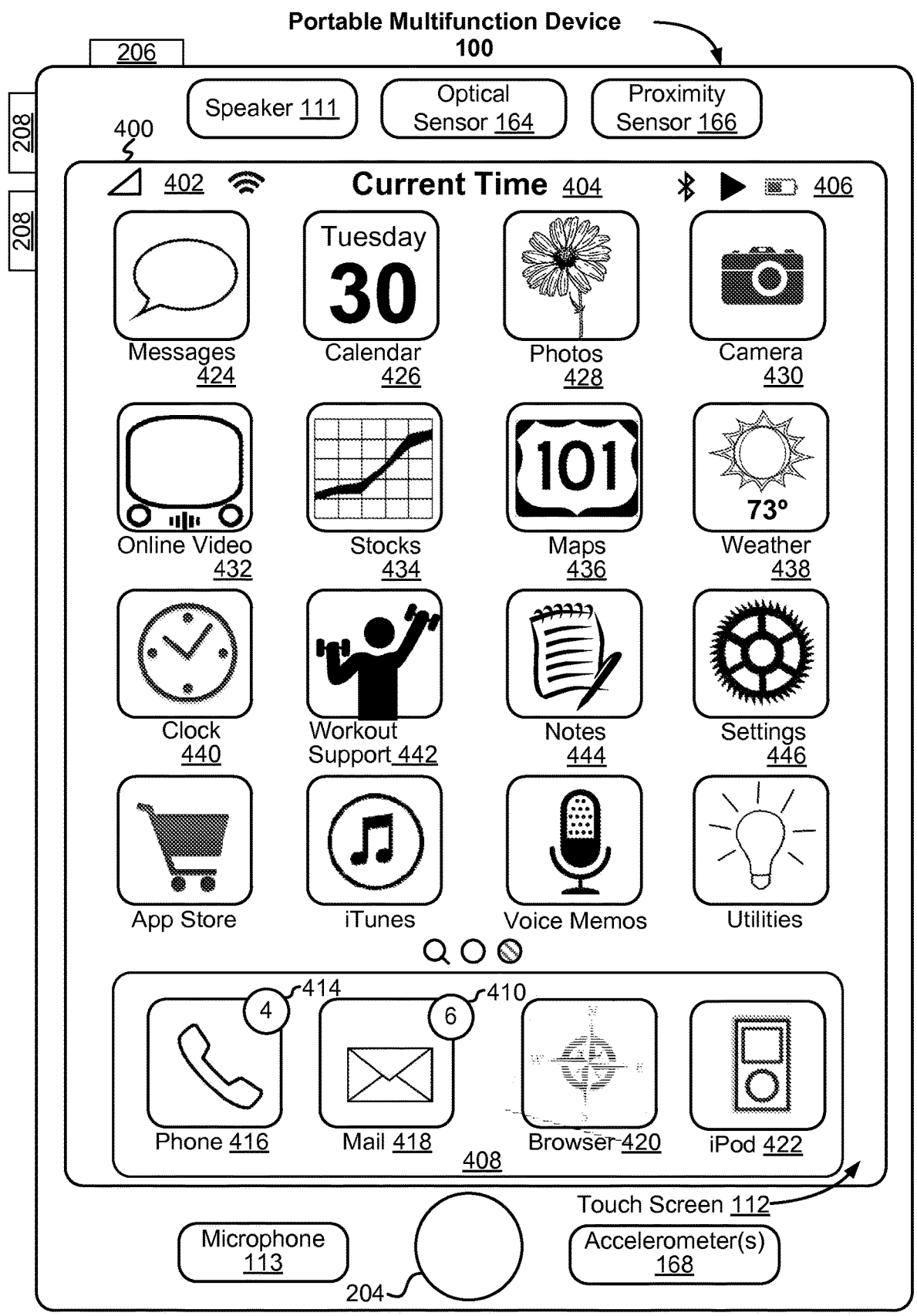
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Text;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video"
   Icon 434 for stocks widget 149-2, labeled "Stocks;"
   Icon 436 for map module 154, labeled "Map;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
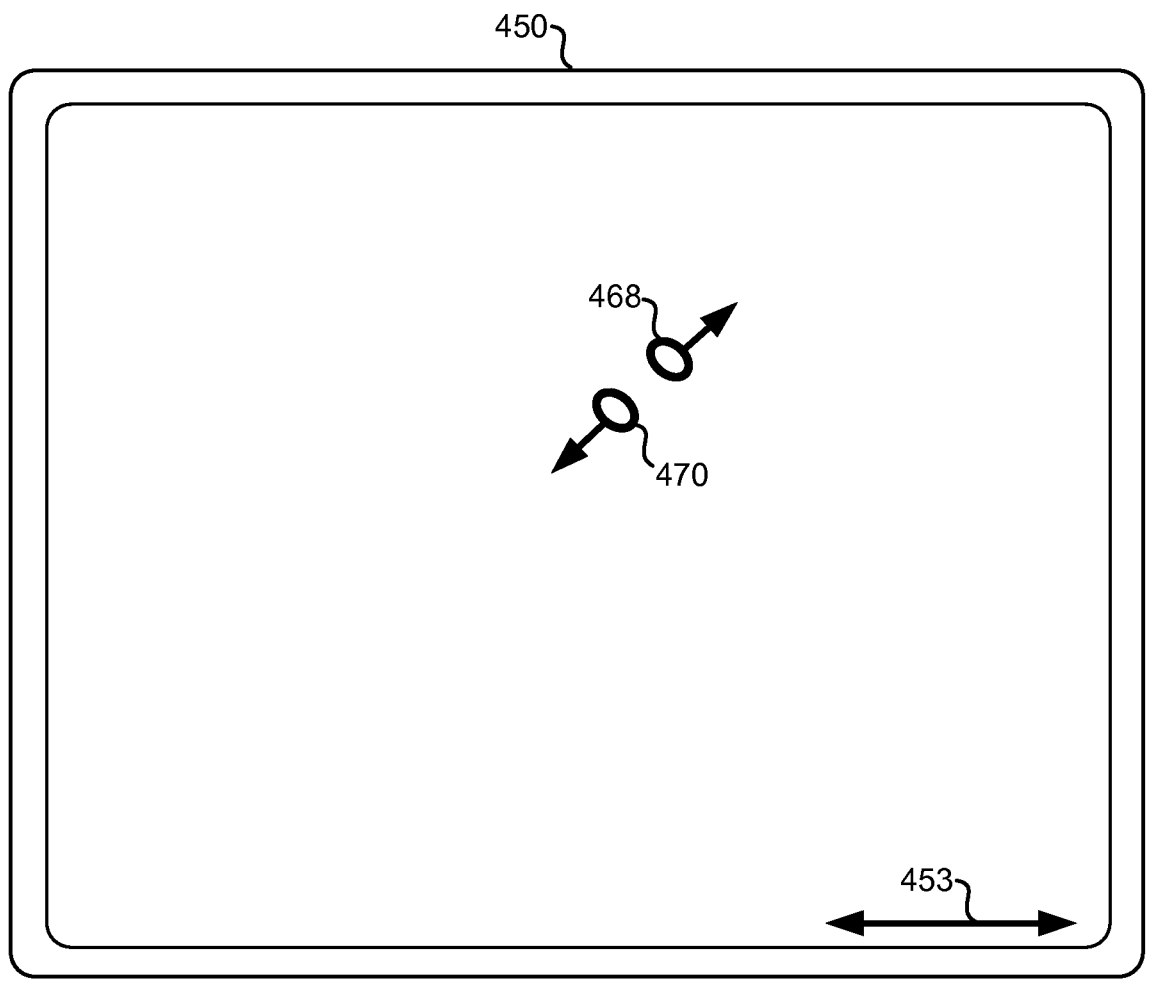
FIG. 4B illustrates an exemplary user interface for a multifunction device with a touch-sensitive surface that is separate from the display in accordance with some embodiments.
Figure 4B:
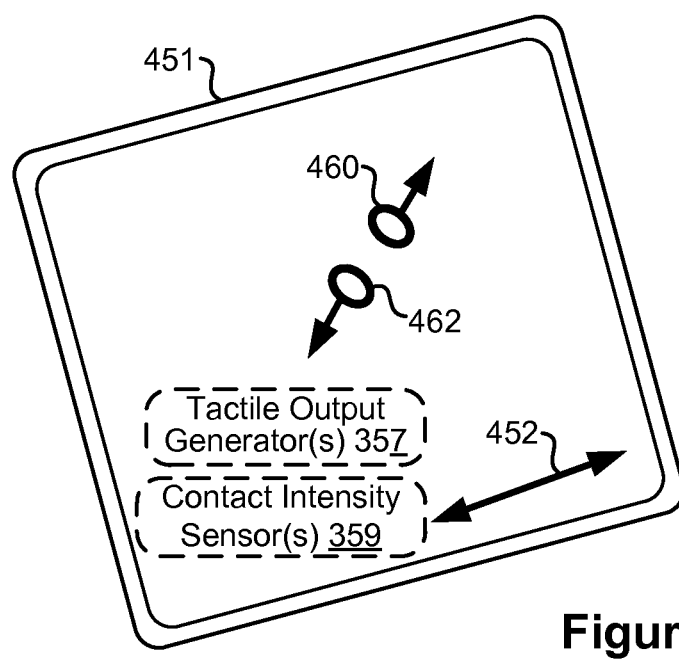

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device with a display and an input device, such as a touch-sensitive surface or a mouse and keyboard. For example, embodiments of user interfaces and associated processes are implemented on device 300 or portable multifunction device 100.

Figure 5:
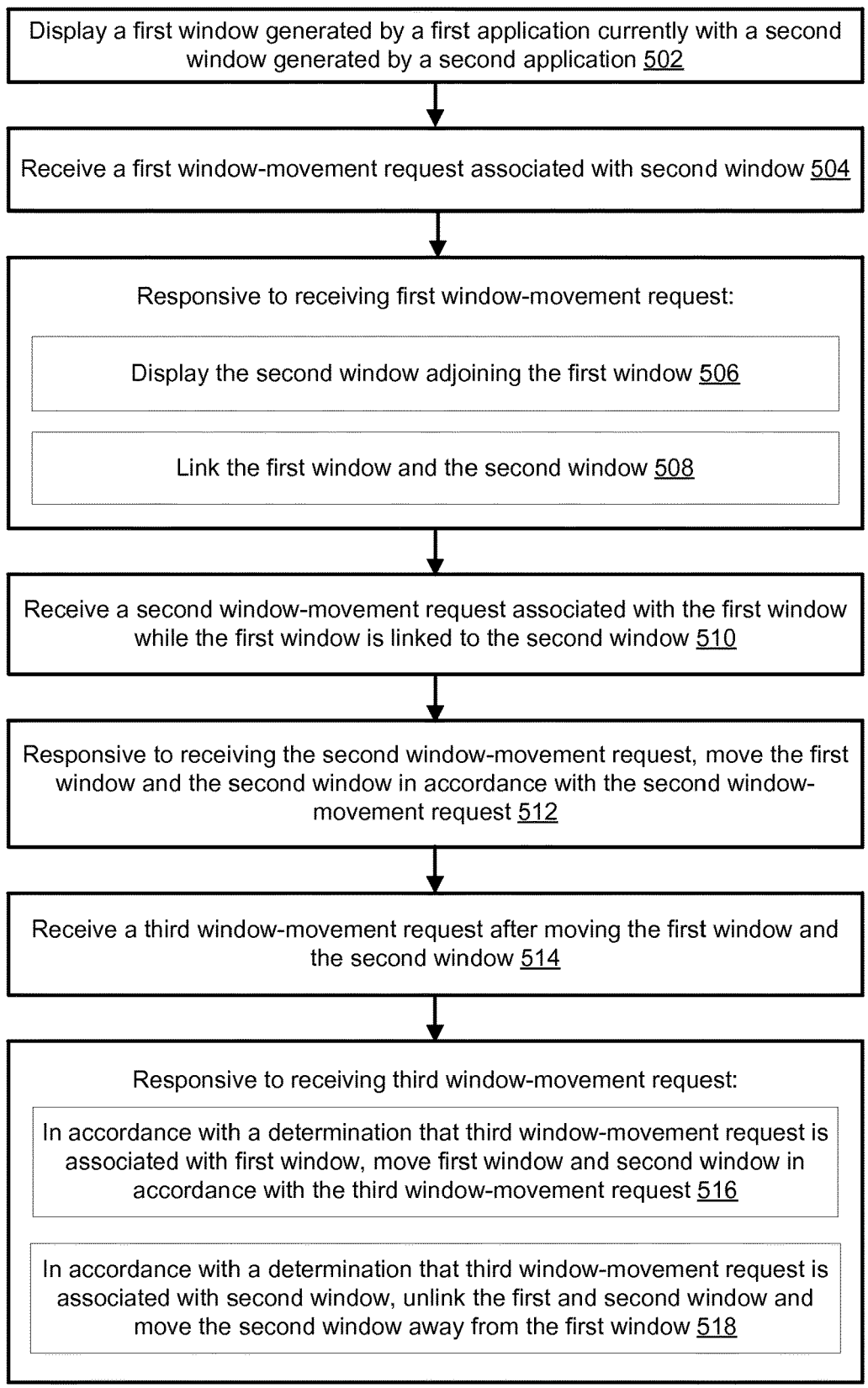
FIG. 5 is a flowchart illustrating an exemplary method for linking multiple windows in accordance with some embodiments.

FIG. 5 is a flowchart illustrating a method 500 for linking multiple windows, according to some embodiments. The method 500 is performed at an electronic device with a display and an input device, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. Some embodiments of the method 500 may include fewer, additional, or different steps than those shown in FIG. 5, and the steps may be performed in different orders. An example of a user interface that implements the steps of the method 500 is illustrated in FIGS. 6A-6F.

Figure 6A:
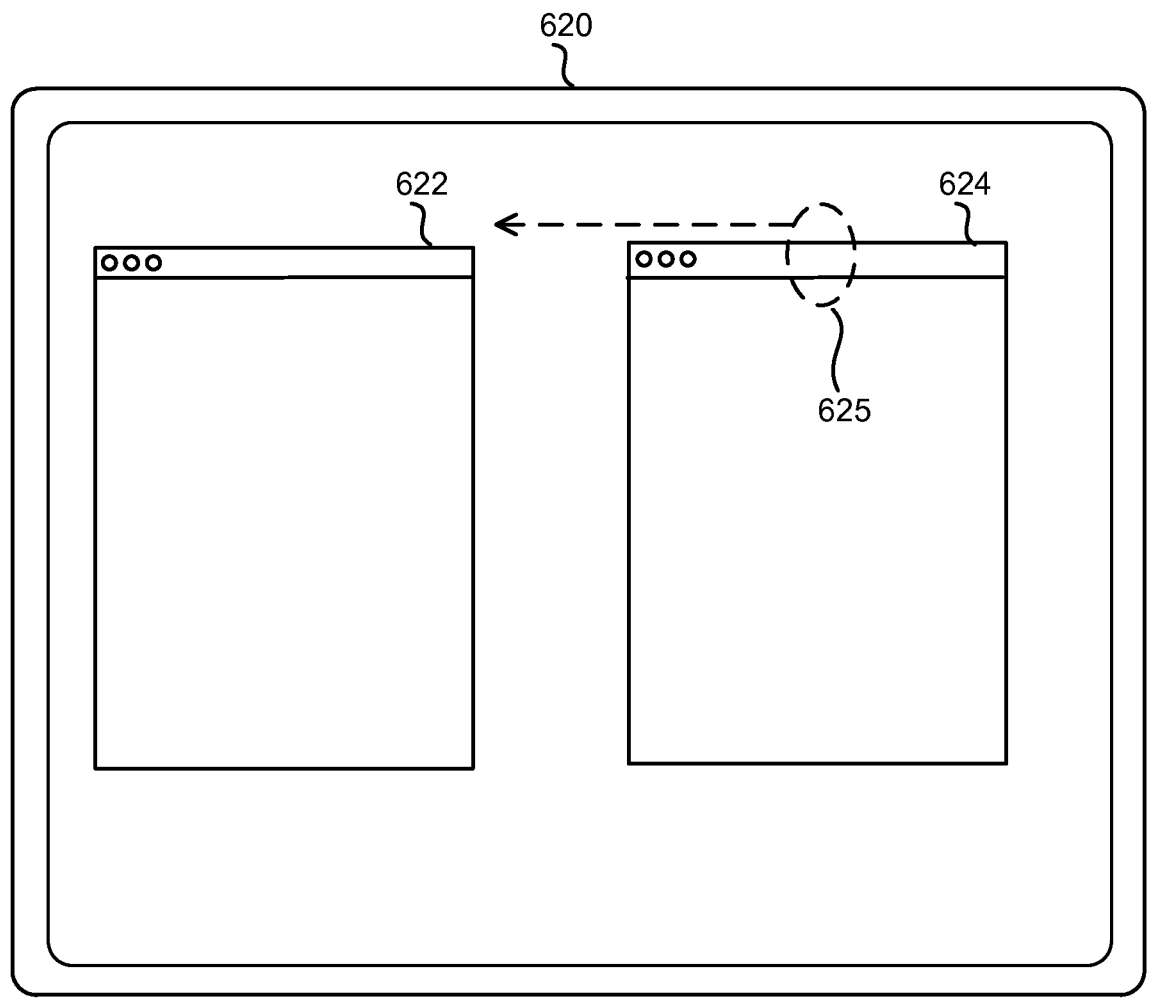
FIG. 6A illustrates an exemplary user interface for linking multiple windows in accordance with some embodiments.

Referring to FIGS. 5 and 6A, the electronic device displays 502 on a display 620 a first window 622 generated by a first application concurrently with a second window 624 generated by a second application. With the input device, the electronic device receives 504 a first window-movement request associated with the second window 624. For example, the electronic device detects a first drag-and-drop input 625 whose beginning corresponds to a location within the second window 624.

Figure 6B:
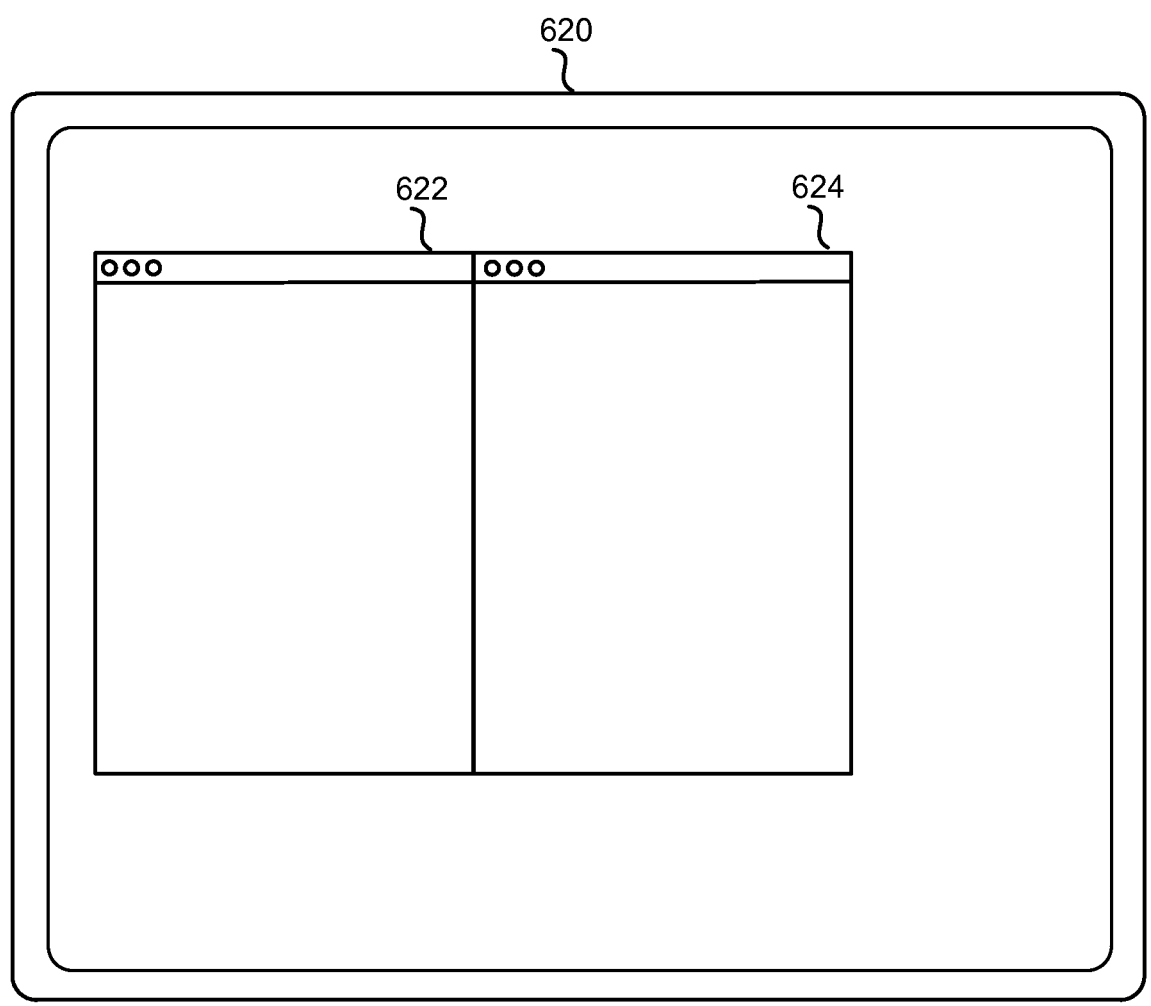
FIG. 6B illustrates an exemplary user interface for linking multiple windows in accordance with some embodiments.
Figure 6C:
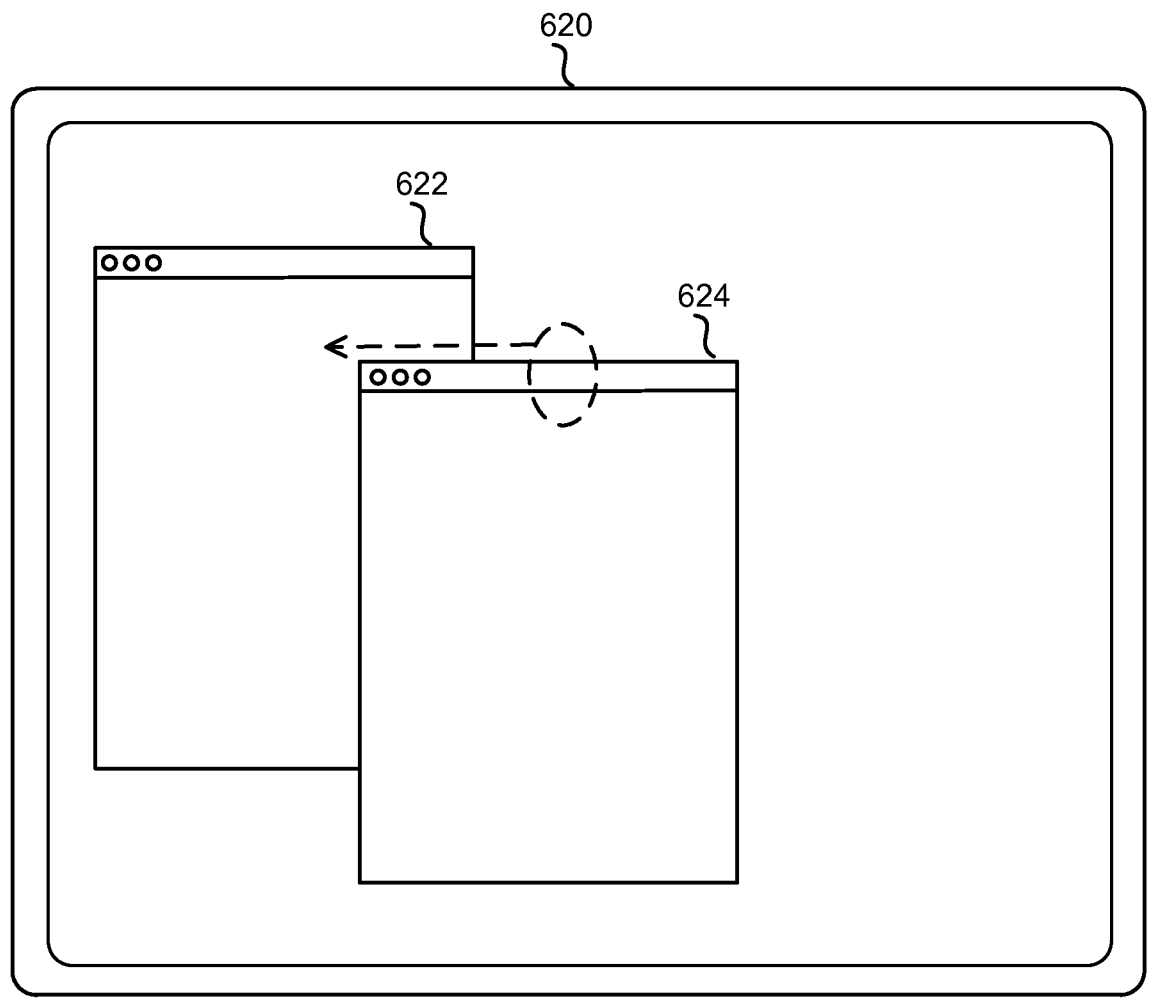
FIG. 6C illustrates an exemplary user interface for linking multiple windows in accordance with some embodiments.

Responsive to receiving the first window-movement request, the electronic device displays 506 on the display the second window 624 adjoining the first window 622, as shown in FIG. 6B. As used herein, the second window 624

"adjoins" the first window 622 if the second window 624 is touching the first window 622 or is closely aligned to a vertical or horizontal window boundary of the first window 622. In accordance with a determination that a window linking criterion has been met, the electronic device links 508 the first window 622 and the second window 624. An example window linking criterion is a threshold distance between adjoining windowing boundaries of the first window 622 and the second window 624. For example, the second window 624 is linked to the first window 622 in accordance with a determination that a distance between adjoining boundaries of the first window 622 and the second window 624 is less than the threshold distance. Another example window linking criterion is a threshold speed of the movement of the second window 624. For example, the second window 624 is linked to the first window 622 in accordance with a determination that the second window 624 was moved at less than the threshold speed. Linking of the first window 622 and the second window 624 includes establishing a spatial relationship between the first window 622 and the second window 624. The spatial relationship defines a fixed distance between adjoining window boundaries of the first window 622 and the second window 624. In some embodiments, the spatial relationship further defines distances between other non-adjoining boundaries of the first window 622 and the second window 624. In some embodiments, since the first window-movement request is associated with the second window 624, the second window 624 is referred to as a "subordinate window," while the first window 622 is referred to as a "superordinate window."

In accordance with a determination that the window linking criterion has not been met, the electronic device does not link the first window 622 and second window 624. In this case, the spatial relationship between the first window 622 and second window 624 is not established, and the first window 622 and second window 624 move independently of one another.

In some embodiments, responsive to receiving the first window-movement request, the electronic device determines whether the first window-movement request exceeds a threshold (such as a speed threshold or a distance threshold). As the second window 624 is moved, the contact/motion module 130 continuously determines the speed and distance of the movement of the second window 624. In some embodiments, the contact/motion module 130 measures the distance as a Euclidean distance between an initial pixel location of an origin of the second window 624 (e.g., an upper left corner of the second window 624) and a current pixel location of the origin as the second window 624 is moved. For example, if the second window 624 is moved from pixel (1000, 1024) to pixel (500, 1024), the second window 624 has moved a distance of 500 pixels. The threshold distance may be defined relative to an initial distance between the first window 622 and the second window 624 before the first window-movement request is received. For example, the threshold distance is 95% of the initial distance between the first window 622 and second window 624. In some embodiments, the contact/motion module 130 determines the speed of the movement as the determined distance over the time for the movement. Responsive to determining the first window-movement request exceeds the threshold, the electronic device displays the second window 624 as the second window passes (e.g., overlaps) the first window 622, as shown for example in FIG. 6C. In contrast, responsive to determining the first window-movement request does not exceed the threshold, the electronic device determines whether the window linking criterion has been met.

Figure 6D:
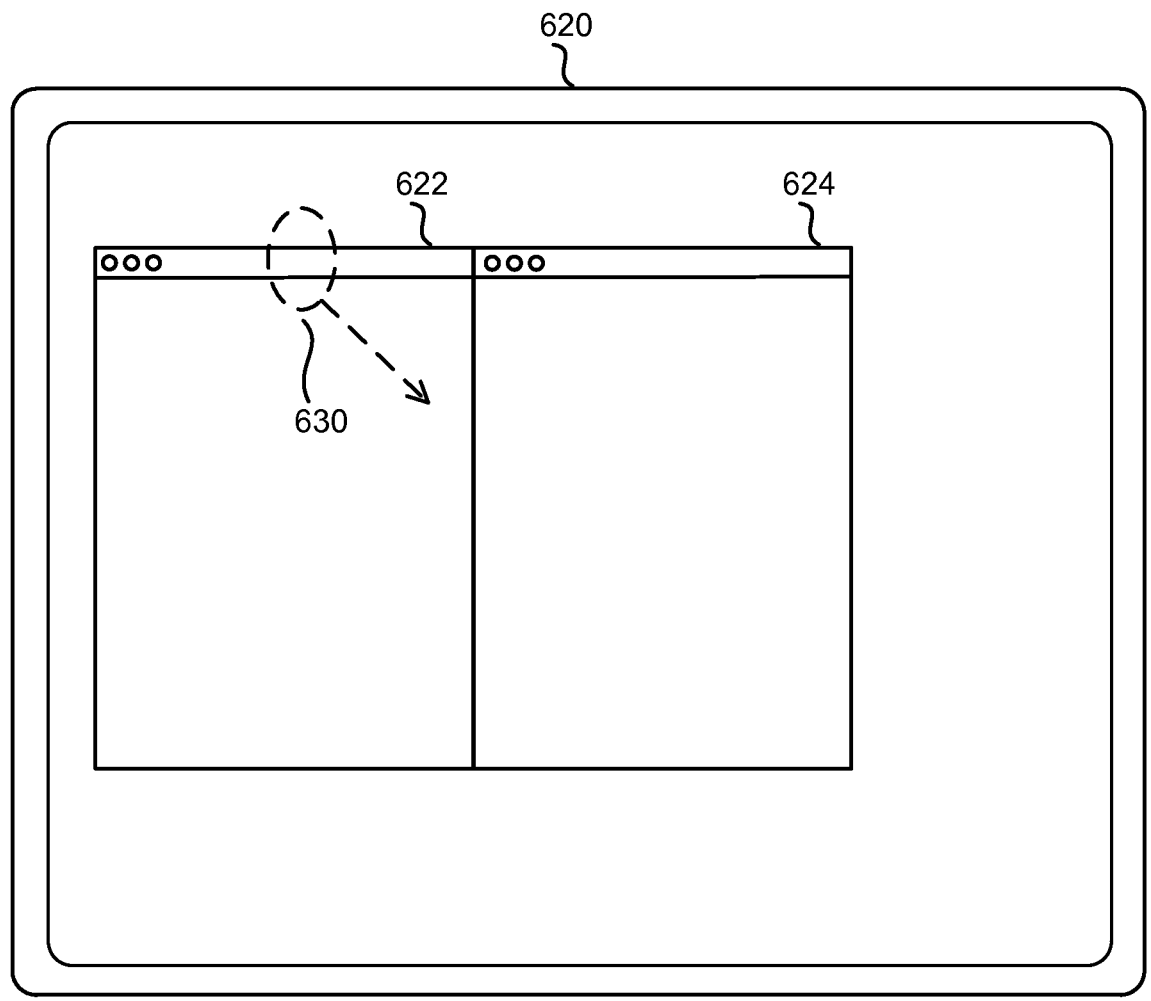
FIG. 6D illustrates an exemplary user interface for linking multiple windows in accordance with some embodiments.
Figure 6E:
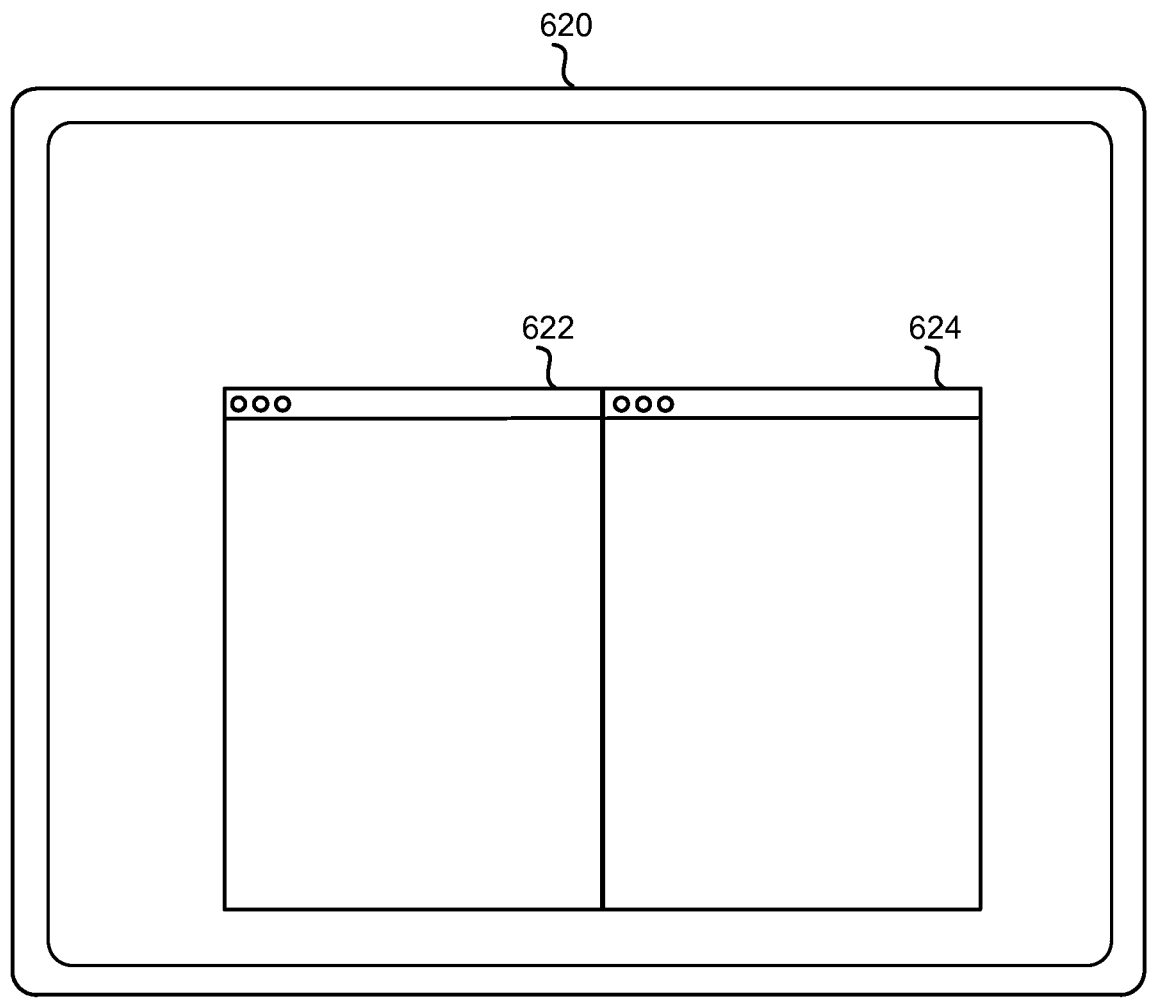
FIG. 6E illustrates an exemplary user interface for linking multiple windows in accordance with some embodiments.
Figure 6F:
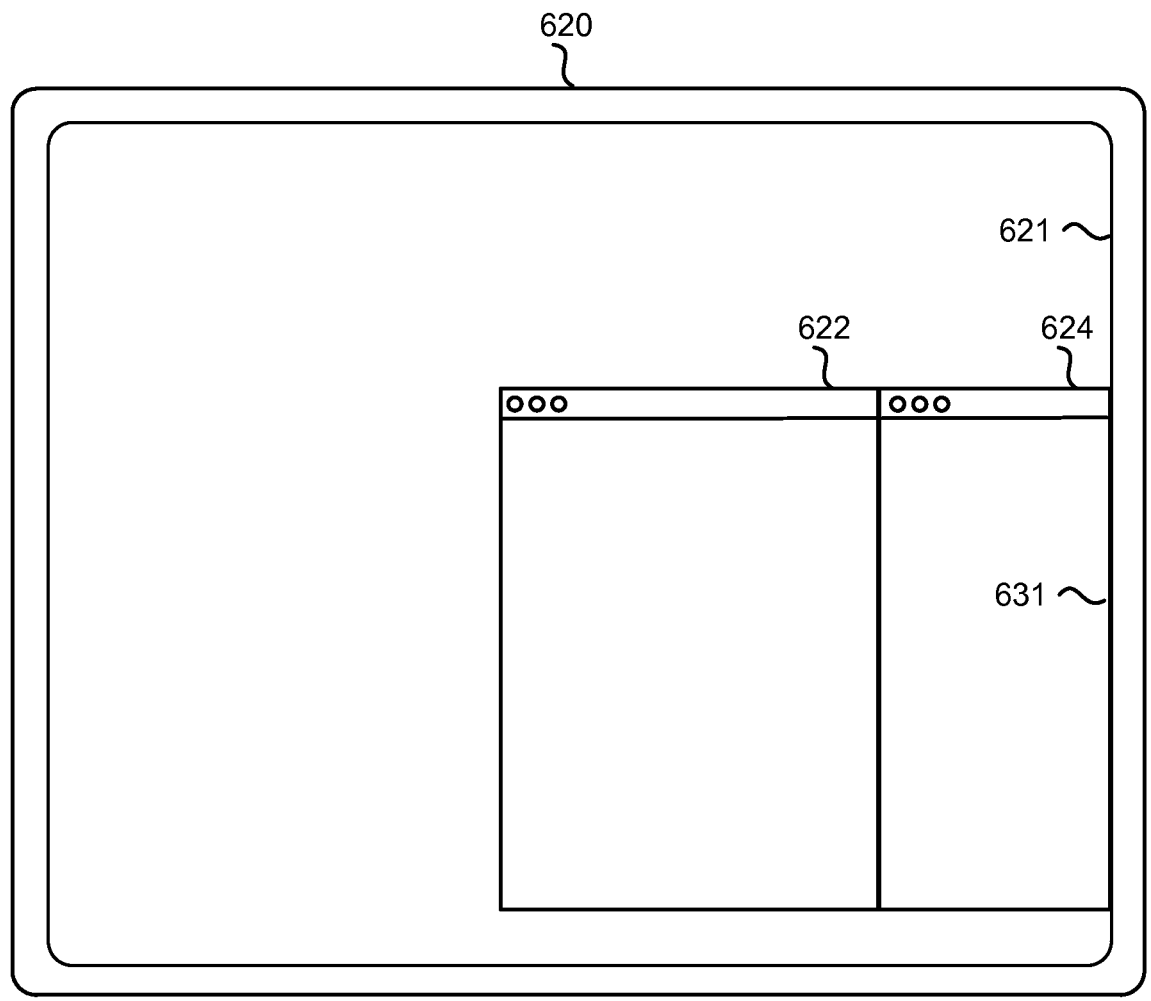
FIG. 6F illustrates an exemplary user interface for linking multiple windows in accordance with some embodiments.

While the first window 622 is linked to the second window 624, the electronic device detects 510 with the input device a second window-movement request associated with the first window 622. An example second window-movement request is illustrated in FIG. 6D. For example, the electronic device detects a second drag-and-drop input 630 whose beginning corresponds to a location with the first window 622.

Responsive to receiving the second window-movement request, the electronic device moves 512 the first window 622 and the second window 624 in accordance with the second window-movement request (e.g., as a unit). As the first and second windows 622 and 624 are moved, as shown for example in FIG. 6E, the spatial relationship between the first window 622 and the second window 624 is maintained.

In some embodiments, moving the first window 622 and second window 624 in accordance with the second window-movement request causes an edge 631 of the second window 624 to reach an edge 621 of the display 620. When the edge 631 of the second window 624 reaches the edge 621 of the display, as shown for example in FIG. 6F, the electronic device automatically resizes the second window 624 by reducing an area of the second window 624 and redisplaying contents of the second window 624 in the reduced area while the spatial relationship between the first window 622 and second window 624 is maintained.

Figure 6G:
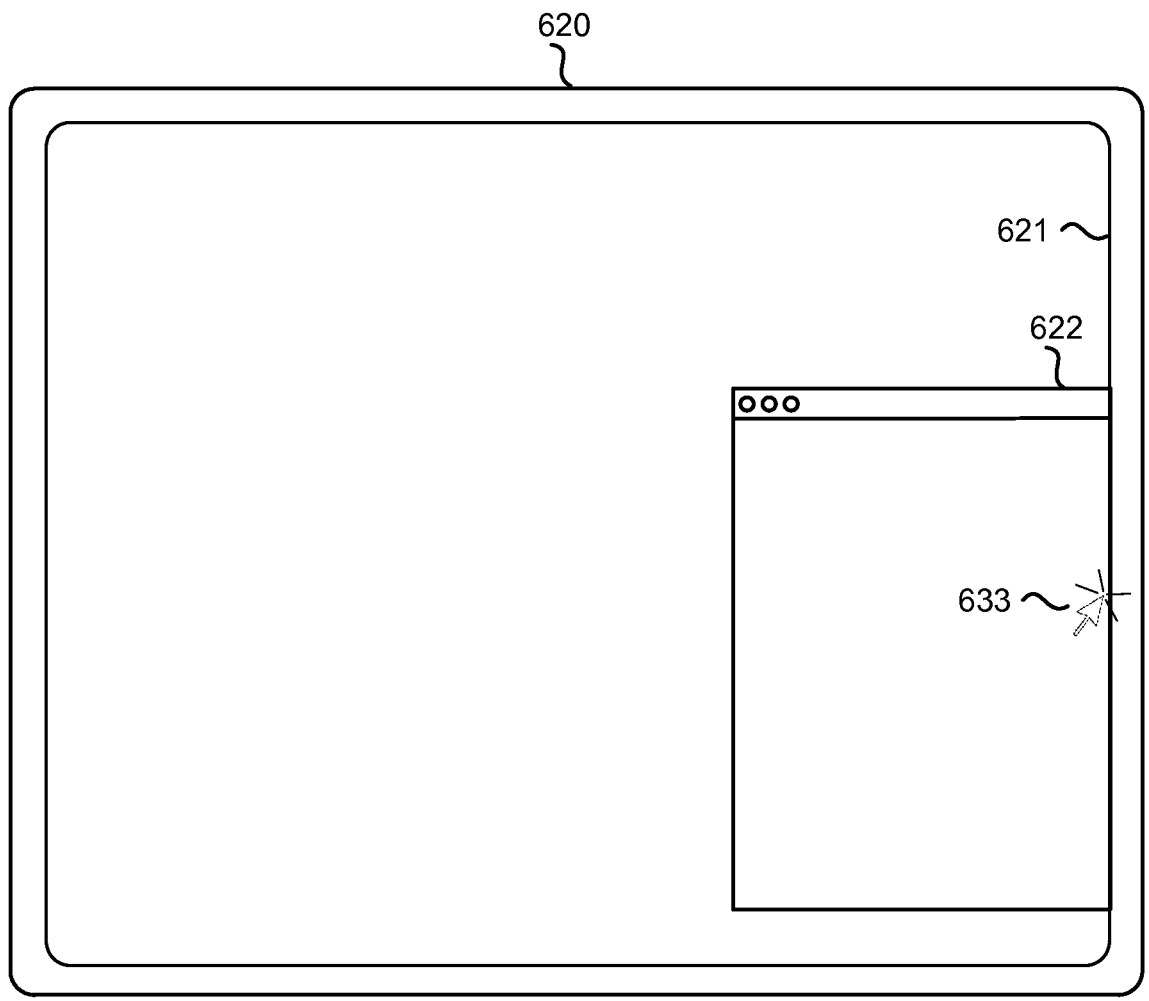
FIG. 6G illustrates an exemplary user interface for linking multiple windows in accordance with some embodiments.
Figure 6H:
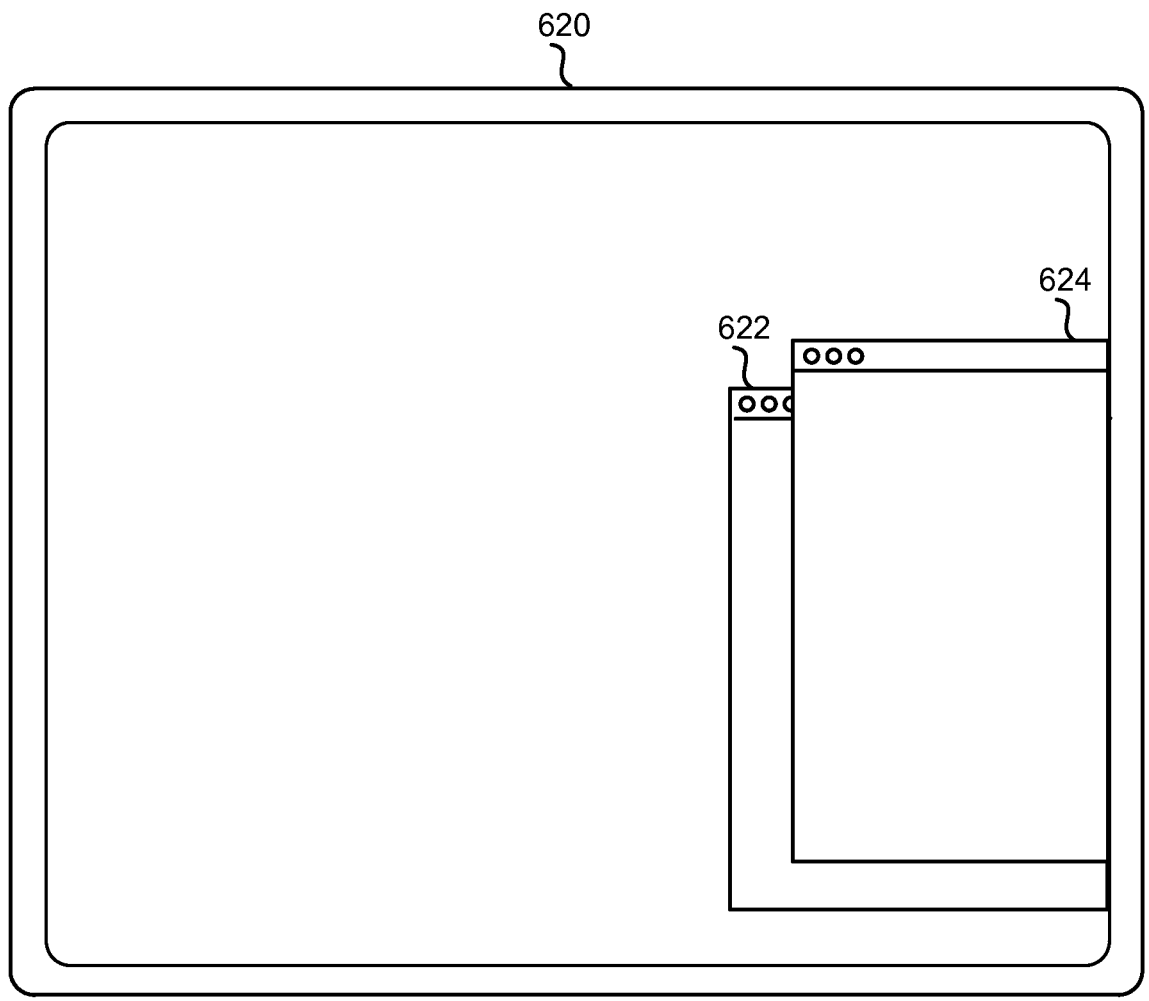
FIG. 6H illustrates an exemplary user interface for linking multiple windows in accordance with some embodiments.

In some embodiments, moving the first window 622 and second window 624 in accordance with the second window-movement request causes the second window 624 to appear to move past the edge 621 of the display 620 such that the second window 624 is no longer displayed on the display 620. When the second window 624 is no longer displayed, the electronic device detects, with the input device, a request to redisplay the second window 624. For example, as shown in FIG. 6G, the electronic device detects a mouse-over or a click 633 at the edge 621 of the display 620 where the second window 624 moved off the display. In response to receiving the request, as shown in FIG. 6H, the electronic device displays the second window 624 within the display 620.

Figure 6I:
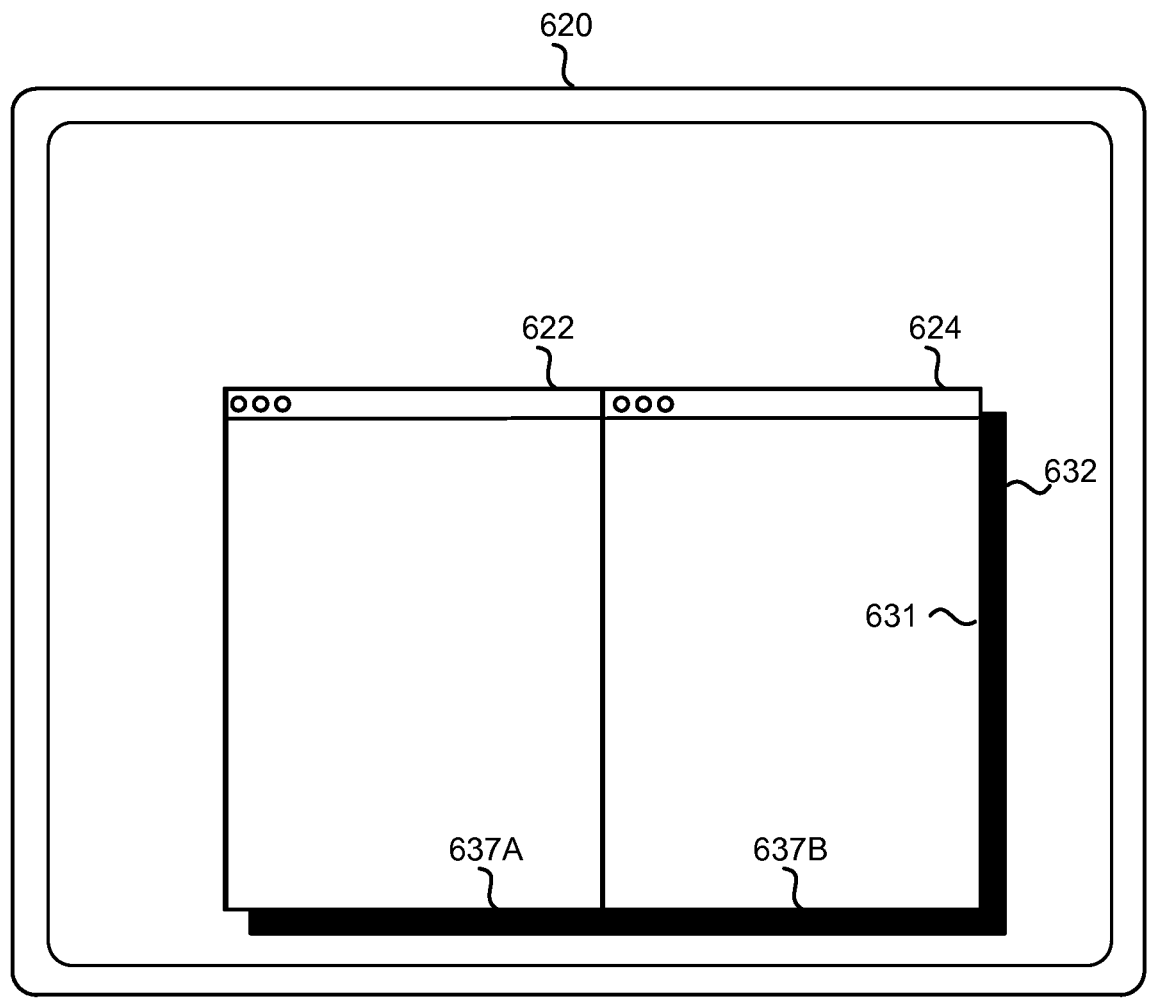
FIG. 6I illustrates an exemplary user interface for linking multiple windows in accordance with some embodiments.

In some embodiments, when moving the first window 622 and second window 624 in accordance with the second window-movement request, the electronic device displays a drop shadow 632 on the display 620 whose shape is based on a union of the first window 622 and the second window 624. An example drop shadow 632 is illustrated in FIG. 6I. As shown in the example of FIG. 6I, the drop shadow 632 has a shape based on the right edge 631 of the second window 624 and the combined bottom edges 637A and 637B of the first window 622 and second window 624. The drop shadow 632 may alternatively have a shape defined based on other edges of the first window 622 and second window 624.

Figure 6J:
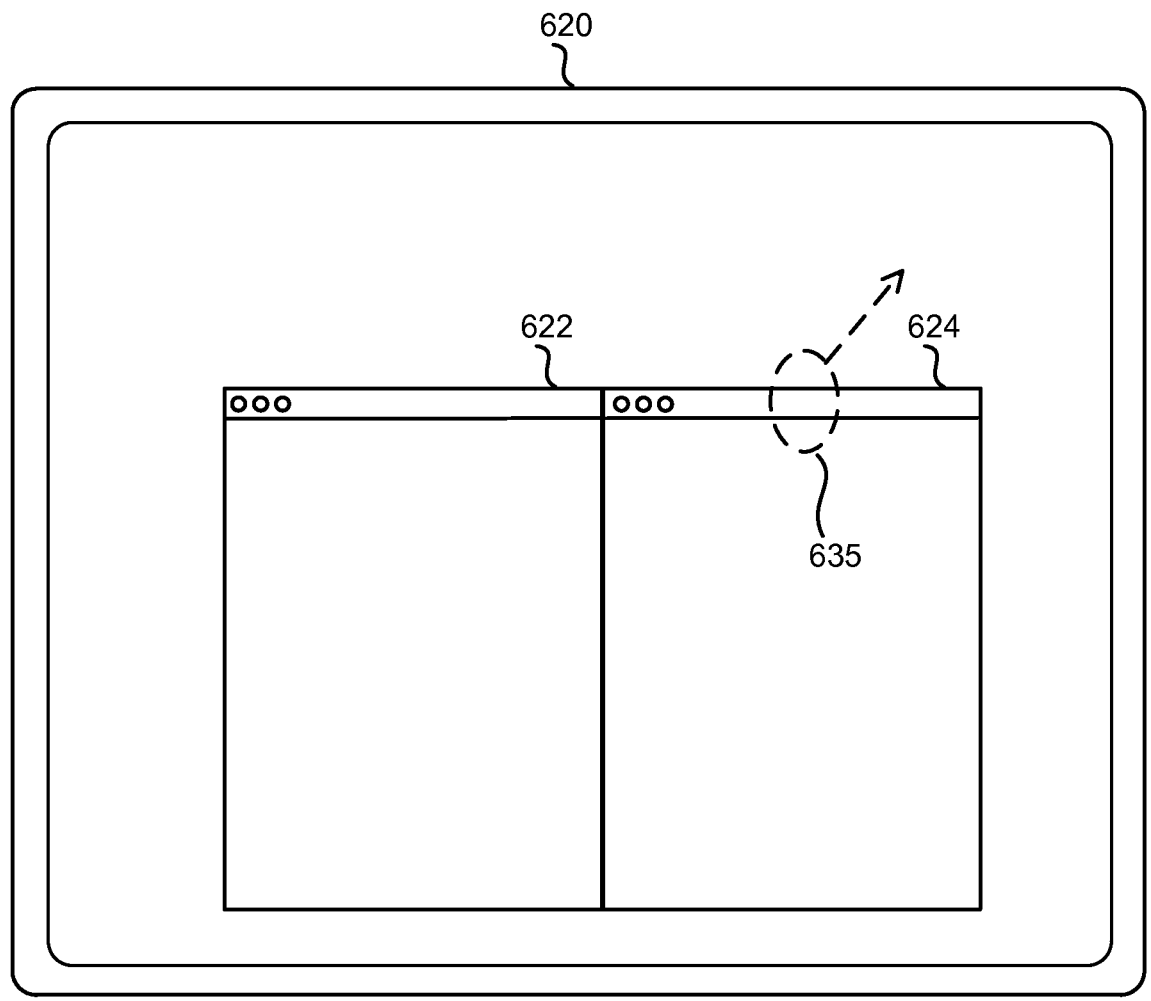
FIG. 6J illustrates an exemplary user interface for linking multiple windows in accordance with some embodiments.

After moving 512 the first window 622 and the second window 624 while maintaining the spatial relationship, the electronic device detects 514 a third window-movement request with the input device. For example, as shown in FIG. 6J, the electronic device detects a third drag-and-drop input 635 whose beginning corresponds to a location within the first window 622 or the second window 624.

Responsive to receiving the third window-movement request and in accordance with a determination that the third window-movement request is associated with the first window 622, the electronic device moves 516 the first window 622 and the second window 624 in accordance with the third window-movement request. For example, if the third window-movement request is a drag-and-drop input whose beginning corresponds to a location within the first window 622, the electronic device moves the first window 622 and the second window 624 as a unit. The spatial relationship between the first window 622 and the second window 624 is maintained as the first and second windows 622 and 624 are moved.

Figure 6K:
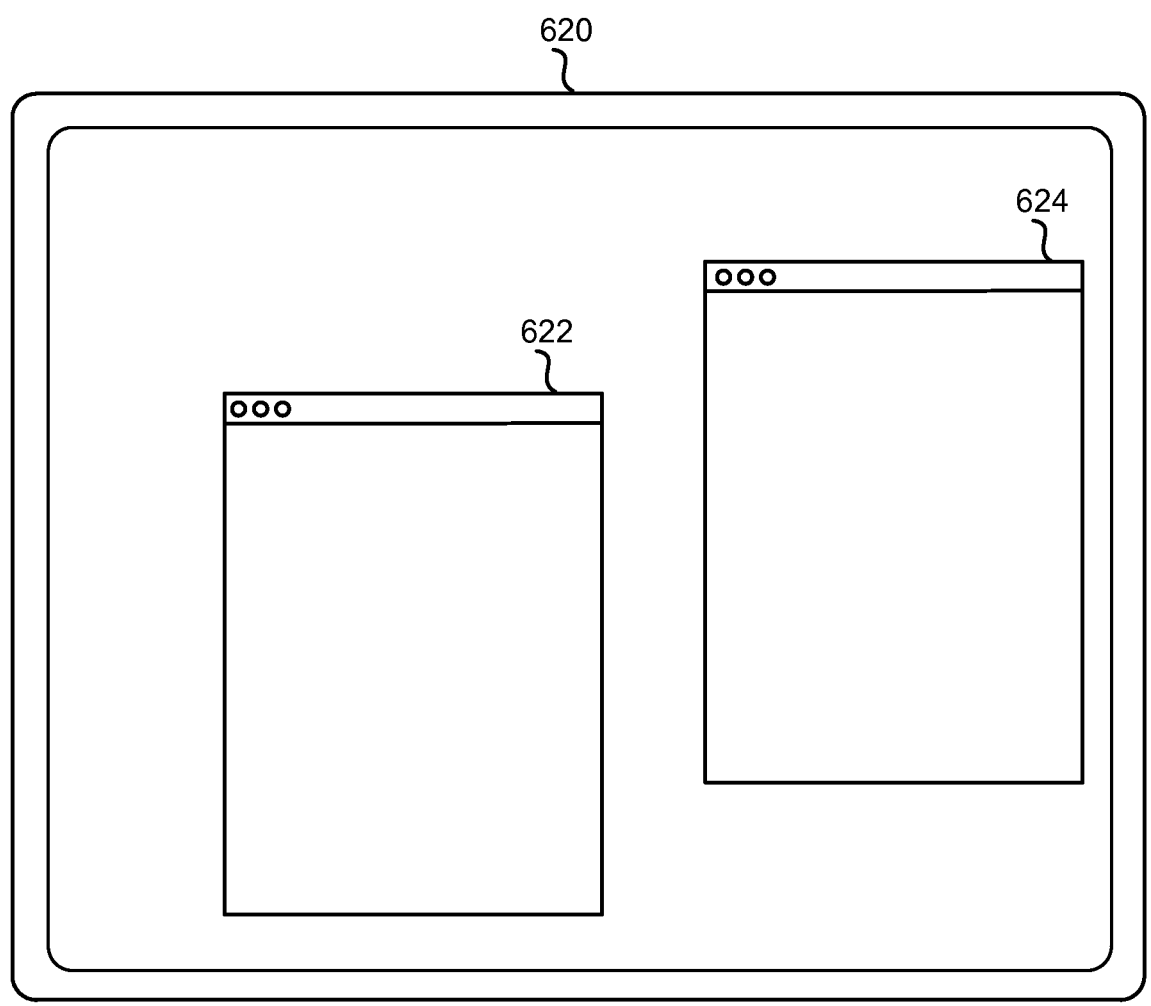
FIG. 6K illustrates an exemplary user interface for linking multiple windows in accordance with some embodiments.

In contrast, in accordance with a determination that the third window-movement request is associated with the second window 624, the electronic device unlinks the first window 622 and the second window 624 responsive to receiving the third window-movement request. The electronic device moves 518 the second window 624 away from the first window 622 such that the spatial relationship between the first window 622 and the second window 624 changes, as shown for example in FIG. 6K.

Figure 6L:
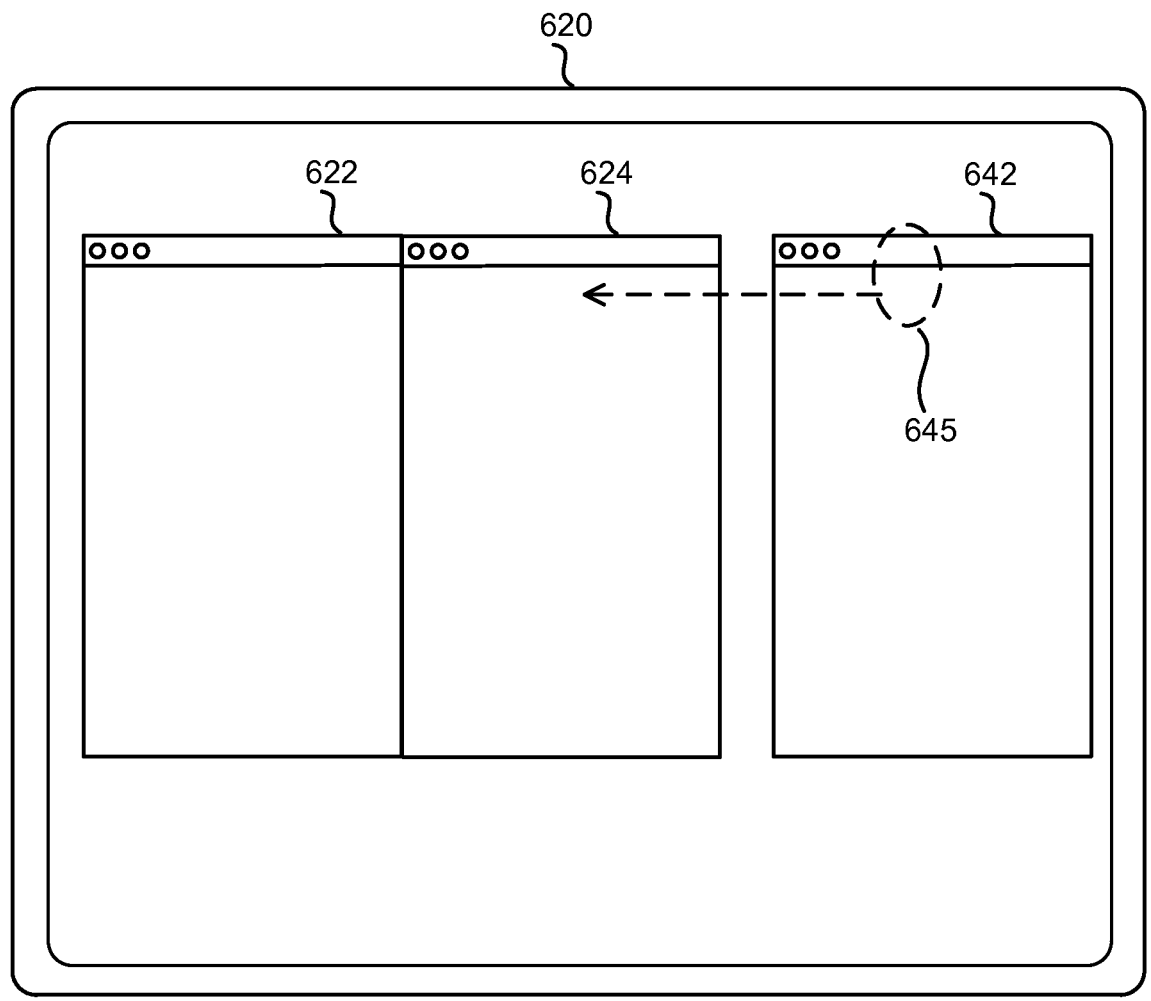
FIG. 6L illustrates an exemplary user interface for linking multiple windows in accordance with some embodiments.
Figure 6M:
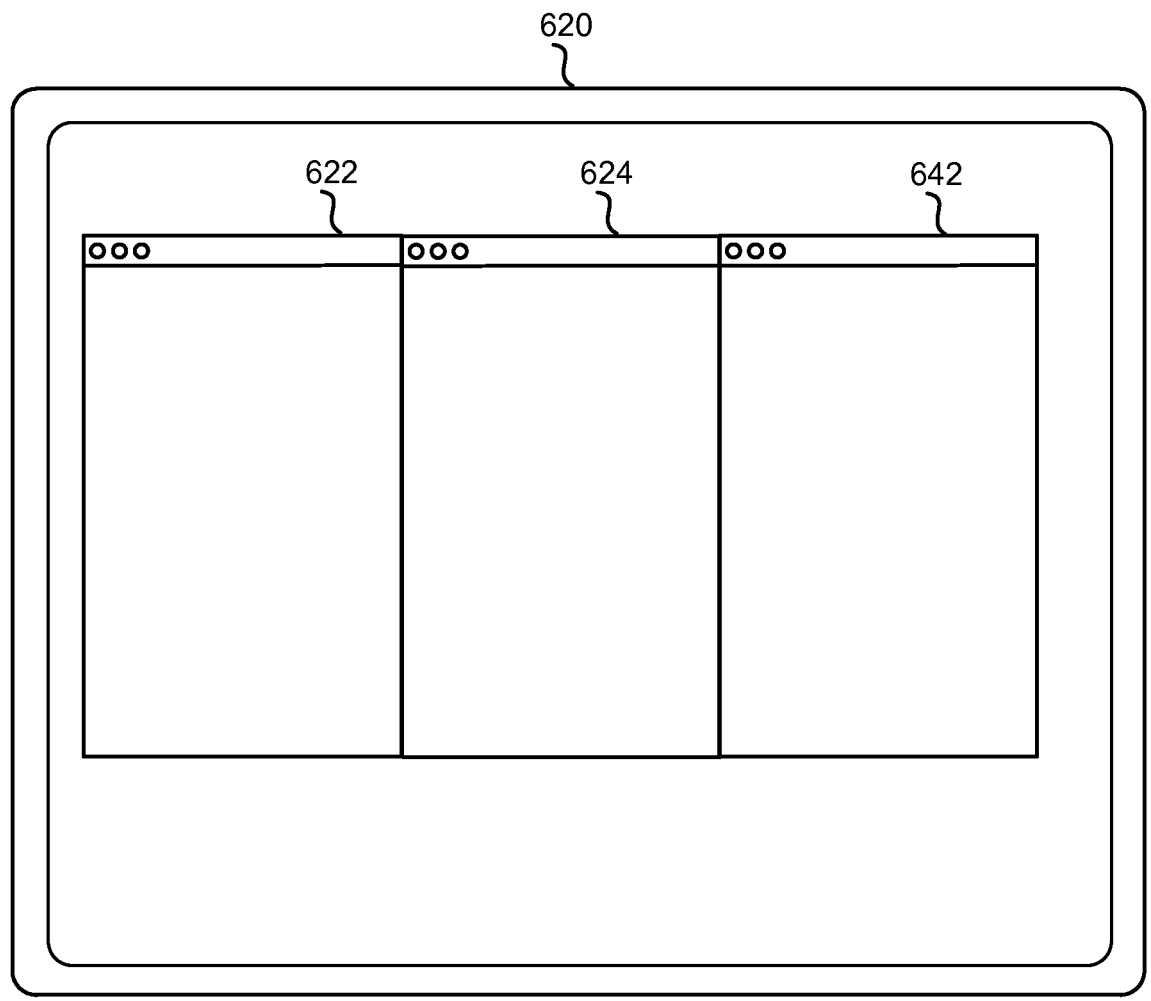
FIG. 6M illustrates an exemplary user interface for linking multiple windows in accordance with some embodiments.

In some embodiments, as shown in FIG. 6L, the electronic device also displays a third window 642 on the display 620 concurrently with the first window 622 and the second window 624. The third window 642 may be generated by the first application or the second application, or by a third application executed by the electronic device. While the third window 642 is displayed, the electronic device receives, with the input device, a fourth window-movement request that is associated with the third window. For example, the electronic device detects a drag-and-drop input 645 whose beginning corresponds to a location within the third window 642. Responsive to receiving the fourth window-movement request, the electronic device displays, on the display 620, the third window 642 adjoining either the first window 622 or the second window 624. The third window 642 "adjoins" the first window 622 or the second window 624 if the third window 642 is touching the first window 622 or the second window 624, or is closely aligned to a vertical or horizontal window boundary of the first window 622 or the second window 624. For example, in FIG. 6M, the third window 642 is displayed adjacent to and touching the second window 624. The third window 642 may alternatively be displayed adjacent to and touching both the first window 622 and the second window 624, for example if the third window is adjacent to and touching a right edge of the first window 622 and a bottom edge of the second window 624.

In accordance with a determination that a second window linking criterion has been met, the electronic device links the third window 642 and either the first window 622 or the second window 624 (or both). Linking of the third window 642 and the first window 622 or second window 624 includes establishing a second spatial relationship between the third window 642 and either the first window 622 or the second window 624 (or both). Since the fourth window-movement request was associated with the third window 642, the third window 642 is referred to as a "subordinate window." The first window 622 continues to be referred to as the "superordinate window," and the second window 624 continues to be referred to as a "subordinate window."

Figure 6N:
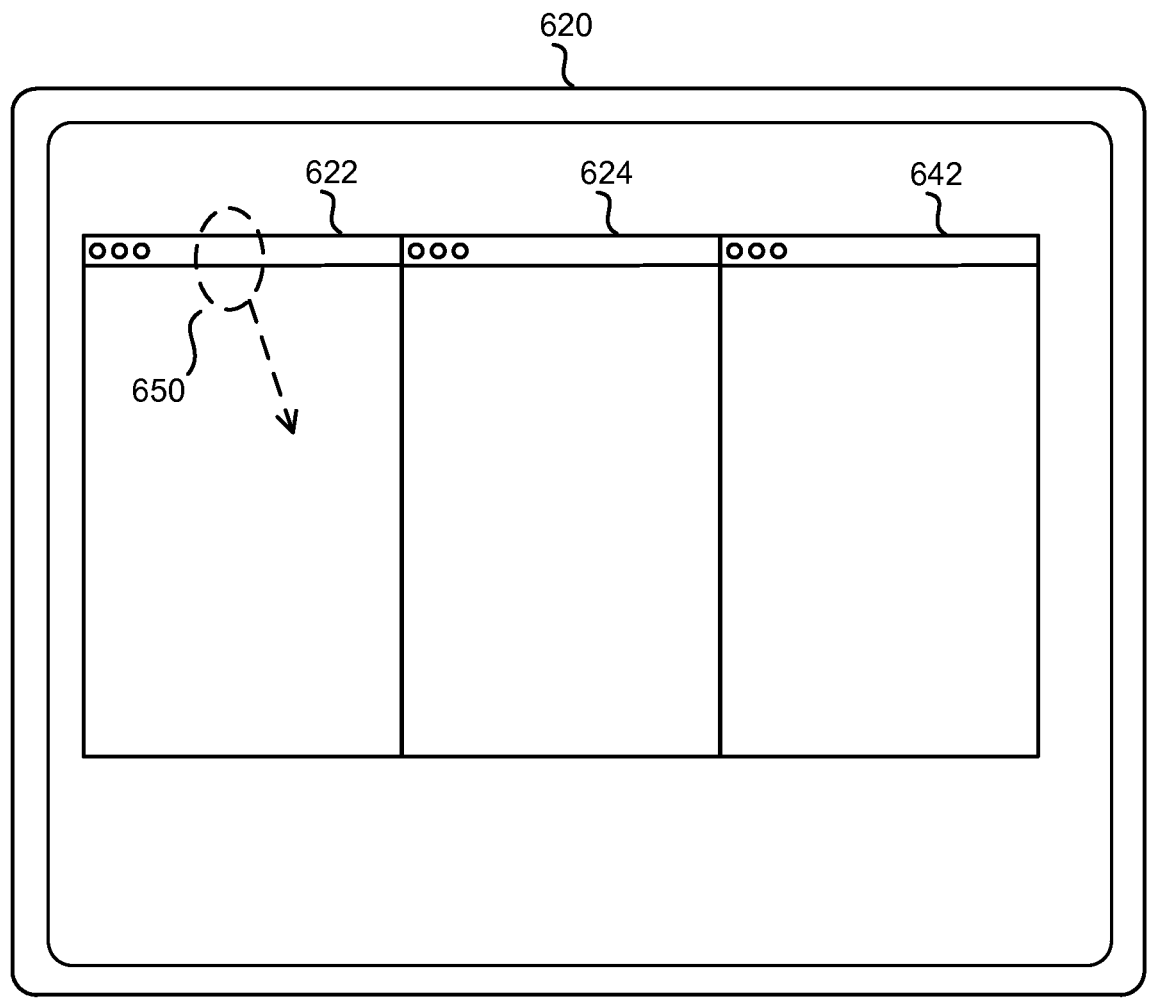
FIG. 6N illustrates an exemplary user interface for linking multiple windows in accordance with some embodiments.
Figure 6O:
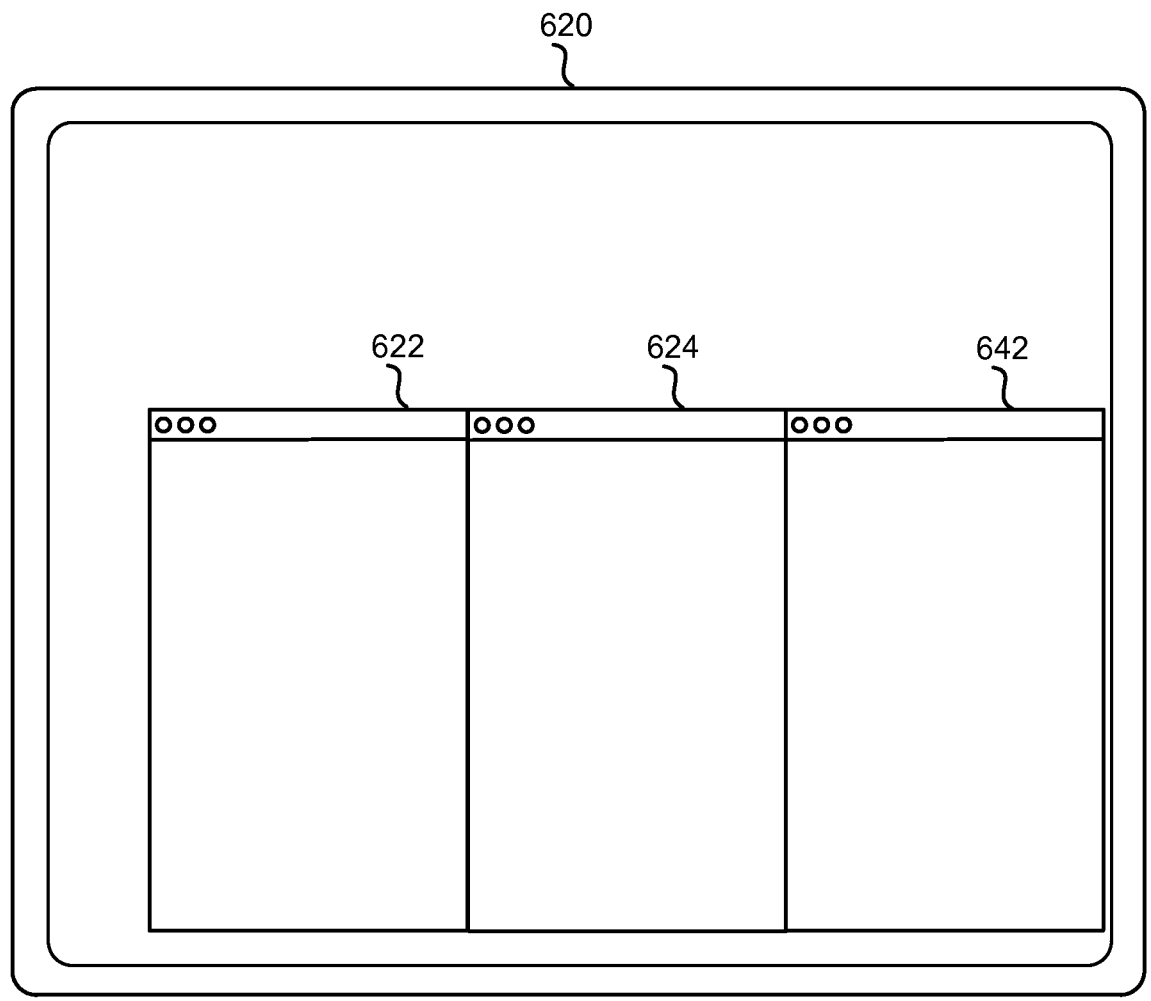
FIG. 6O illustrates an exemplary user interface for linking multiple windows in accordance with some embodiments.

While the third window 642 is linked to either the first window 622 or second window 624 (or both), the electronic device detects, with the input device, a fifth window-movement request associated with the first window 622. For example, as shown in FIG. 6N, the electronic device detects a drag-and-drop input 650 whose beginning corresponds to a location within the first window 622. Responsive to receiving the fifth window-movement request, the electronic device moves the first window 622, the second window 624, and the third window 642 in accordance with the fifth window-movement request (e.g., as a unit), as shown in FIG. 6O. As the windows are moved, the spatial relationship between the first window 622 and the second window 624 is maintained, and the second spatial relationship between the third window and either the first window 622 or the second window 624 (or both) is maintained.

Figure 6P:
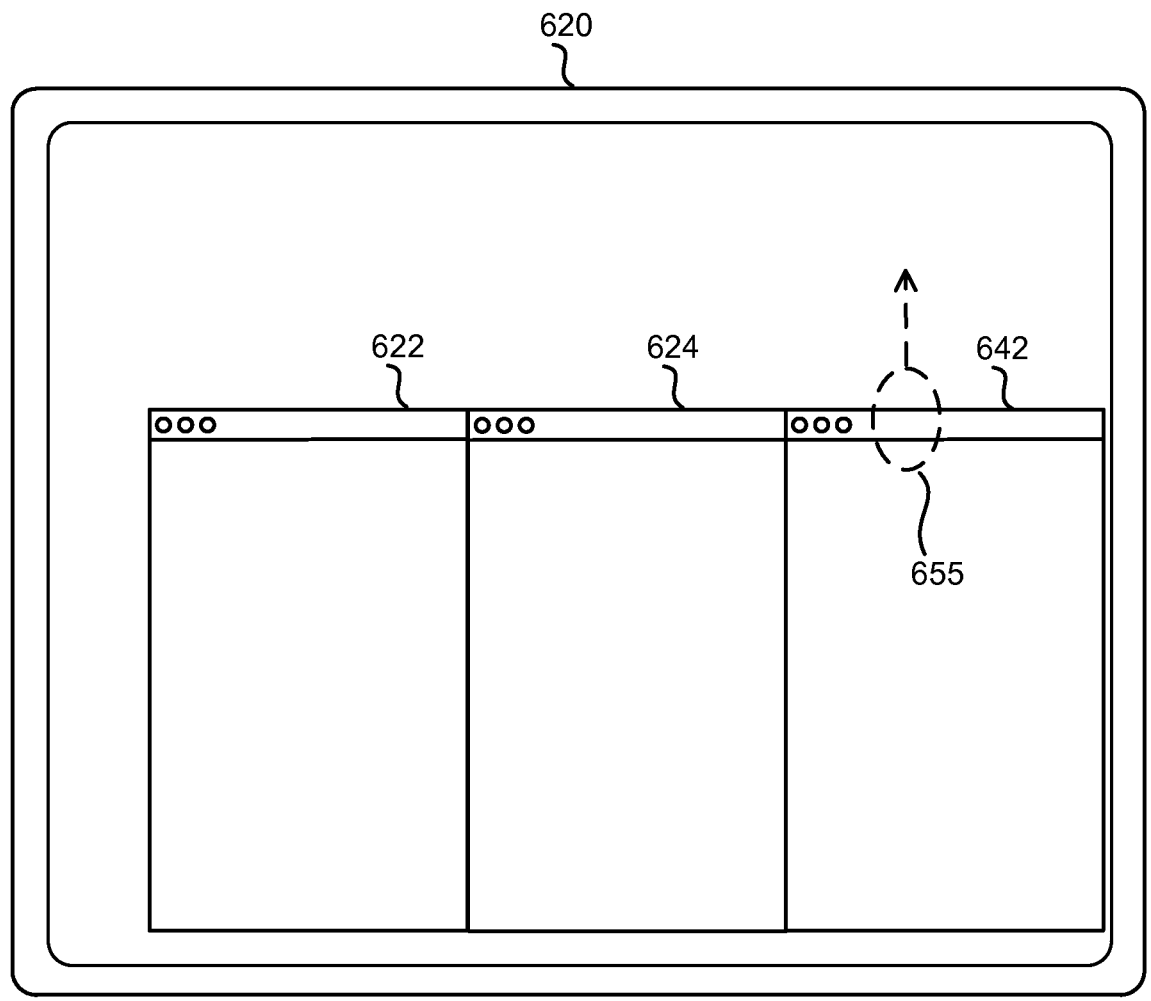
FIG. 6P illustrates an exemplary user interface for linking multiple windows in accordance with some embodiments.
Figure 6Q:
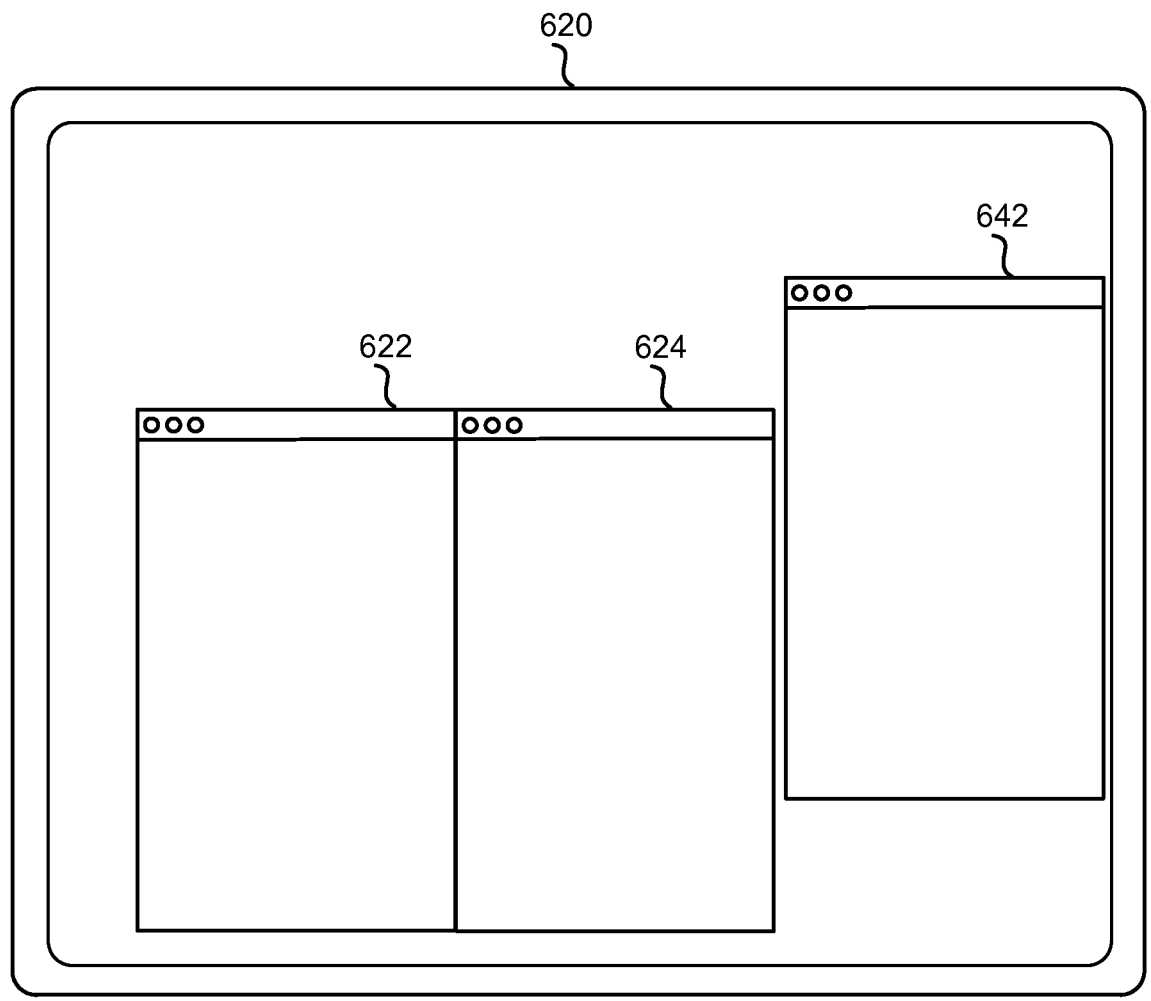
FIG. 6Q illustrates an exemplary user interface for linking multiple windows in accordance with some embodiments.

In some embodiments, the electronic device further detects, with the input device, a sixth window-movement request associated with the third window 642. For example, as shown in FIG. 6P, the electronic device detects a drag-and-drop input 655 whose beginning corresponds to a location within the third window 642. Responsive to receiving the sixth window-movement request, the electronic device unlinks the third window and either the first window 622 or the second window 624 (or both). As shown for example in FIG. 6Q, the electronic device moves the third window 642 away from either the first window 622 or the second window 624 (or both) such that the second spatial relationship between the third window 642 and either the first window 622 or the second window 624 (or both) changes. The first window 622 and the second 624 remain linked while the third window is moved away.

Figure 6R:
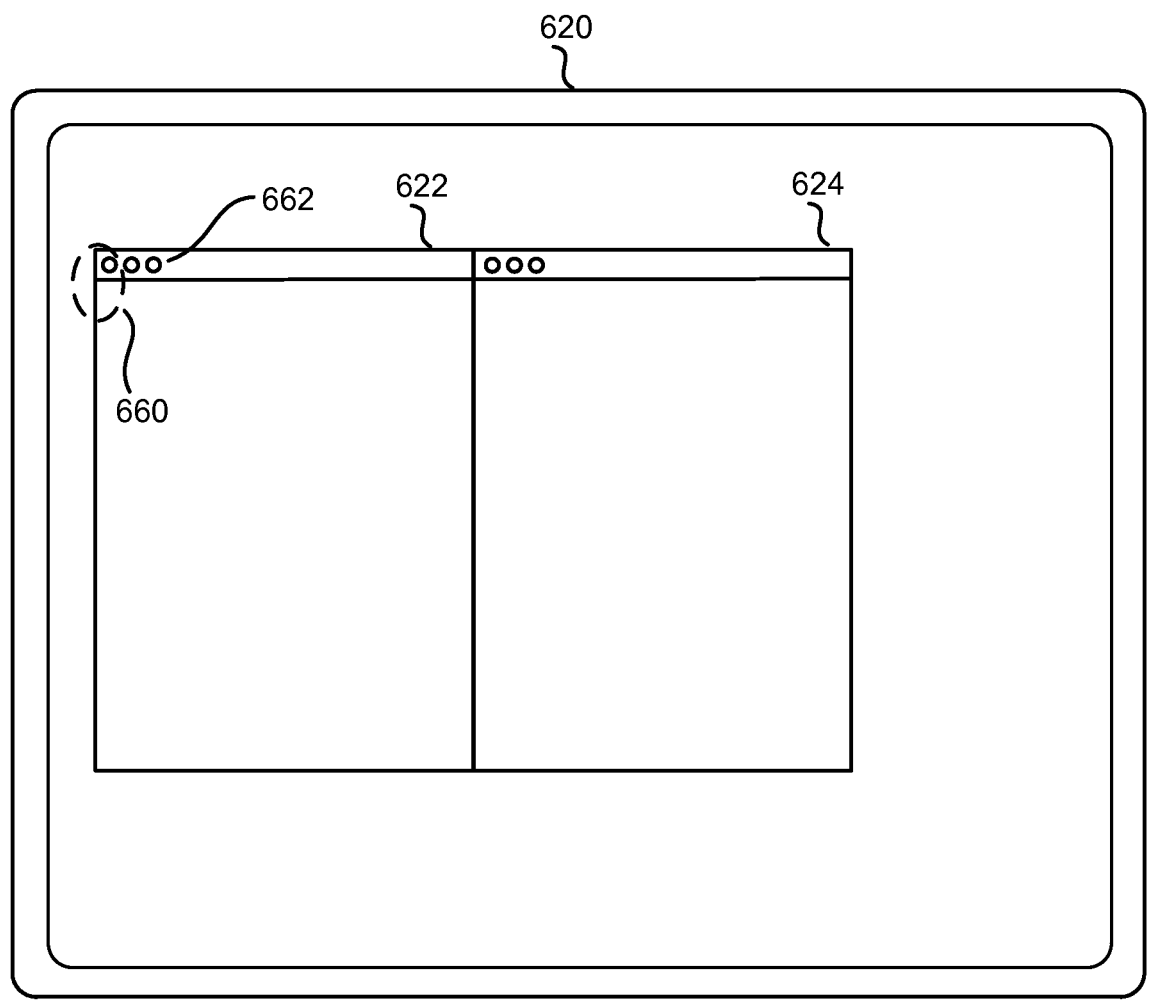
FIG. 6R illustrates an exemplary user interface for linking multiple windows in accordance with some embodiments.

In some embodiments, as shown in FIG. 6R, the electronic device also displays a set of one or more transport controls 662 on the display 620 that are associated with the first window 622. When activated, a transport control within the set 662 affects both the first window 622 and one or more other subordinate windows linked to the first window 622 (e.g., the second window 624 or the third window 642). In some embodiments, the transport control is one element of a group containing a maximize control, a minimize control, a resize control, and a close control. The maximize control invokes a function to increase the dimensions of a corresponding window to fill an area of the display 620 allotted for displaying windows. The minimize control invokes a function to reduce a window to a dock or taskbar. The resize control invokes a function to resize a window to a larger or smaller size. The close control invokes a function to close a window.

Figure 6S:
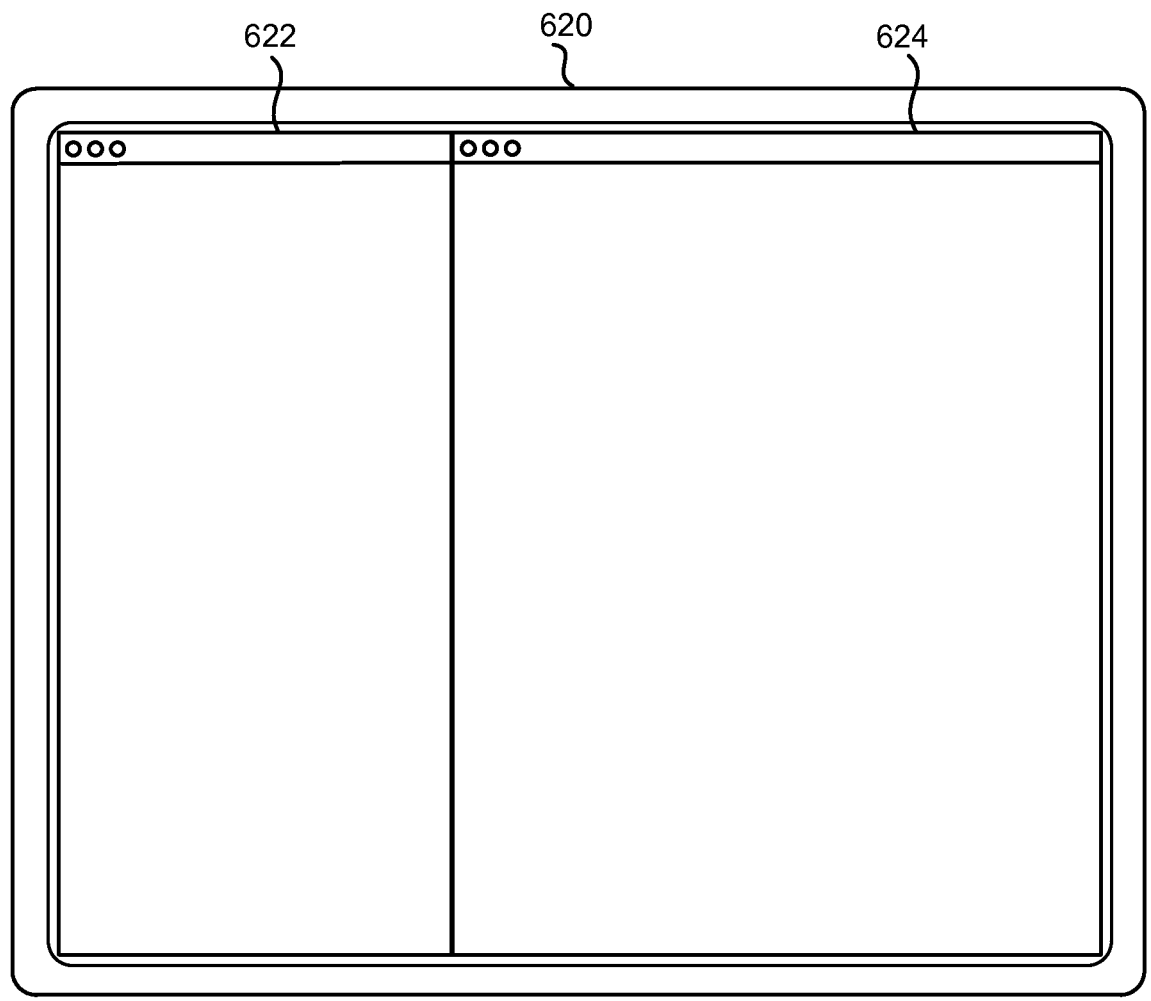
FIG. 6S illustrates an exemplary user interface for linking multiple windows in accordance with some embodiments.
Figure 6T:
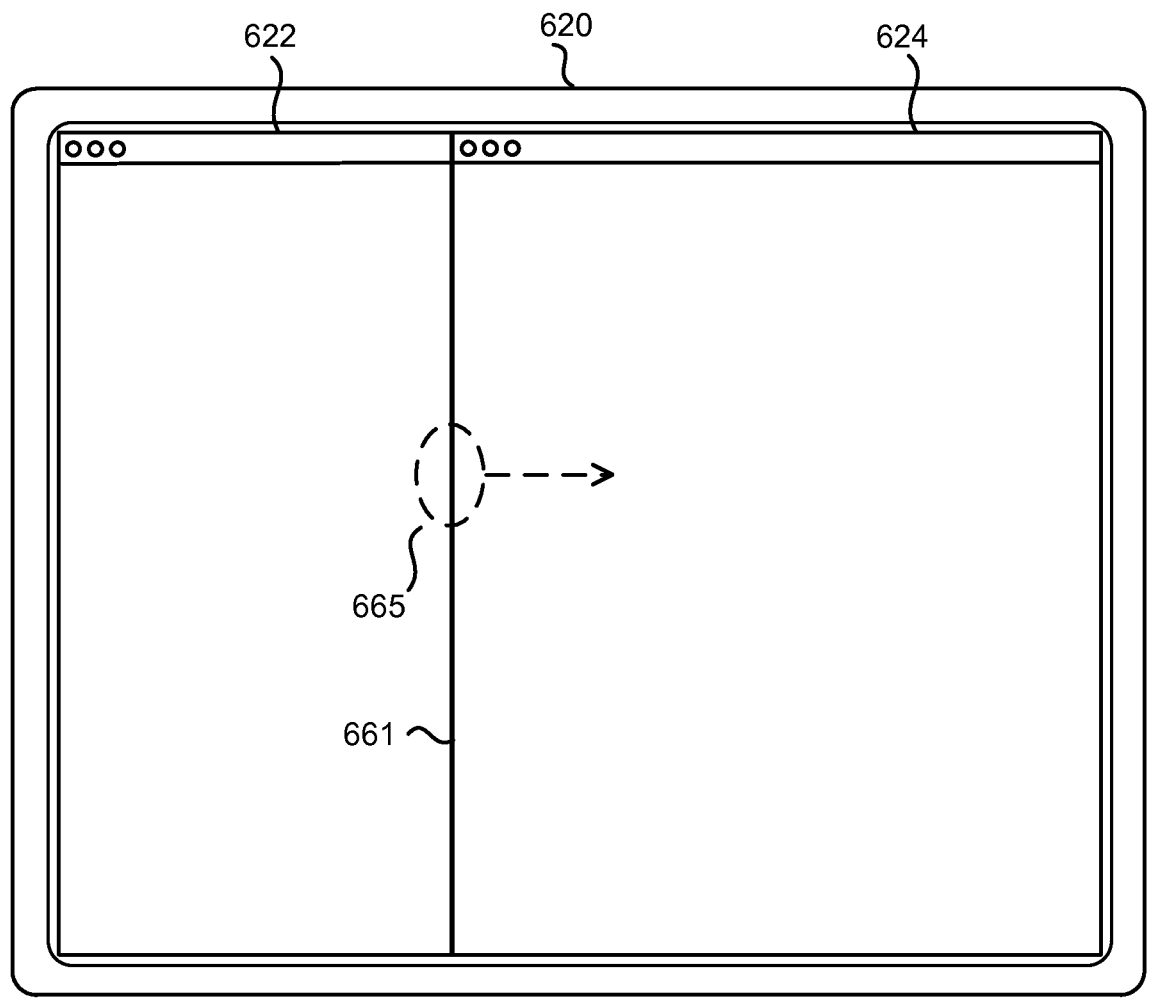
FIG. 6T illustrates an exemplary user interface for linking multiple windows in accordance with some embodiments.
Figure 6U:
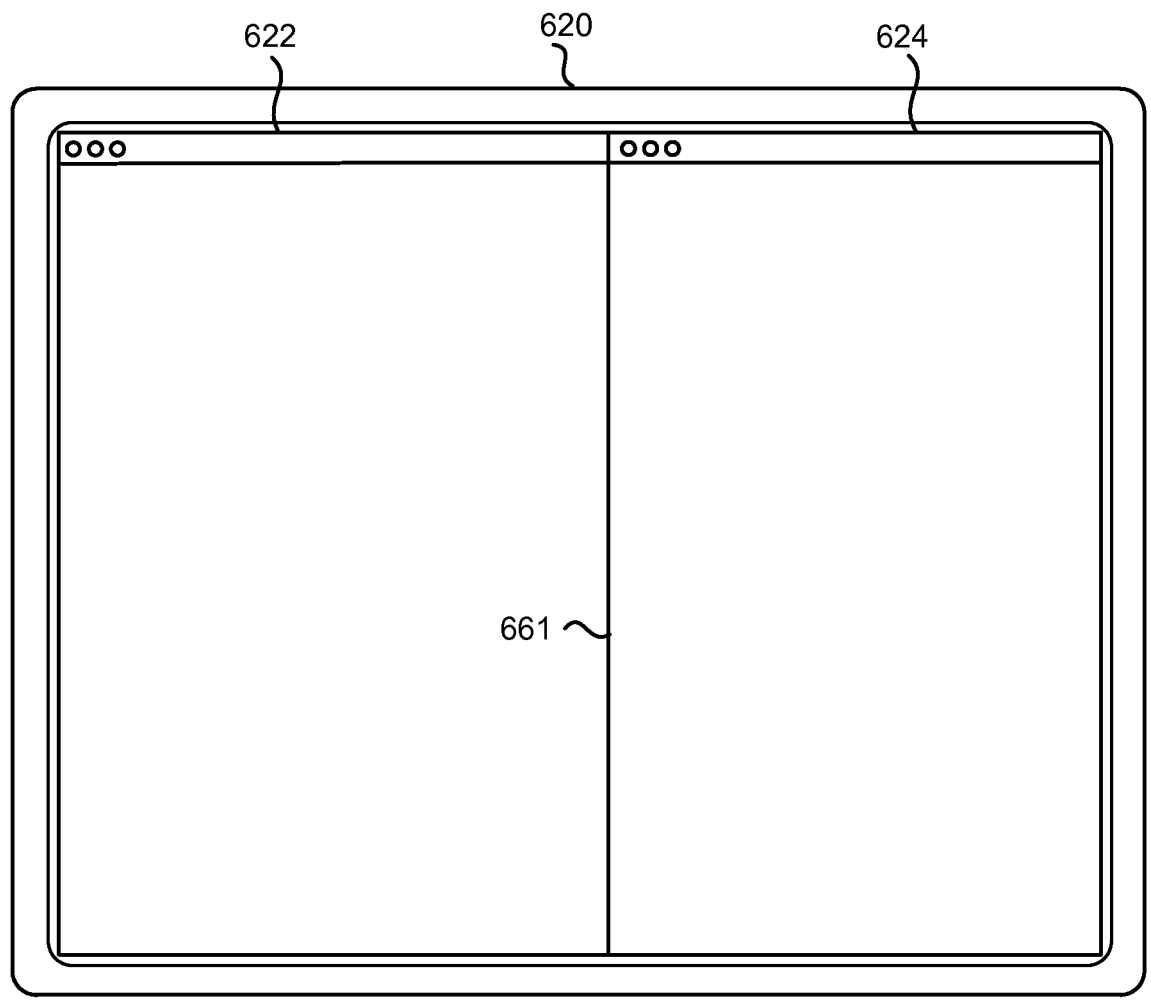
FIG. 6U illustrates an exemplary user interface for linking multiple windows in accordance with some embodiments.

If the transport control is a maximize control, some embodiments of the electronic device detect, with the input device, activation of the transport control. For example, FIG. 6R illustrates a user input 660 at a transport control 662. Responsive to receiving activation of the transport control, the electronic device displays, on the display 620, the first window 622 and the second window 624 fully covering a portion of the display that is designated for display of application windows (as shown in FIG. 6S). Optionally, the portion of the display designated for display of application windows excludes a menu bar or dock (not shown) that is used to display system information of the electronic device. In some embodiments, the electronic device also detects, with the input device, a border-movement request (e.g., a drag) associated with a border 661 between the first window 622 and the second window 624. FIG. 6T illustrates an example border movement request 665. Responsive to receiving the border-movement request, the electronic device moves the border 661 between the first window 622 and the second window 624 such that the first window 622 and the second window 624 are resized, as shown in FIG. 6U. For example, the first window 622 and second window 624 are resized concurrently in response to a single user input.

Figure 6V:
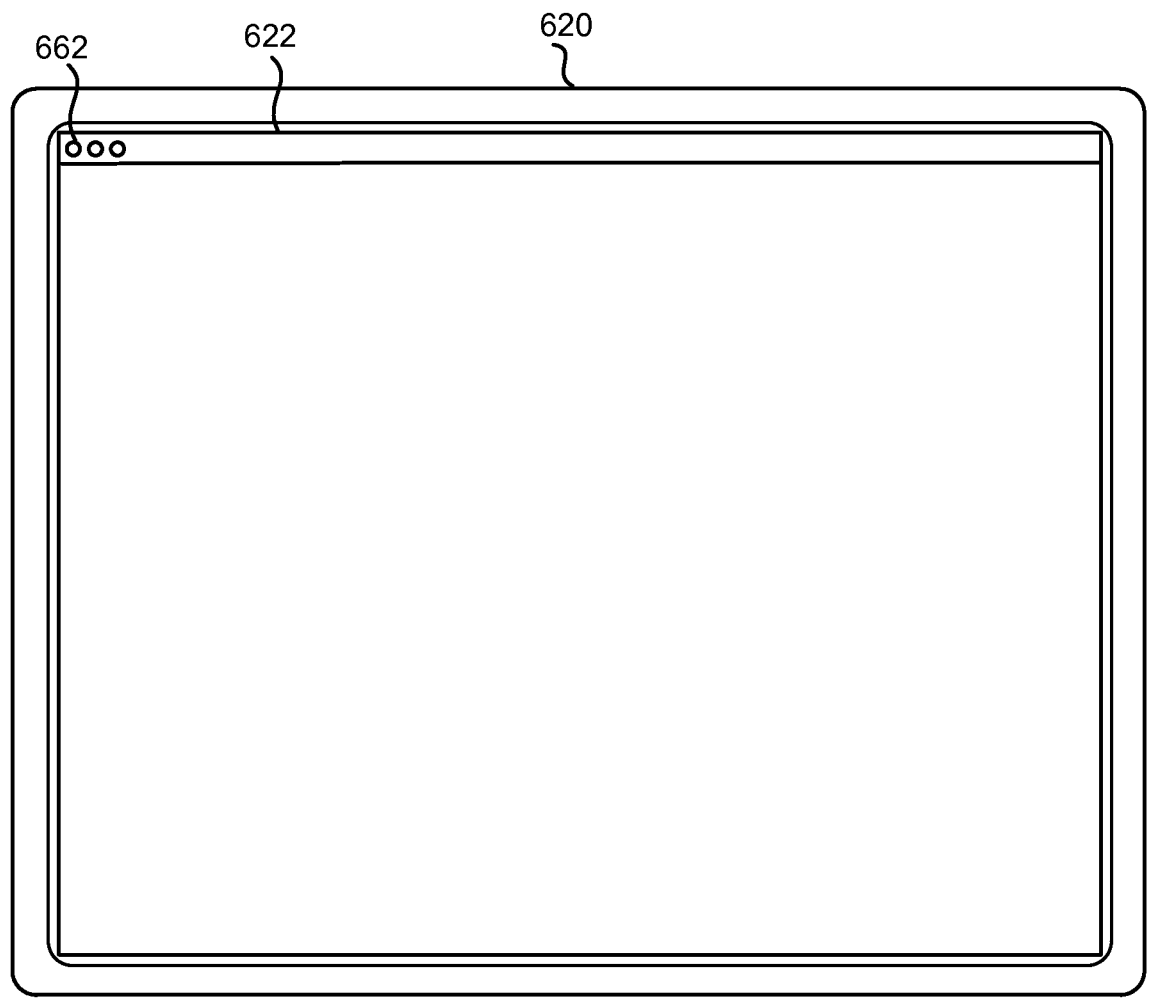
FIG. 6V illustrates an exemplary user interface for linking multiple windows in accordance with some embodiments.

In some embodiments, the electronic device also detects, with the input device, a second activation of the maximize transport control 662. Responsive to receiving the second activation of the transport control 662, the electronic device displays the first window 622 on the display 620 such that the first window 622 fully covers the portion of the display that is designated for display of application windows. For example, FIG. 6V illustrates the first window 622 fully covering the portion of the display 620 designated for displaying application windows in response to a second selection of the transport control 662.

In some embodiments, the first window 622 and one or more other subordinate windows linked to the first window 622 are displayed at a same value of a z-axis. In this case, setting a z-axis value of the first window 622 to a particular value causes a z-axis value of the one or more other windows to be set to the particular value. For example, when the superordinate window is placed above a non-linked window on the desktop (e.g., by the user of the electronic device making the superordinate window an active window when one or more other windows are above it in the z-axis), the subordinate windows are also placed above the non-linked window.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 500 described above with respect to FIG. 5. For example, the windows and transport controls described above with reference to method 500 optionally have one or more of the characteristics of the windows and transport controls described herein with reference to other methods described herein (e.g., methods 700 and 900).

Figure 7:
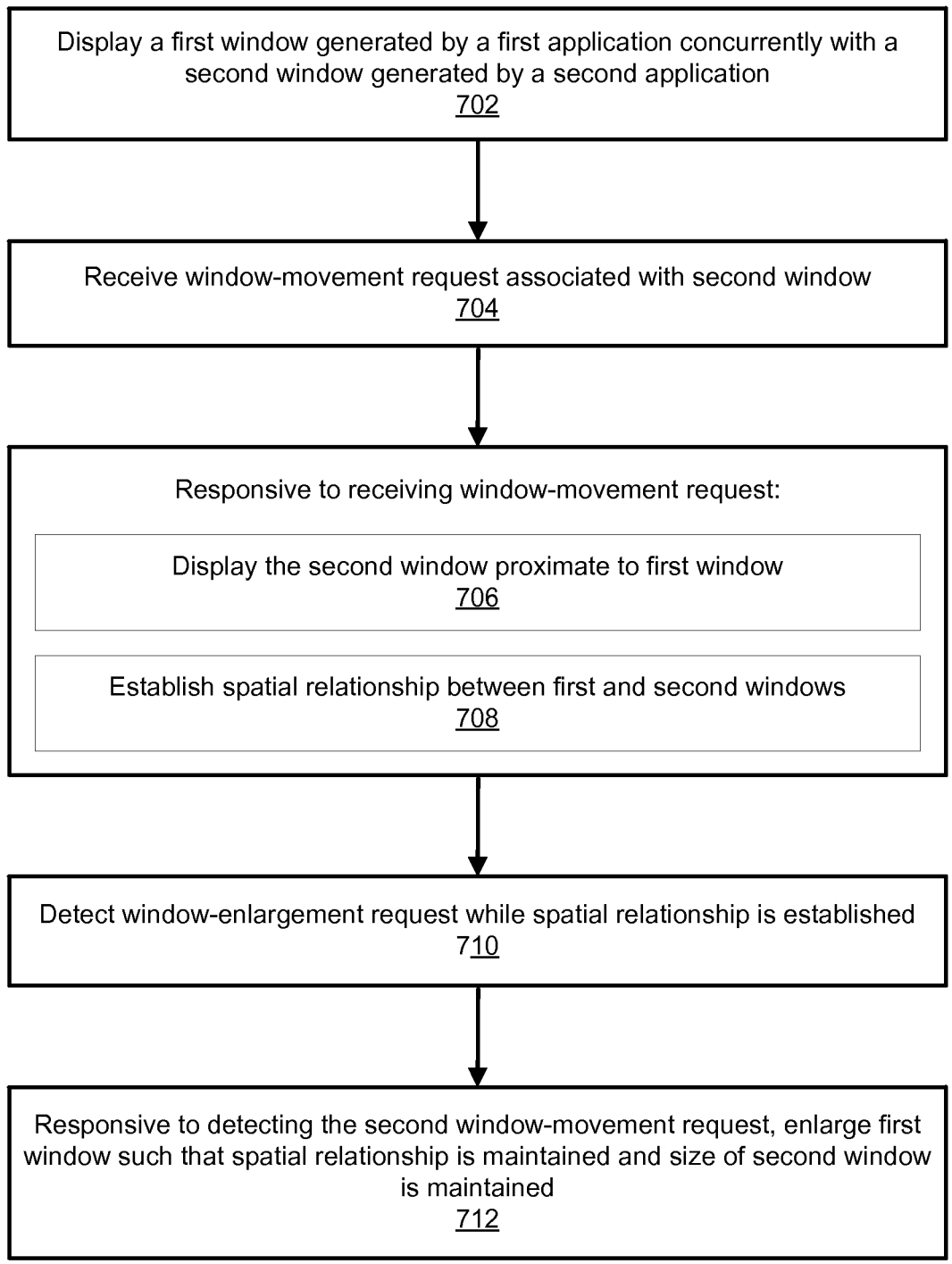
FIG. 7 is a flowchart illustrating an exemplary method for aligning multiple windows in accordance with some embodiments.

FIG. 7 is a flowchart illustrating a method 700 for aligning multiple windows, according to some embodiments. The method 700 is performed at an electronic device with a display and input device, such as the portable multifunction device 100 shown in FIG. 1A or device 300 shown in FIG. 3. Some embodiments of the method 700 may include fewer, additional, or different steps than those shown in FIG. 7, and the steps may be performed in different orders. An example of a user interface that implements the steps of the method 700 is illustrated in FIGS. 8A-8C.

Figure 8A:
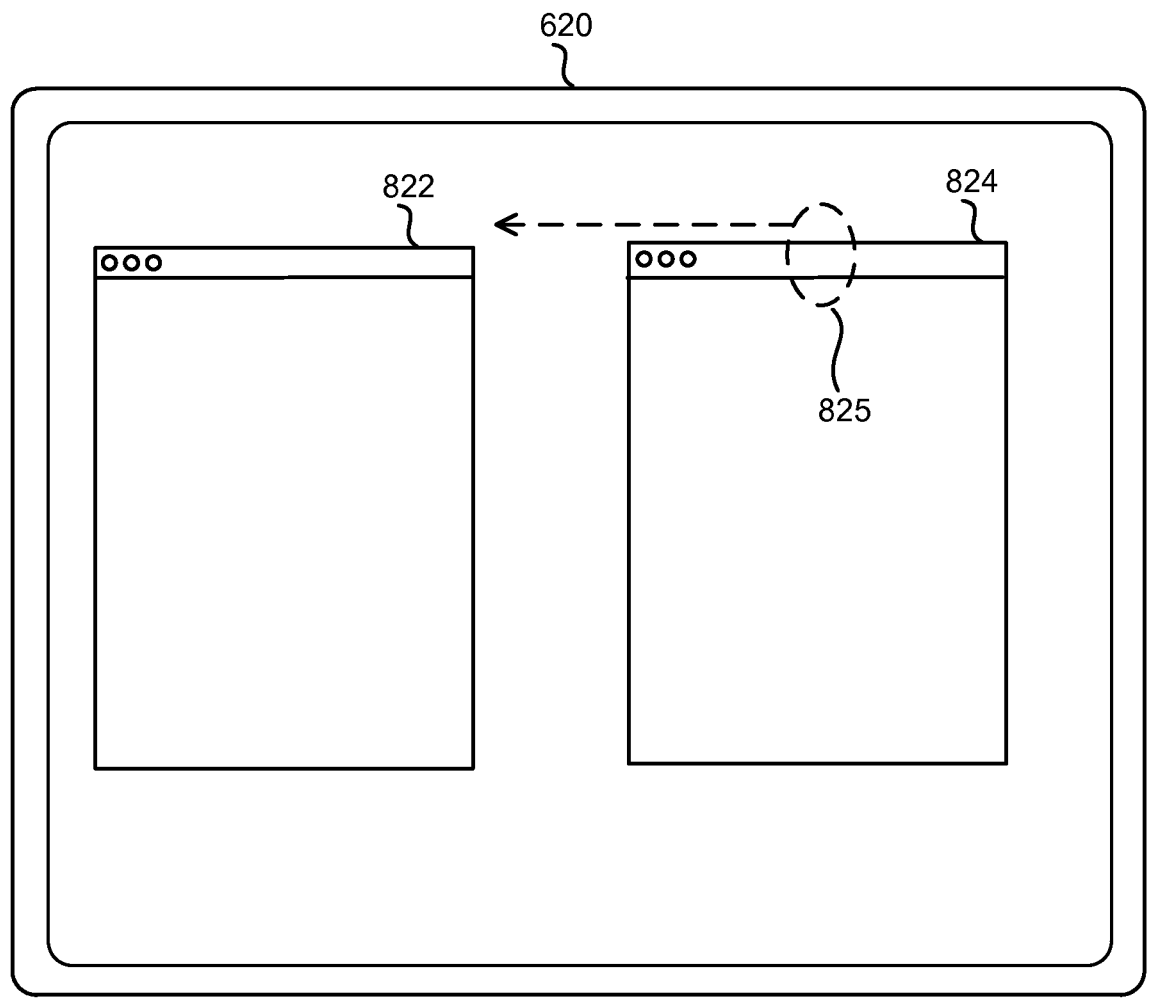
FIG. 8A illustrates an exemplary user interfaces for aligning multiple windows in accordance with some embodiments.

Referring to FIGS. 7 and 8A, the electronic device displays 702 a first window 822 generated by a first application concurrently with a second window 824 generated by a second application, for example on the display 620. The electronic device receives 704 a window-movement request that is associated with the second window 824. For example, the electronic device detects a drag-and-drop input 825 whose beginning corresponds to a location within the second window 824.

Figure 8B:
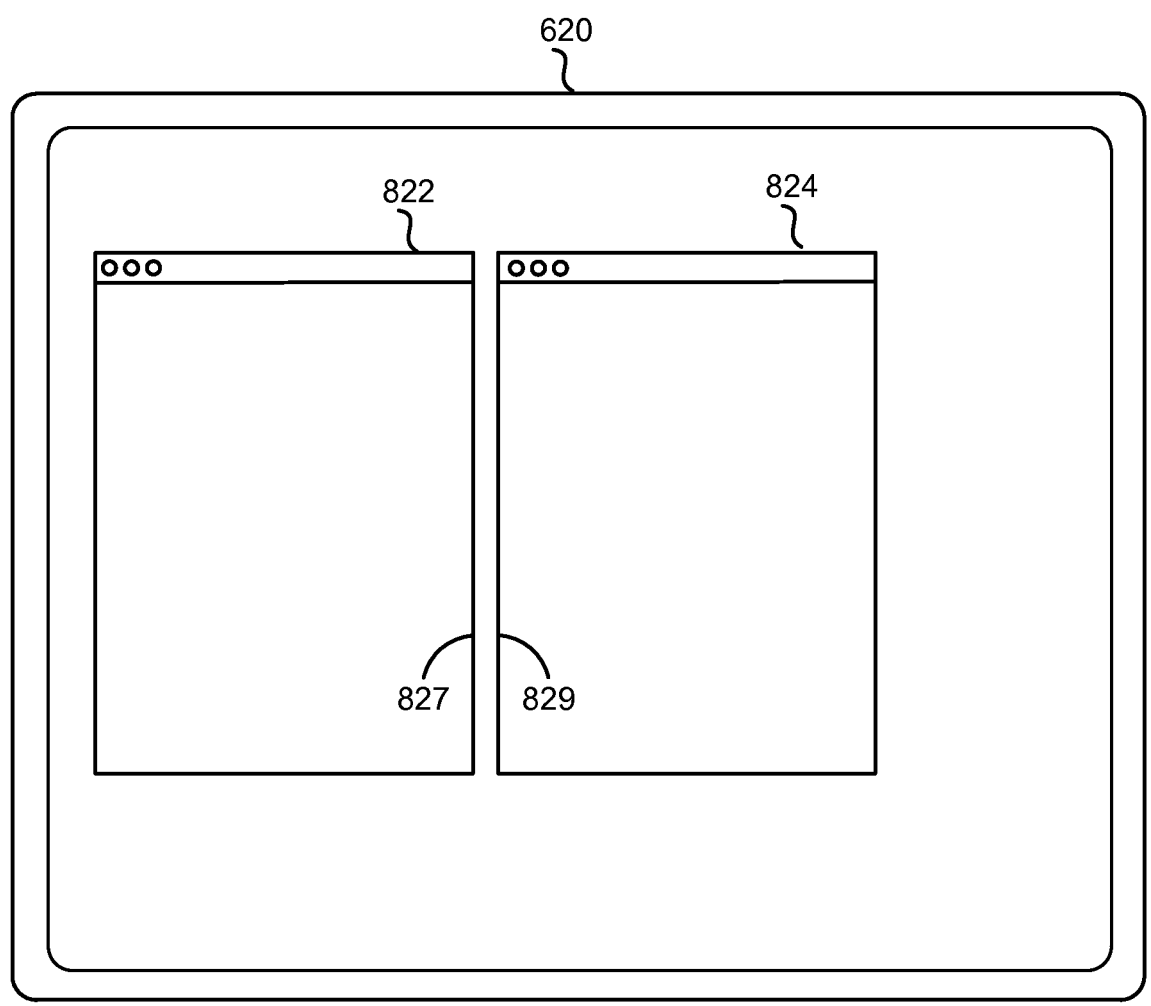
FIG. 8B illustrates an exemplary user interface for aligning multiple windows in accordance with some embodiments.
Figure 8C:
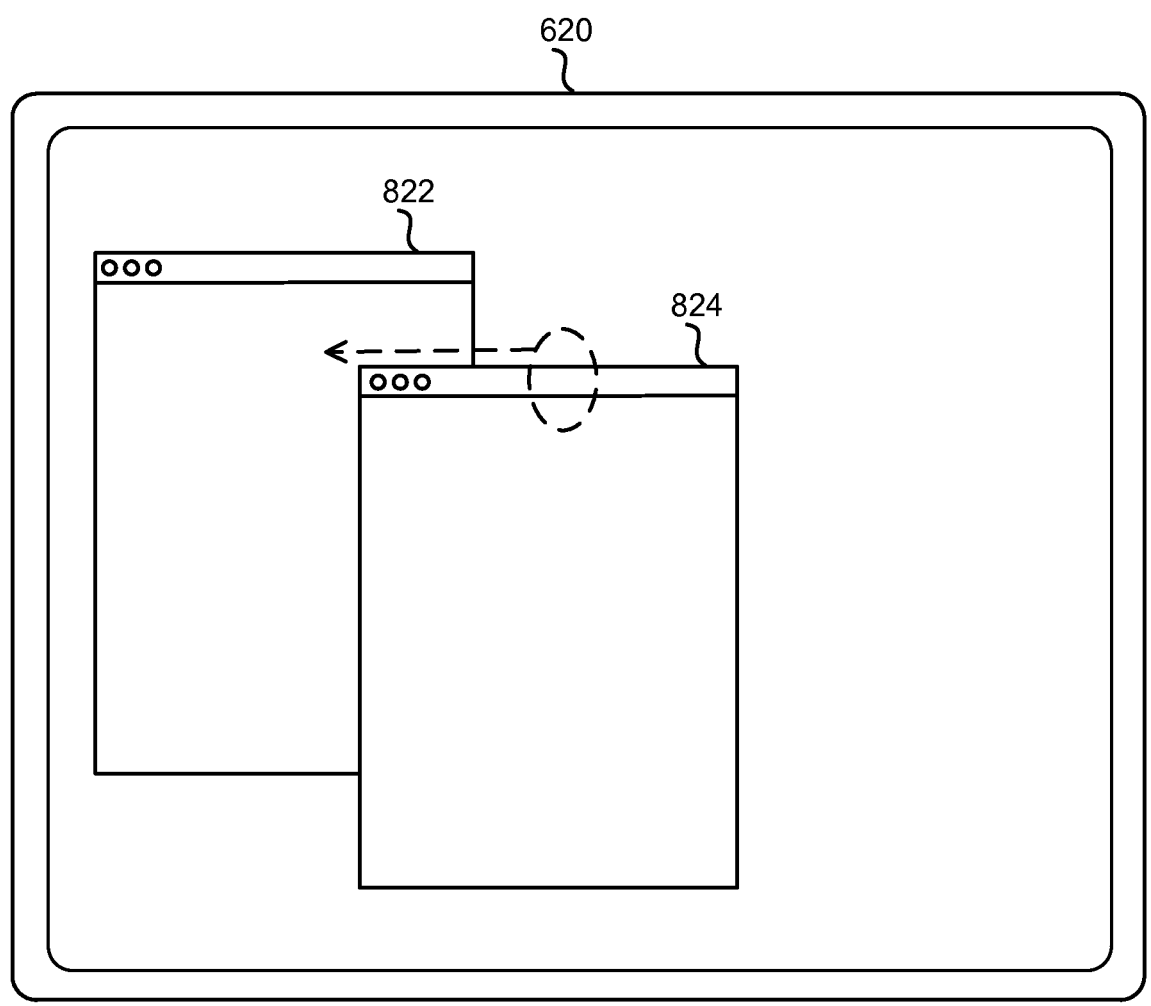
FIG. 8C illustrates an exemplary user interface for aligning multiple windows in accordance with some embodiments.

Responsive to receiving the window-movement request, the electronic device displays 706 the second window 824 proximate to the first window 822, as shown in FIG. 8B. The electronic device also establishes 708 a spatial relationship between the first window 822 and the second window 824. For example, the spatial relationship describes a distance between the first window 822 and the second window 824, such as the distance between an edge 827 of the first window 822 and an adjacent edge 829 of the second window 824. The edges 827 and 829 of the respective windows for which the spatial relationship is defined are referred to herein as the "spatial relationship edges."

In some embodiments, establishing the spatial relationship between the first window 822 and the second window 824 comprises establishing a boundary between the first window 822 and the second window 824. For example, the boundary is the distance between the first window's spatial relationship edge 827 and the second window's spatial relationship edge 829.

In some embodiments, when the spatial relationship is established, the first window 822 and one or more other windows with which the first window has an established spatial relationship (e.g., the second window 824) move independently of each other.

In some embodiments, in response to receiving the window-movement request, the electronic device determines whether the window-movement request exceeds a threshold, such as a speed threshold or a distance threshold. Responsive to determining that the window-movement request exceeds the threshold, the electronic device displays the second window 824 as the second window 824 passes (e.g., overlaps) the first window 822, as shown for example in FIG. 8C. For example, the electronic device does not establish the spatial relationship between the first window 822 and the second window 824 responsive to the window-movement request exceeding the threshold.

Figure 8D:
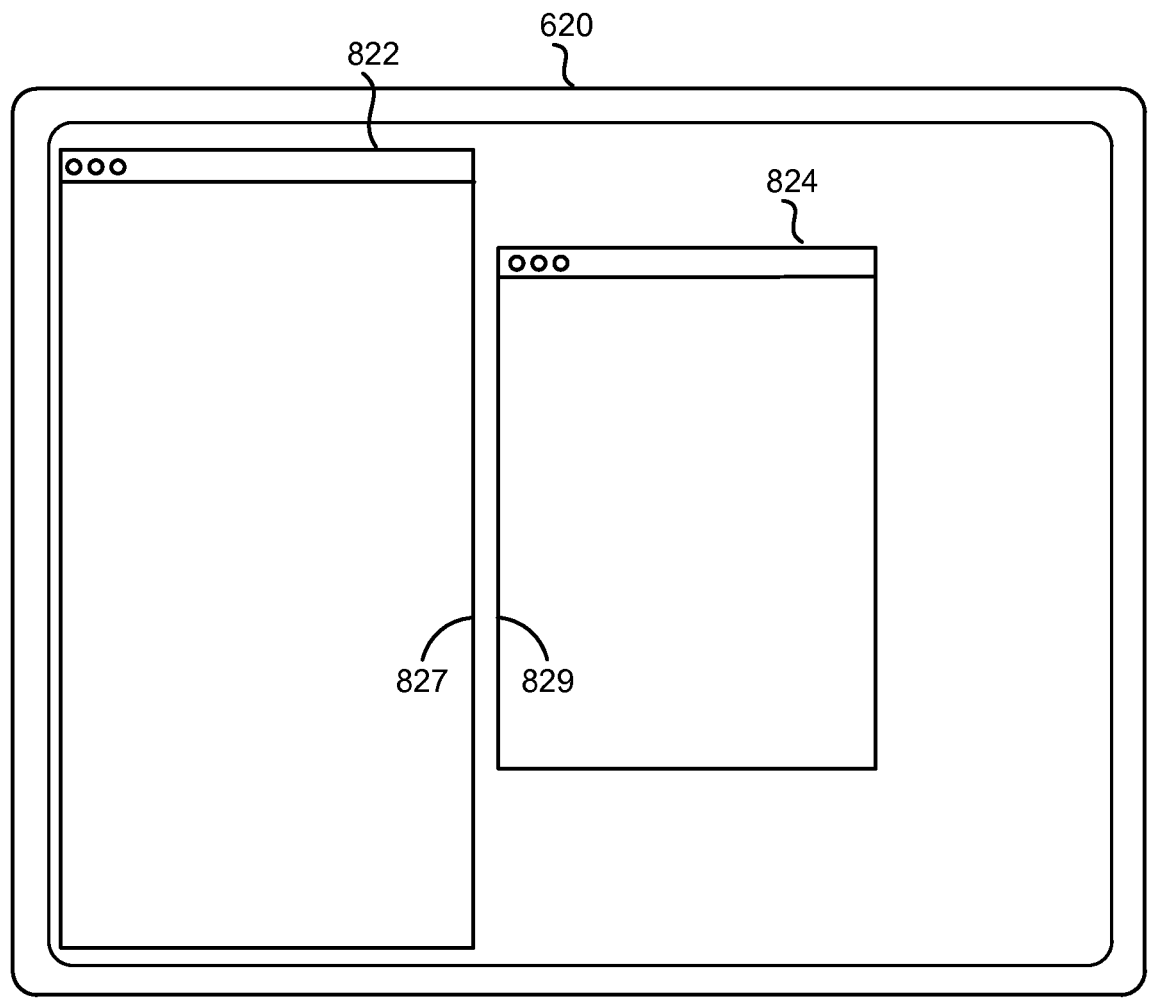
FIG. 8D illustrates an exemplary user interface for aligning multiple windows in accordance with some embodiments.

While the spatial relationship between the first window 822 and the second window 824 is established, the electronic device detects 710 a window-enlargement request. Responsive to receiving the window-enlargement request and in accordance with a determination that the window-enlargement request is associated with the first window 822, the electronic device enlarges 712 the first window 822 such that the spatial relationship between the first window 822 and second window 824 is maintained and a size of the second window 824 is maintained. For example, as shown in FIG. 8D, the electronic device enlarges the first window 822 by moving one or more edges of the first window toward one or more edges of the display 620. The spatial relationship edge 827 of the first window 822 is not moved.

Figure 8E:
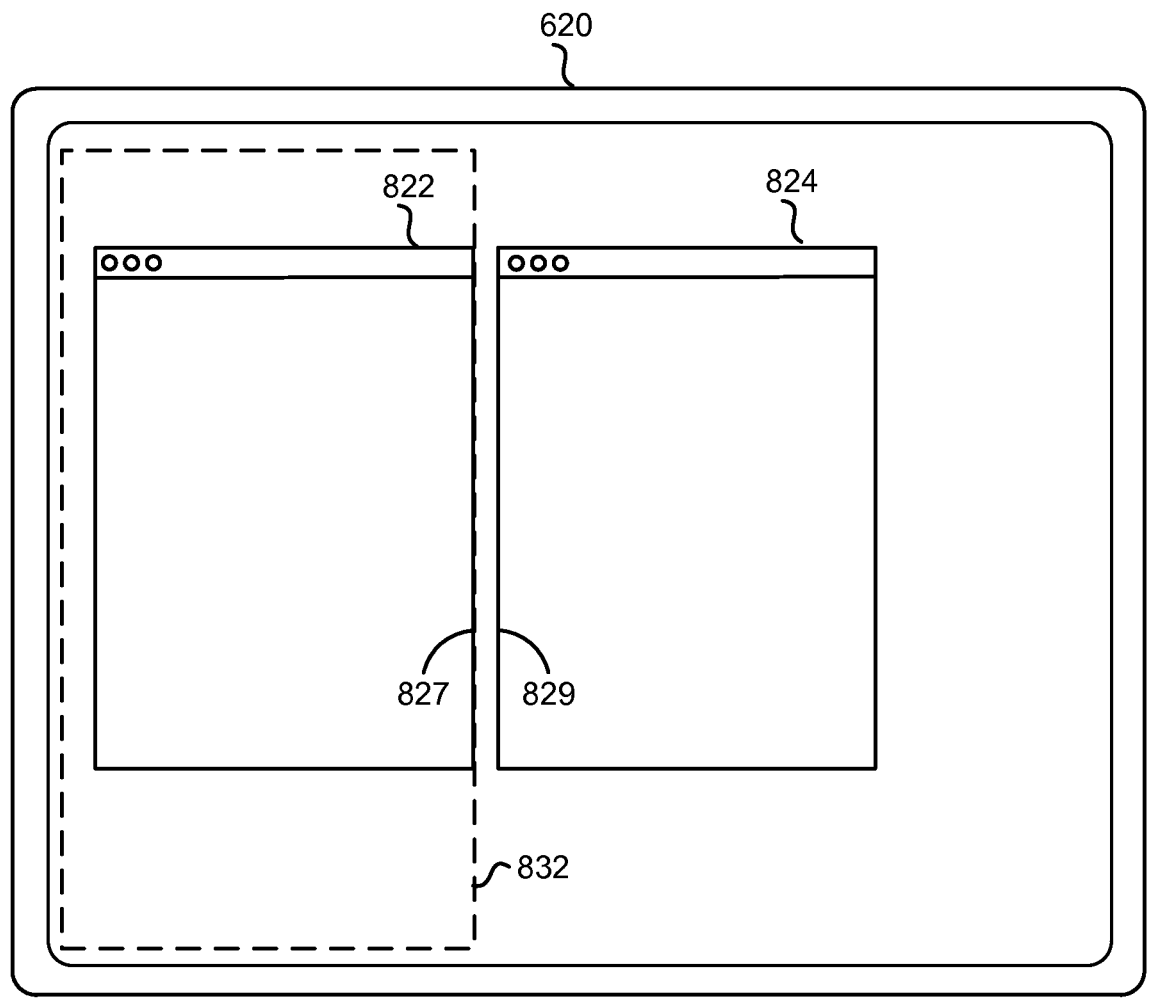
FIG. 8E illustrates an exemplary user interface for aligning multiple windows in accordance with some embodiments.

In some embodiments, receiving 710 the window-enlargement request comprises receiving a first portion of the window-enlargement request. For example, the electronic device detects a drag of an edge of a window toward a boundary, such as an edge of the display 620 or an edge of another window. In response to receiving the first portion of the window-enlargement request, the electronic device displays a preview of the enlargement of the first window 822 that represents an appearance of the first window if enlargement of the first window 822 is confirmed. An example preview 832 is shown in FIG. 8E. When the electronic device detects a second portion of the window-enlargement request, if the second portion is a confirmation input (e.g., a mouse button up or liftoff while the preview is displayed), the electronic device enlarges the first window 822 such that the spatial relationship between the first window 822 and the second window 824 is maintained and the size of the second window 824 is maintained. For example, the electronic device enlarges the first window 822 by moving one or more edges of the first window 822 toward one or more edges of the display 620 without moving the spatial relationship edge 827. If the second portion of the window-enlargement request is a cancellation input (e.g., a mouse button up or liftoff after the preview has ceased to be displayed because the user has dragged away from the boundary), the electronic device cancels the enlargement of the first window 822.

Figure 8F:
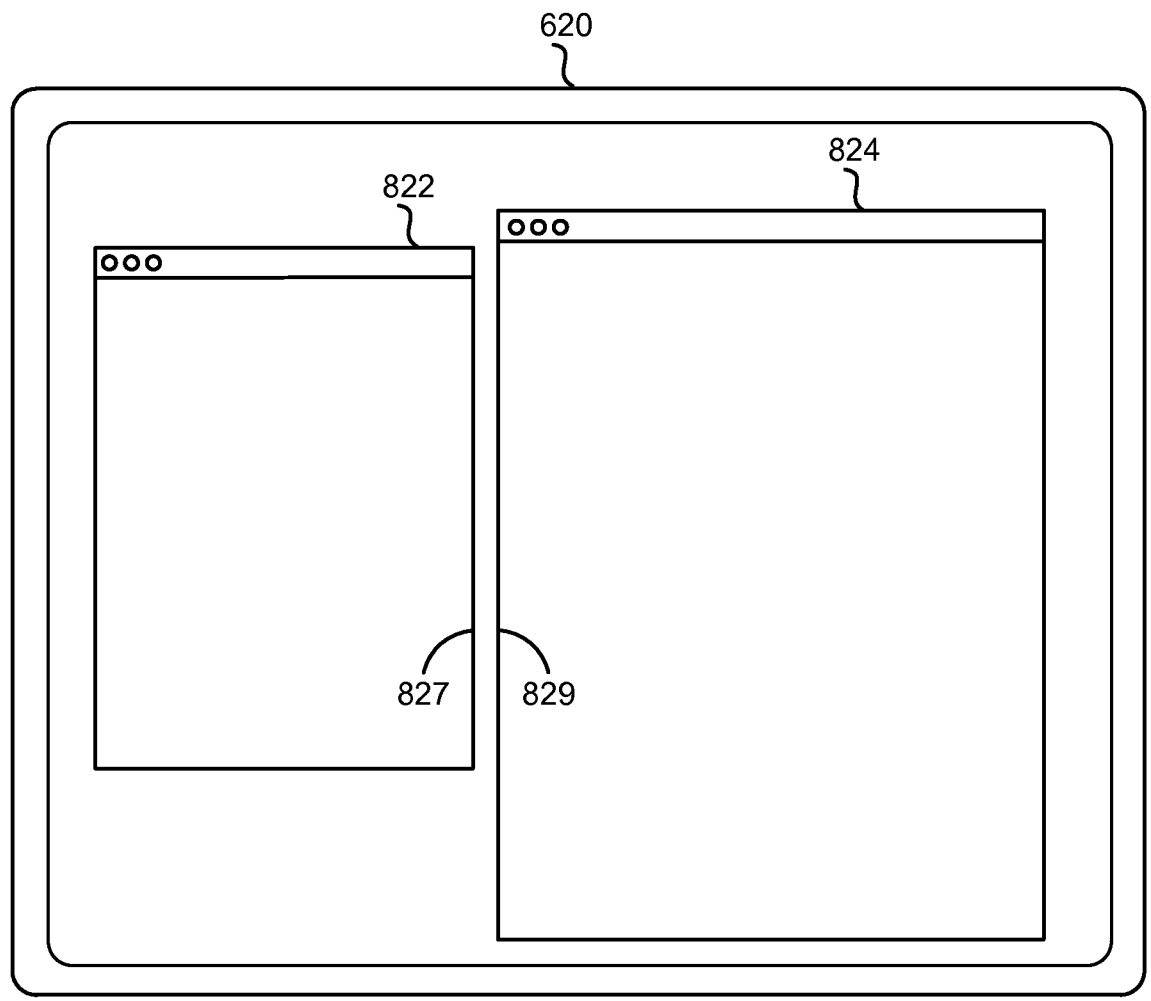
FIG. 8F illustrates an exemplary user interface for aligning multiple windows in accordance with some embodiments.

In accordance with a determination that the window-enlargement request is associated with the second window 824, the electronic device enlarges the second window 824 in response to the window-enlargement request. When enlarging the second window 824, the electronic device maintains the spatial relationship between the first window 822 and the second window 824 and maintains a size of the first window 822. For example, the second window 824 is enlarged by moving one or more edges of the second window 824 toward one or more edges of the display 620 but without moving the spatial relationship edge 829 of the second window 824, as shown for example in FIG. 8F.

In some embodiments, the first window 822 and one or more other windows with which the first window 822 has an established spatial relationship (e.g., the second window 824) are displayed at a same value of a z-axis. If a z-axis value of the first window 822 is set to a particular value, the electronic device causes a z-axis value of the one or more other windows to be set to the particular value. For example, the first window 822 is placed above a non-linked window on the electronic device (e.g., by the user making the first window 822 an active window when one or more other windows are above it in the z-axis), the electronic device also places the second window 824 above the non-linked windows.

Figure 8G:
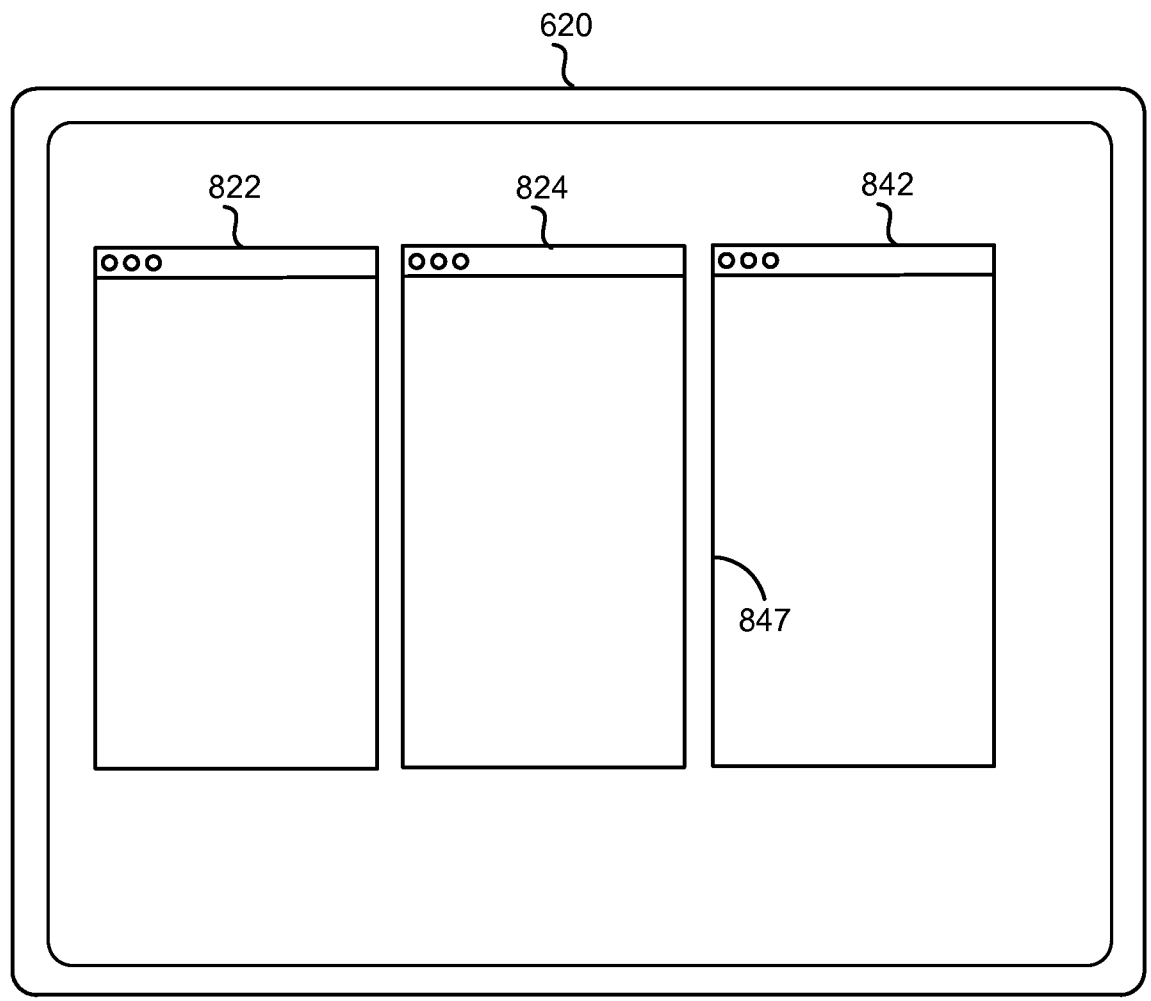
FIG. 8G illustrates an exemplary user interface for aligning multiple windows in accordance with some embodiments.

In some embodiments, the electronic device also displays a third window concurrently with the first window 822 and the second window 824. When the electronic device receives a second window-movement request that is associated with the third window (e.g., a drag-and-drop input whose beginning corresponds to a location within the third window), the electronic device displays the third window proximate to either the first window 822 or the second window 824. An example third window 842 displayed proximate to the second window 824 is shown in FIG. 8G. Alternatively, the electronic device displays the third window proximate to both the first window 822 and the second window 824, such as when the third window 842 is proximate to the right edge of the first window 822 and the bottom edge of the second window 824. The electronic device also establishes a second spatial relationship between the third window 842 and either the first window 822 or the second window 824 (or both). For example, the second spatial relationship describes a distance between the third window 842 and either the first window 822 or the second window 824, such as the distance between an edge 847 of the third window (a "spatial relationship edge") and an adjacent spatial relationship edge of the first window 822 or the second window 824.

Figure 8H:
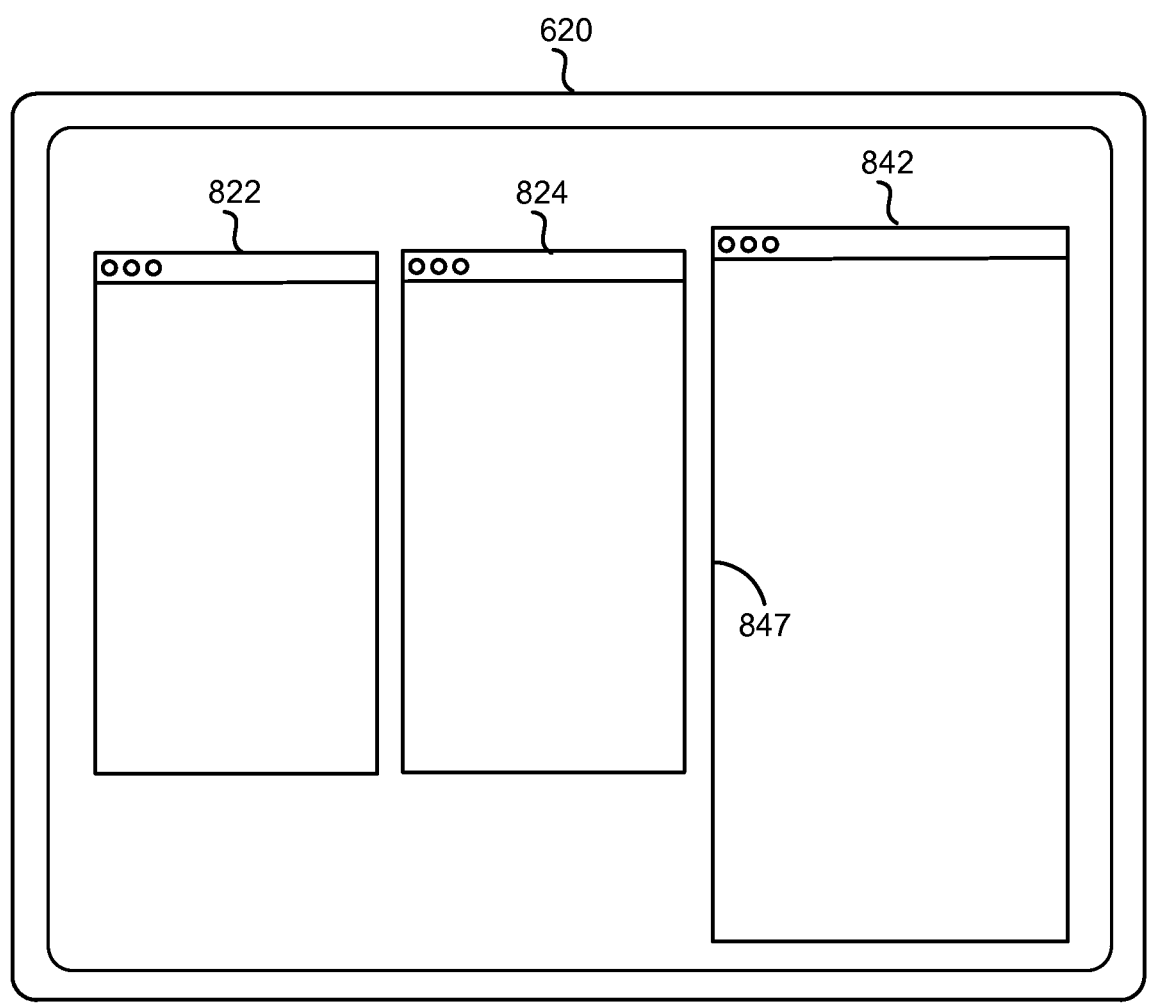
FIG. 8H illustrates an exemplary user interface for aligning multiple windows in accordance with some embodiments.

While the second spatial relationship is established, if the electronic device detects a second window-enlargement request that is associated with the third window 842, the electronic device enlarges the third window such that the second spatial relationship is maintained, the spatial relationship between the first window 822 and the second window 824 is maintained, and the size of the second window 824 is maintained (as shown, for example, in FIG. 8H). For example, the electronic device enlarges the third window 842 by moving one or more edges of the third window 842 toward one or more edges of the display 620 without moving the spatial relationship edge 847 of the third window 842.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 500 and 900) are also applicable in an analogous manner to method 700 described above with respect to FIG. 7. For example, the windows and transport controls described above with reference to method 700 optionally have one or more of the characteristics of the windows and transport controls described herein with reference to other methods described herein (e.g., methods 500 and 900).

Figure 9:
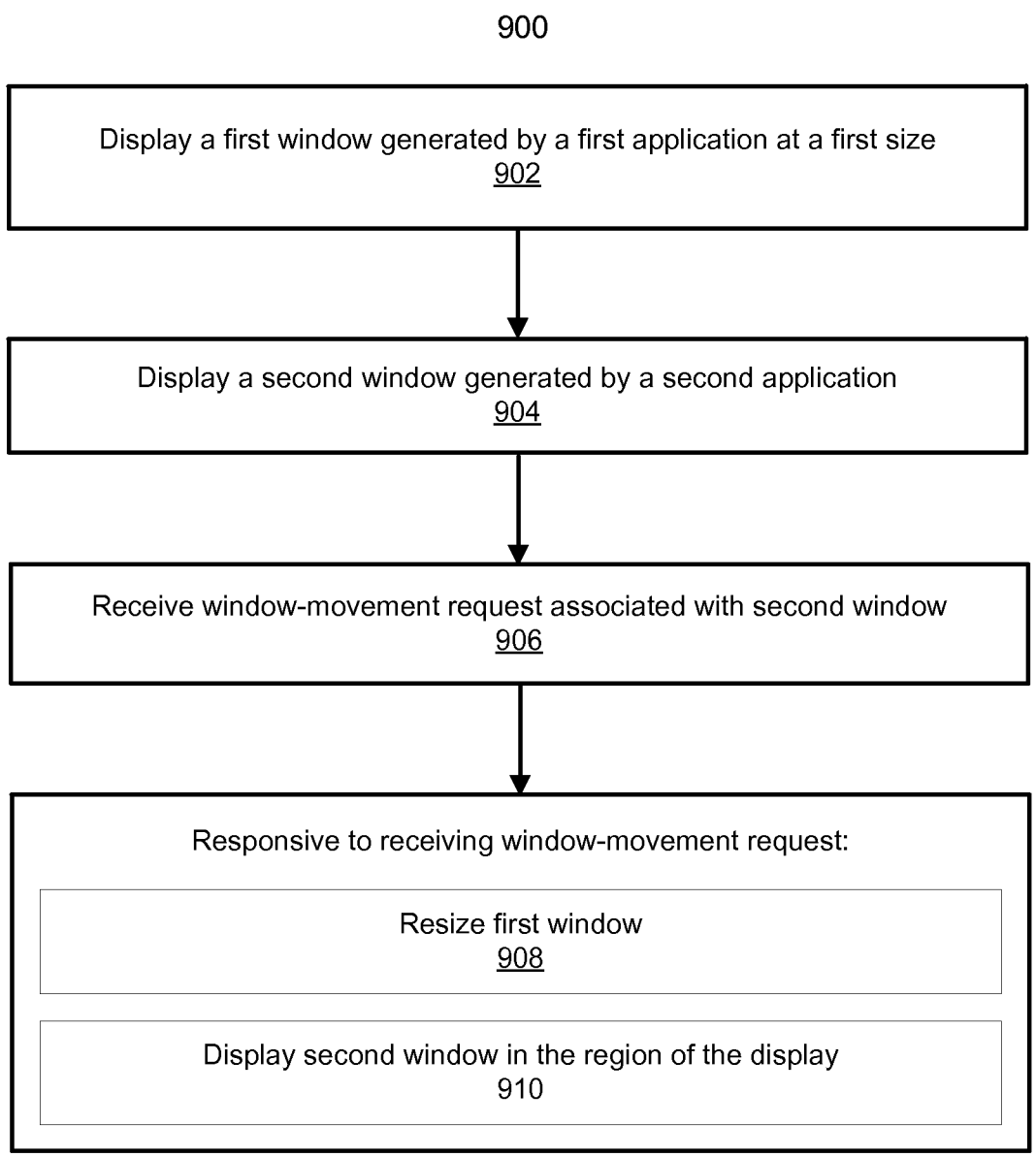
FIG. 9 is a flowchart illustrating an exemplary method for displaying multiple windows in a specified region of a display in accordance with some embodiments.

FIG. 9 is a flowchart illustrating a method 900 for displaying multiple windows in a specified region of a display, according to some embodiments. The method 900 is performed at an electronic device with a display and input device, such as the portable multifunction device 100 shown in FIG. 1A or device 300 shown in FIG. 3. Some embodiments of the method 900 may include fewer, additional, or different steps than those shown in FIG. 9, and the steps may be performed in different orders. An example of a user interface that implements the steps of the method 900 is illustrated in FIGS. 10A-10C.

Figure 10A:
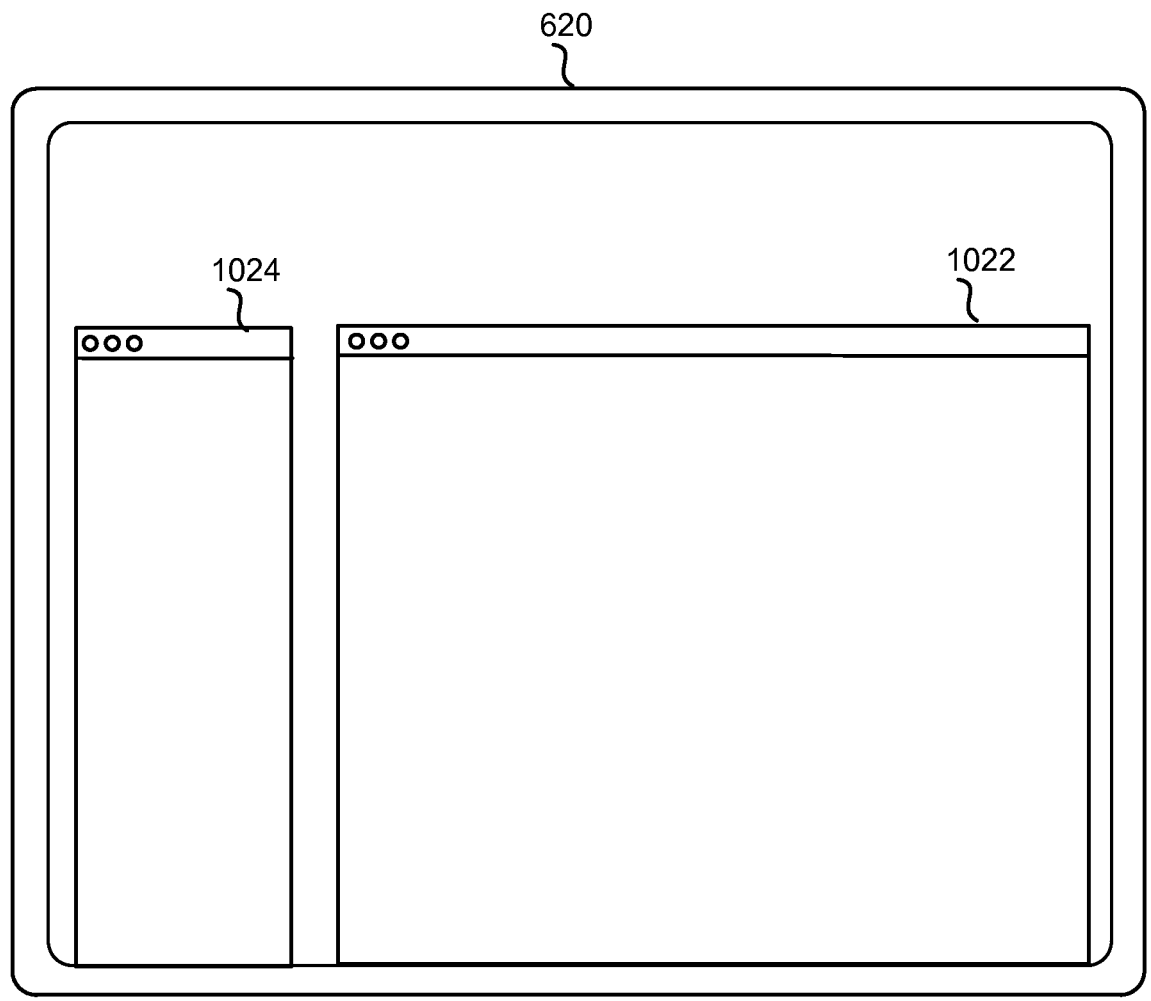
FIG. 10A illustrates an exemplary user interface for displaying multiple windows in a specified region of a display in accordance with some embodiments.
Figure 10B:
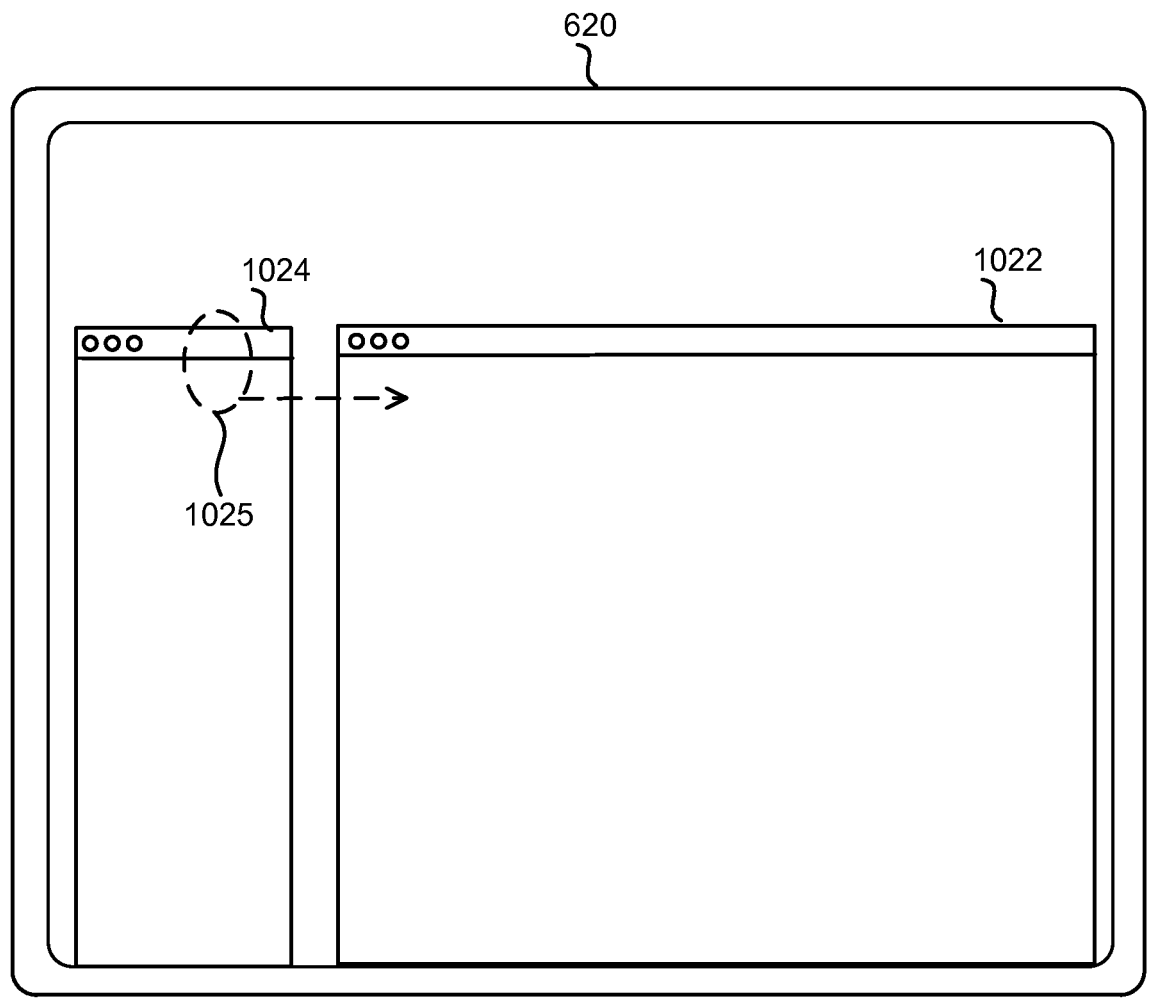
FIG. 10B illustrates an exemplary user interface for displaying multiple windows in a specified region of a display in accordance with some embodiments.
Figure 10C:
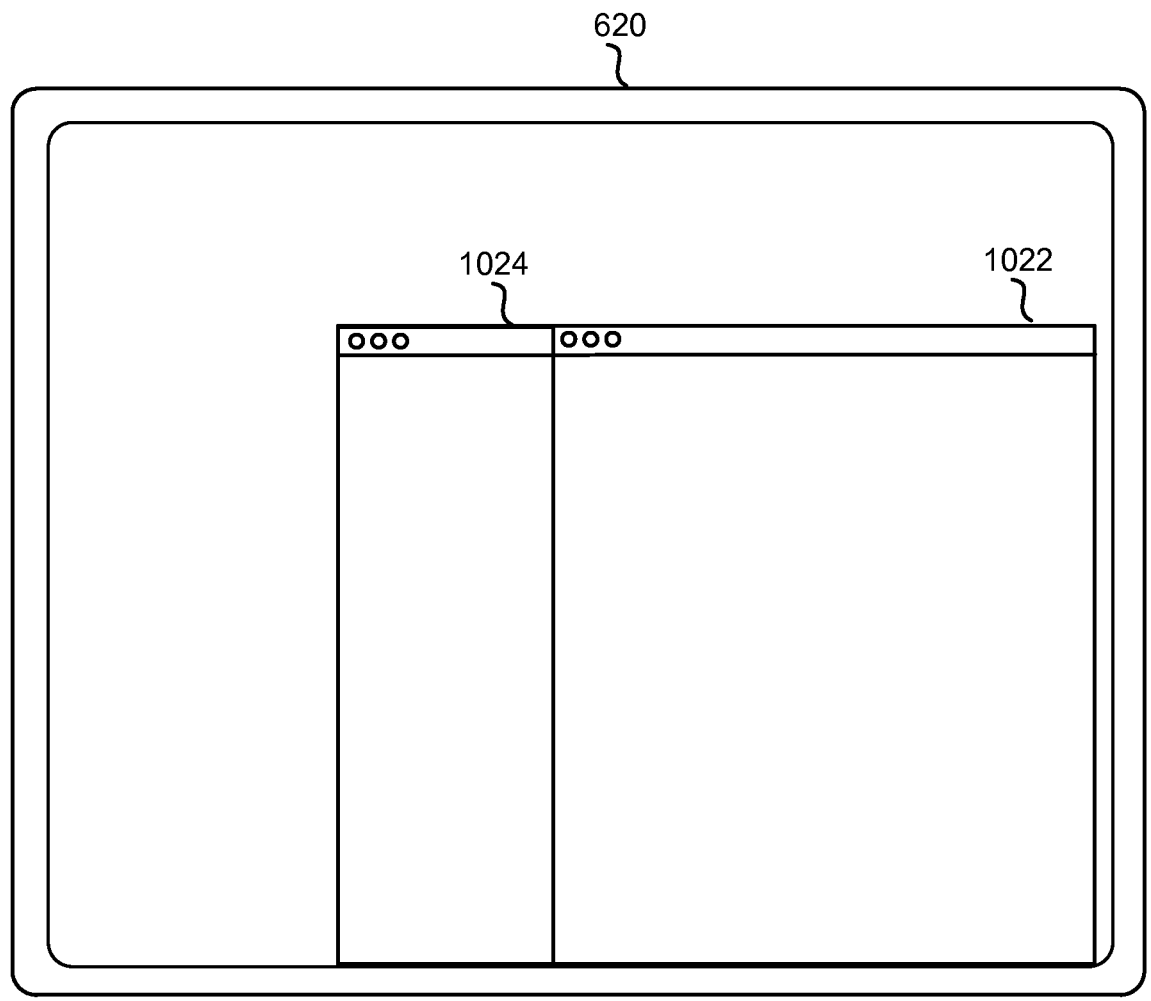
FIG. 10C illustrates an exemplary user interface for displaying multiple windows in a specified region of a display in accordance with some embodiments.

Referring to FIGS. 9 and 10A, the electronic device displays 902 a first window 1022 generated by a first application at a first size such that the first window 1022 occupies a region of the display 620. For example, the region is the entire display (optionally omitting a menu bar or dock providing system information), such that the first size is a full-screen size. Alternatively, as shown in FIG. 10A, the region is a portion of the display 620. While displaying the first window 1022 at the first size, the electronic device displays 904 a second window 1024 generated by a second application concurrently with the first window 1022. For example, the electronic device displays the second window 1024 overlaid on the first window 1022 or outside of the region of the display 620 occupied by the first window 1022.

The electronic device receives 906 a window-movement request associated with the second window 1024. For example, as shown in FIG. 10B, the electronic device receives a drag-and-drop input 1025 whose beginning corresponds to a location within the second window 1024. In response to receiving the window-movement request, the electronic device determines whether the window-movement request meets a window resizing criterion. In some embodiments, the window-movement request meets the window-resizing criterion when the second window 1024 is dragged to an edge of the region of the display 620 occupied by the first window 1022 and dropped.

In accordance with a determination that the window-movement request meets the window-resizing criterion, the electronic device resizes 908 the first window 1022 in response to receiving the window-movement request. The electronic device also displays 910 the second window 1024 in the region of the display 620 occupied by the first window 1022. For example, as shown in FIG. 10C, the electronic device displays the second window 1024 adjacent to the resized first window 1022 without overlapping the first window 1022, thus forming an arrangement of the first window 1022 and the second window 1024 that fills the region of the display 620 previously occupied by the first window 1022. In some embodiments, if the region of the display 620 previously occupied by the first window 1022 is the entirety of the display 620, the electronic device resizes 908 the first window and displays 910 the second window 1024 in the region of the display by displaying the first window 1022 and the second window 1024 in a full-screen arrangement. In some embodiments, to display the second window 1024 in the region of the display 620, the electronic device resizes the second window 1024. For example, the electronic device reduces the size of the first window 1022 to accommodate displaying the second window 1024 in the region of the display 620 and increases the size of the second window 1024.

In some embodiments, to resize the first window 1022 and display the second window 1024 in the region of the display, the electronic device determines whether to divide the region of the display 620 vertically or horizontally depending on to which edge of the region of the display 620 is dragged.

Figure 10D:
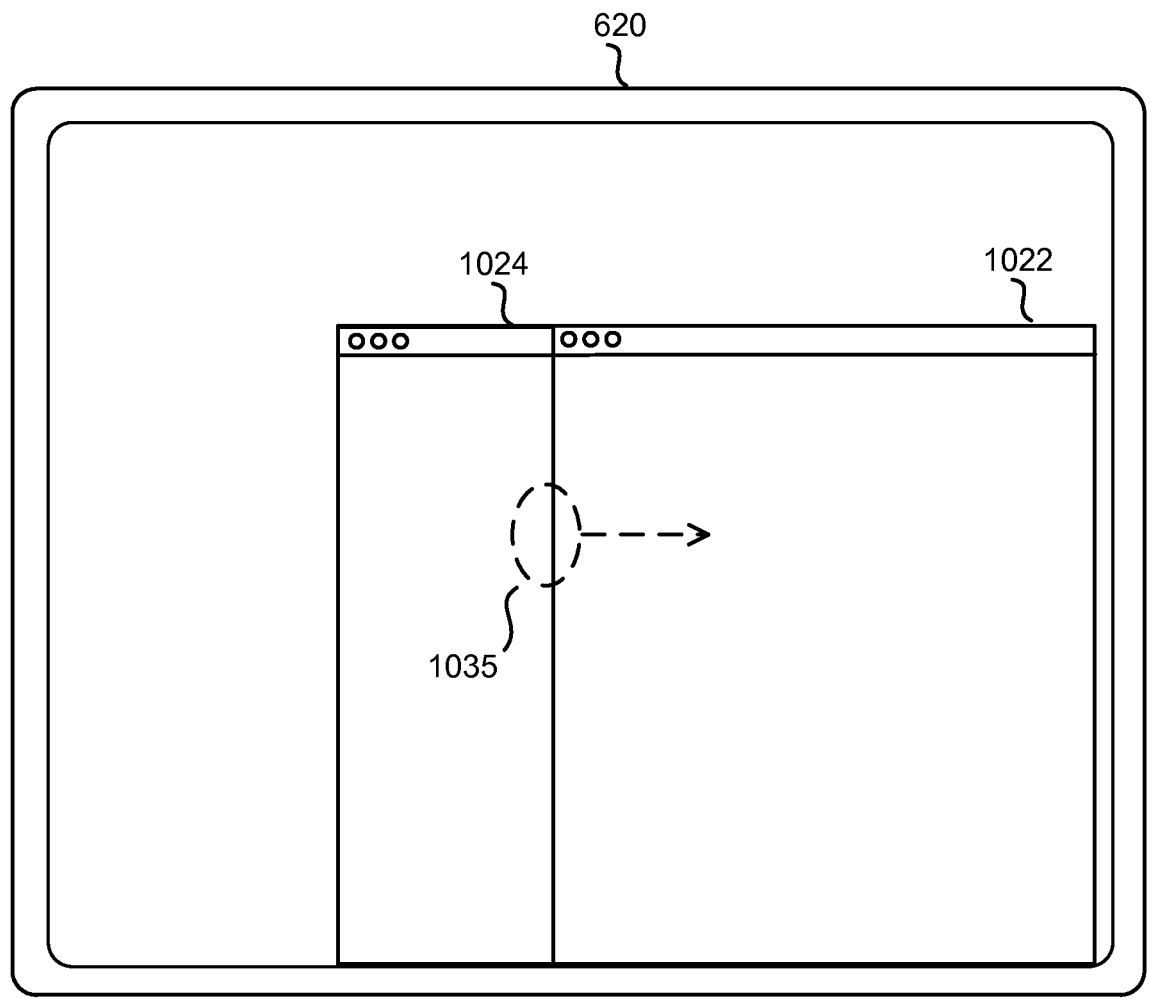
FIG. 10D illustrates an exemplary user interface for displaying multiple windows in a specified region of a display in accordance with some embodiments.
Figure 10E:
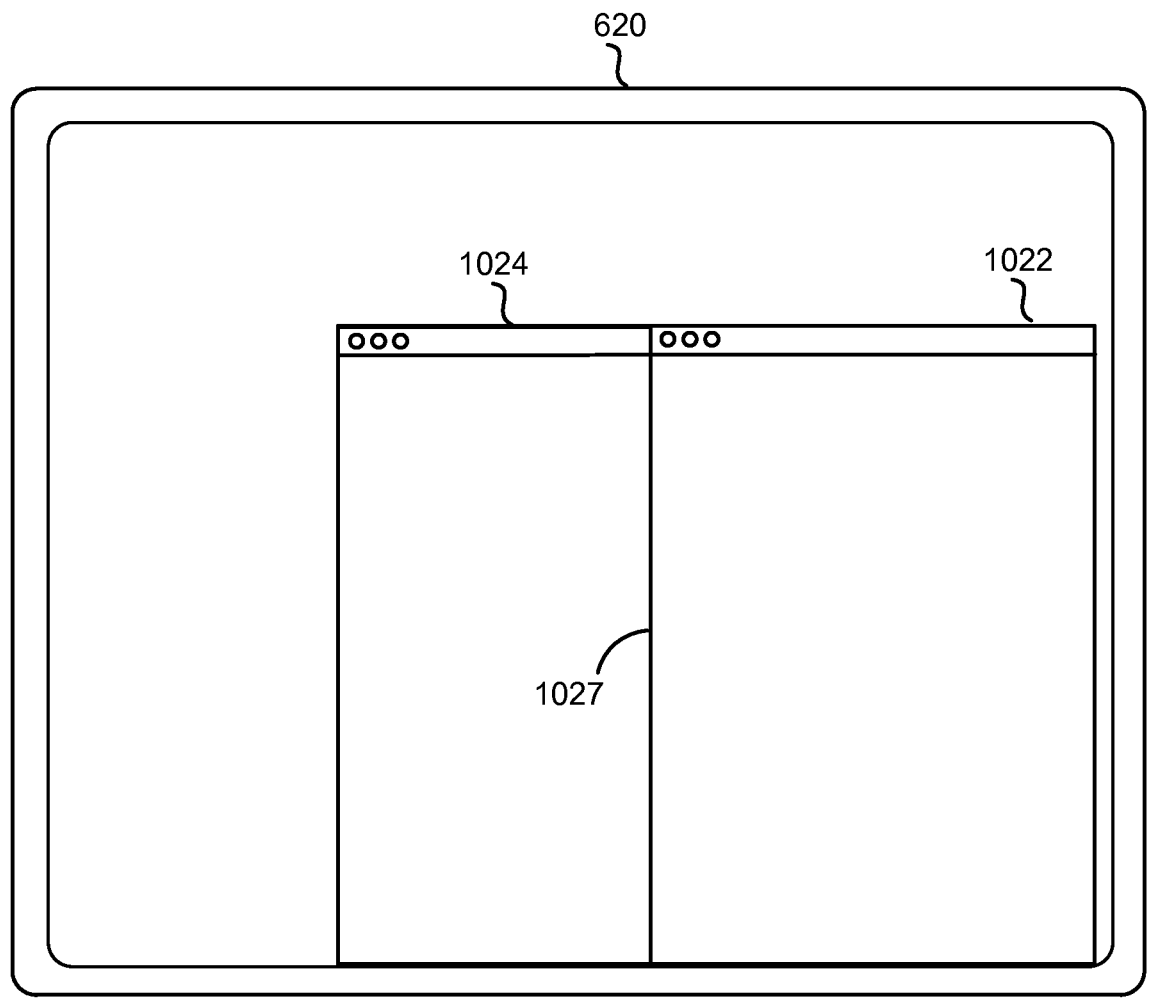
FIG. 10E illustrates an exemplary user interface for displaying multiple windows in a specified region of a display in accordance with some embodiments.

In some embodiments, if the electronic device detects a boundary-movement request (e.g., a drag) associated with a boundary between the first window 1022 and the second window 1024, the electronic device moves the boundary such that the first window 1022 and the second window 1024 are resized. For example, the electronic device resizes multiple windows concurrently in response to a single user input without further user input. FIG. 10D illustrates an example boundary-movement request 1035, and FIG. 10E illustrates the boundary 1027 between the first window 1022 and second window 1024 moved in response to the boundary-movement request 1035.

In some embodiments, if the window-movement request does not meet the window-resizing criterion, the electronic device maintains the first window 1022 at the first size and moves the second window 1024 (e.g., without overlapping the first window 1022).

Figure 10F:
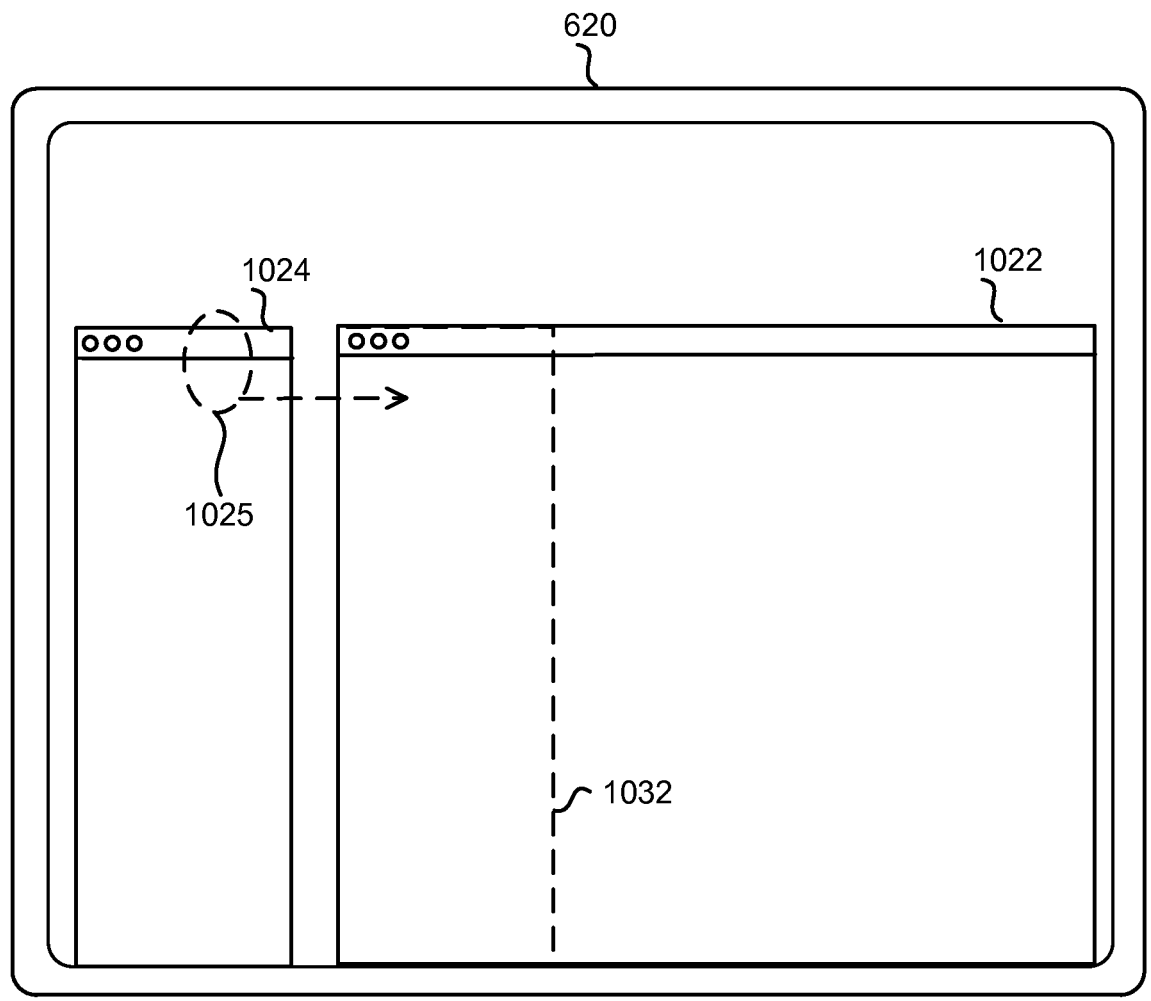
FIG. 10F illustrates an exemplary user interface for displaying multiple windows in a specified region of a display in accordance with some embodiments.

In some embodiments, receiving the window-movement request comprises receiving a first portion of the window-movement request. For example, the electronic device detects a drag of the second window 1024. In response to receiving the first portion of the window-movement request, the electronic device displays a preview of the movement of the second window 1024 that represents an appearance of the second window 1024 if movement of the second window 1024 is confirmed. An example preview 1032 is shown in FIG. 10F. When the electronic device detects a second portion of the window-movement request, if the second portion of the request is a confirmation input (e.g., a mouse button up or liftoff while the preview is displayed), the electronic device resizes the first window 1022 and displays the second window 1024 in the region of the display 620. For example, the electronic device displays the second window 1024 adjacent to the first window 1022 without overlapping the first window 1022, thereby forming the arrangement of the first window 1022 and the second window 1024. Alternatively, if the second portion of the window-movement request is a cancellation input (e.g., a mouse button up or liftoff after the previous has ceased to be displayed because the user dragged away from a boundary of the region of the display 620), the electronic device cancels the movement of the second window 1024.

Figure 10G:
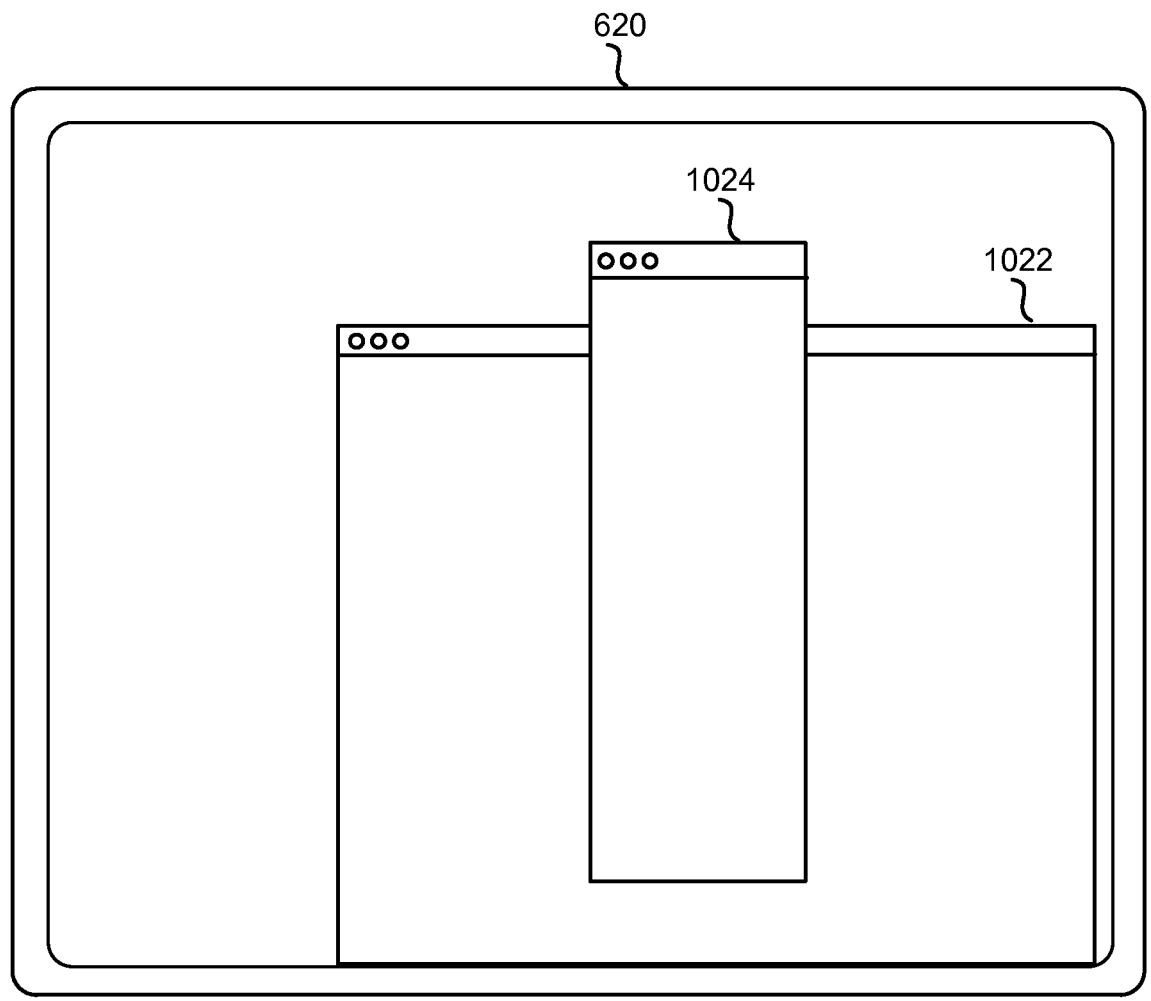
FIG. 10G illustrates an exemplary user interface for displaying multiple windows in a specified region of a display in accordance with some embodiments.

In some embodiments, the electronic device receives a second window-movement request associated with the second window. In accordance with a determination that the second window-movement request meets a pull-out criterion, the electronic device resizes the first window 1022 to the first size and displays the second window 1024 overlaid on top of the first window 1022 in response to receiving the second window-movement request (as shown, for example, in FIG. 10G). In some embodiments, the electronic device further provides an option to resize the first window 1022 and display the second window 1024 in the region of the display 620 after pulling the second window 1024 out of the arrangement. For example, in response to receiving movement of the second window 1024 back to an area of the display 620 that it previously occupied, the electronic device resizes the first window 1022 and places the second window 1024 back into the arrangement (e.g., reverting to the arrangement shown in FIG. 10C).

Figure 10H:
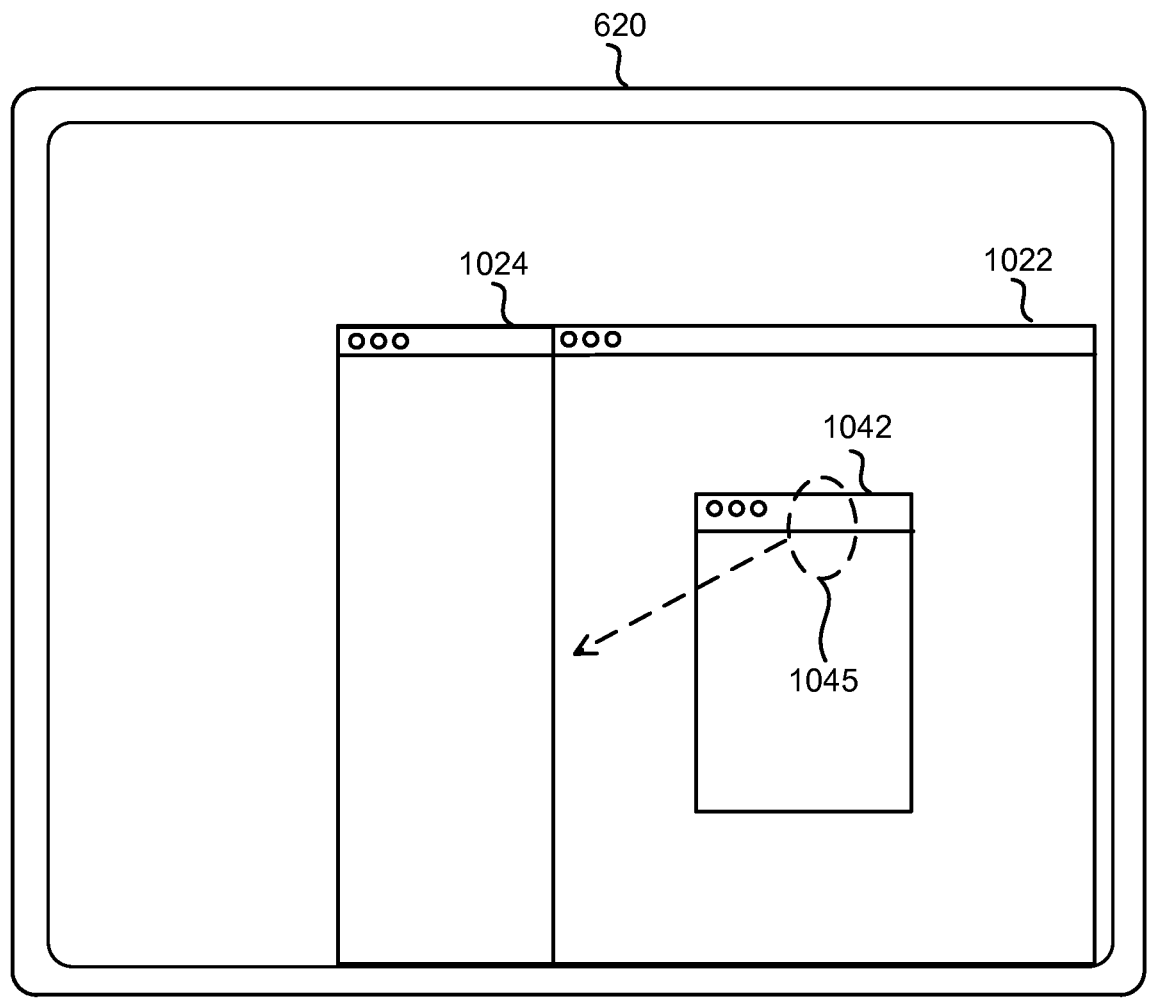
FIG. 10H illustrates an exemplary user interface for displaying multiple windows in a specified region of a display in accordance with some embodiments.
Figure 10I:
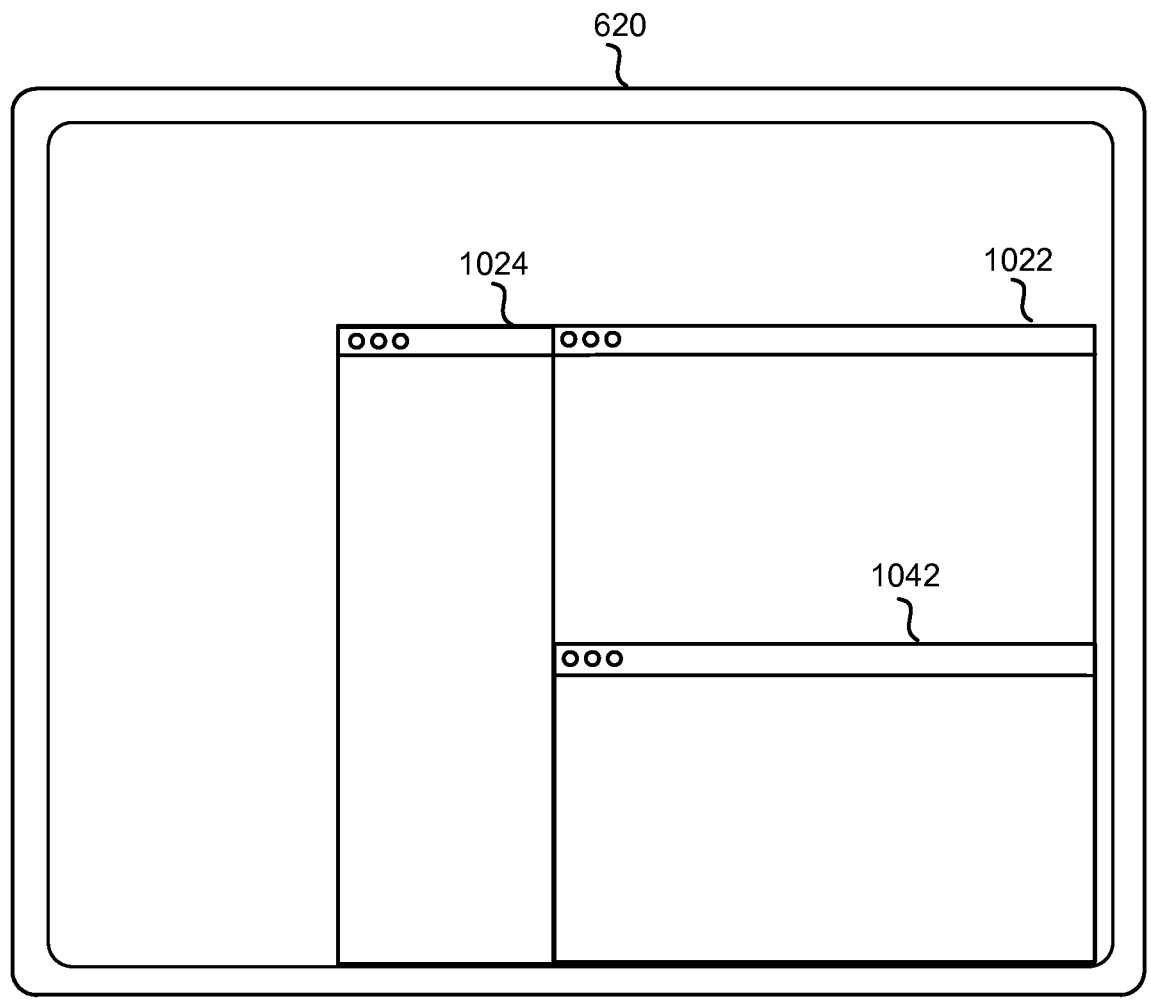
FIG. 10I illustrates an exemplary user interface for displaying multiple windows in a specified region of a display in accordance with some embodiments.

In some embodiments, as shown in FIG. 10H, the electronic device also displays a third window 1042 concurrently with the first window 1022 and the second window 1024 (e.g., overlaid on top of the first window 1022 or the second window 1024). While the third window is displayed, the electronic device receives a second window-movement request that is associated with the third window 1042. For example, the electronic device detects a drag-and-drop input 1045 whose beginning corresponds to a location within the third window 1042. In accordance with a determination that the second window-movement request meets a second window-movement criterion, the electronic device resizes the first window 1022 or the second window 1024 (or both) and displays the third window 1042 in the region of the display in response to receiving the second window-movement request. For example, as shown in FIG. 10I, the electronic device displays the third window adjacent to the first window 1022 and/or the second window 1024 without overlapping the first window 1022 or the second window 1024, thereby forming a second arrangement of the first window 1022, the second window 1024, and the third window 1042.

In some embodiments, in accordance with a determination that the second window-movement request meets a second window-resizing criterion, the electronic device determines, based on a location to which the third window was moved, whether to resize the first window 1022 and whether to resize the second window 1024 in response to receiving the second window-movement request. Furthermore, in some embodiments, the electronic device determines whether to divide the region of the display in thirds or in two quarters and one half responsive to receiving the second window-movement request. The determination is performed based on a dimension of the region of the display in some embodiments. For example, if the region is a widescreen region (e.g., a region with a 16:9 aspect ratio or higher), the electronic device divides the region into thirds. If the region is a non-widescreen region (e.g., a region with a 4:3 aspect ratio or lower), the electronic device divides the region in half and subdivides one of the halves in half. Alternatively, in some embodiments, the determination whether to divide the region in third or in two quarters and one half is performed based on how many windows are being displayed by the electronic device.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 500 and 700) are also applicable in an analogous manner to method 900 described above with respect to FIG. 9. For example, the windows and transport controls described above with reference to method 900 optionally have one or more of the characteristics of the windows and transport controls described herein with reference to other methods described herein (e.g., methods 500 and 700).

Figure 11:
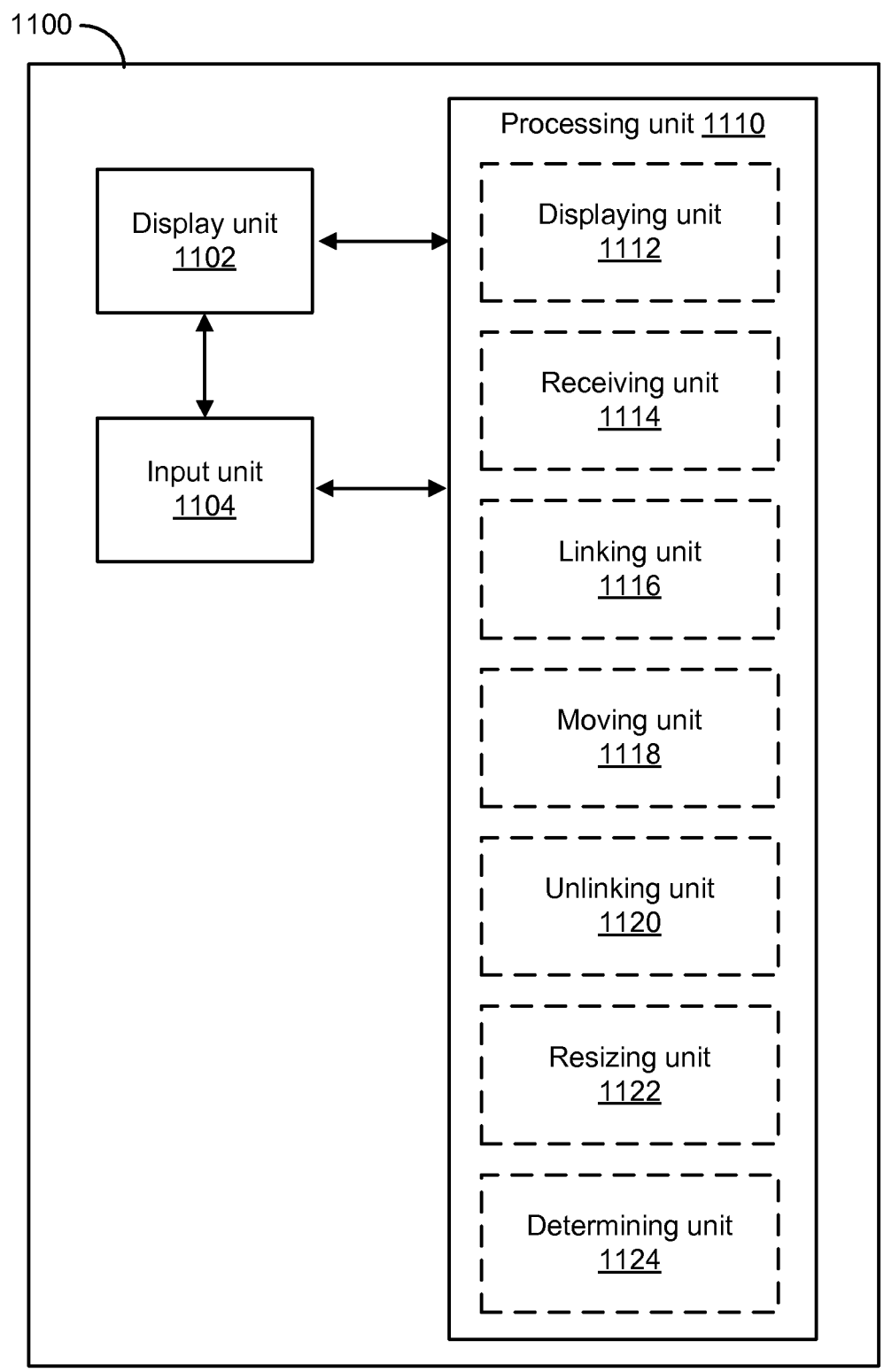
FIG. 11 is a functional block diagram of an electronic device in accordance with some embodiments.

The operations described with respect to FIG. 5 are optionally implemented by components depicted in FIG. 11. In accordance with some embodiments, FIG. 11 shows a functional block diagram of an electronic device 1100 configured in accordance with the principles of various described embodiments. The functional blocks of the device are, optionally, implemented by hardware, software, or a combination of hardware and software to carry out the principles of various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 adapted to display a user interface including windows associated with an application, an input unit 1104 adapted to receive user inputs, and a processing unit 1110 coupled to the display unit 1102 and the input unit 1104. In some embodiments, the processing unit 1110 includes a displaying unit 1112, a receiving unit 1114, a linking unit 1116, a moving unit 1118, an unlinking unit 1120, a resizing unit 1122, and a determining unit 1124.

The processing unit 1110 is configured to display (e.g., with the displaying unit 1112), a first window generated by a first application concurrently with a second window generated by a second application. The processing unit 1110 is also configured to receive (e.g., with the receiving unit 1114), a first window-movement request associated with the second window. Responsive to receiving the first window-movement request, the processing unit 1110 is configured to display (e.g., with the displaying unit 1112) the second window adjoining the first window and, in accordance with a determination that a window linking criterion has been met, link (e.g., with the linking unit 1116) the first window and the second window. The linking includes establishing a spatial relationship between the first window and the second window. While the first window is linked to the second window, the processing unit 1110 is configured to receive (e.g., with the receiving unit 1114) a second window-movement request associated with the first window. Responsive to receiving the second window-movement request, the processing unit 1110 is configured to move (e.g., with the moving unit 1118) the first window and the second window in accordance with the second window-movement request such that the spatial relationship is maintained. After moving the first window and the second window while maintaining the spatial relationship, the processing unit 1110 is configured to receive (e.g., with the receiving unit 1114) a third window-movement request. Responsive to receiving the third window-movement request, in accordance with a determination that the third window-movement request is associated with the first window, the processing unit 1110 is configured to move (e.g., with the moving unit 1118) the first window and the second window in accordance with the third window-movement request such that the spatial relationship is maintained. In accordance with a determination that the third window-movement request is associated with the second window, the processing unit 1110 is configured to unlink (e.g., with the unlinking unit 1120) the first window and the second window, and move (e.g., with the moving unit 1118) the second window away from the first window such that the spatial relationship changes.

In some embodiments, the processing unit 1110 is configured to, in accordance with a determination that the window linking criterion has not been met, not link the first window and the second window, such that the spatial relationship is not established, and the first window and the second window move independently of each other.

In some embodiments, responsive to moving the first window and the second window in accordance with the second window-movement request causing an edge of the second window to reach an edge of the display, the processing unit 1110 is configured to automatically resize (e.g., with the resizing unit 1122) the second window by reducing an area of the second window, and redisplaying (e.g., with the displaying unit 1112) contents of the second window in the reduced area while maintaining the spatial relationship.

In some embodiments, responsive to moving the first window and the second window in accordance with the second window-movement request causing the second window to appear to move past an edge of the display, such that the second window is no longer displayed on the display, the processing unit 1110 is configured to receive (e.g., with the receiving unit 1114) a request to redisplay the second window, and in response to receiving the request, display (e.g., with the displaying unit 1112) the second window within the display.

In some embodiments, the processing unit 1110 is also configured to display (e.g., with the displaying unit 1112) a third window concurrently with the first window and the second window. The processing unit 1110 is also configured to receive (e.g., with the receiving unit 1114), a fourth window-movement request associated with the third window. Responsive to receiving the fourth window-movement request, the processing unit 1110 is configured to display (e.g., with the displaying unit 1112) the third window adjoining either the first window or the second window. In accordance with a determination that a second window linking criterion has been met, the processing unit 1110 is configured to link (e.g., with the linking unit 1116) the third window to either the first window or the second window, respectively, wherein the linking includes establishing a second spatial relationship between the third window and either the first window or the second window. While the third window is linked to either the first window or the second window, the processing unit 1110 is configured to receive (e.g., with the receiving unit 1114) a fifth window-movement request associated with the first window. Responsive to receiving the fifth window-movement request, the processing unit 1110 is configured to move (e.g., with the moving unit 1118) the first window and the second window and the third window in accordance with the fifth window-movement request such that the spatial relationship is maintained and the second spatial relationship is maintained.

In some embodiments, the processing unit 1110 is also configured to receive (e.g., with the receiving unit 1114) a sixth window-movement request associated with the third window. Responsive to receiving the sixth window-movement request, the processing unit 1110 is configured to unlink (e.g., with the unlinking unit 1120) the third window from either the first window or the second window and move (e.g., with the moving unit 1118) the third window away from either the first window or the second window such that the second spatial relationship changes while the first window and the second window remain linked.

In some embodiments, the processing unit 1110 is also configured to display (e.g., with the displaying unit 1112) a set of one or more transport controls associated with the first window, wherein activation of a transport control within the set affects both the first window and the second window.

In some embodiments, the transport control is one element of a group containing a maximize control, a minimize control, a resize control, and a close control.

In some embodiments, the transport control is a maximize control and the processing unit 1110 is configured to receive (e.g., with the receiving unit 1114) activation of the transport control. Responsive to receiving the activation of the transport control, the processing unit 1110 is configured to display (e.g., with the displaying unit 1112) the first window and the second window fully covering a portion of the display that is designated for display of application windows.

In some embodiments, the processing unit 1110 is also configured to receive (e.g., with the receiving unit 1112) a border-movement request associated with a border between the first window and the second window. Responsive to receiving the border-movement request, the processing unit 1110 is configured to move (e.g., with the moving unit 1118) the border between the first window and the second window such that the first window and the second window are resized.

In some embodiments, the processing unit 1110 is also configured to receive (e.g., with the receiving unit 1110) a second activation of the transport control. Responsive to receiving the second activation of the transport control, the processing unit 1110 is configured to display (e.g., with the displaying unit 1112) the first window such that the first window fully covers the portion of the display that is designated for display of application windows.

In some embodiments, the processing unit 1110 is configured to display (e.g., with the displaying unit 1112) the first window and one or more other windows linked to the first window at a same value of a z-axis, such that setting a z-axis value of the first window to a particular value causes a z-axis value of the one or more other windows to be set to the particular value.

In some embodiments, the processing unit 1110 is configured to move the first window and the second window in accordance with the second window-movement request by displaying (e.g., with the displaying unit 1112) a drop shadow whose shape is based on a union of the first window and the second window.

In some embodiments, the processing unit 1110 is also configured to, responsive to receiving the first window-movement request, determine (e.g., with the determining unit 1124) whether the first window-movement request exceeds a threshold. Responsive to determining that the first window-movement request exceeds the threshold, the processing unit 1110 is configured to display (e.g., with the displaying unit 1112) the second window as the second window passes the first window. Responsive to determining that the first window-movement request does not exceed the threshold, the processing unit 1110 is configured to determine (e.g., with the determining unit 1124) whether the window linking criterion has been met.

Figure 12:
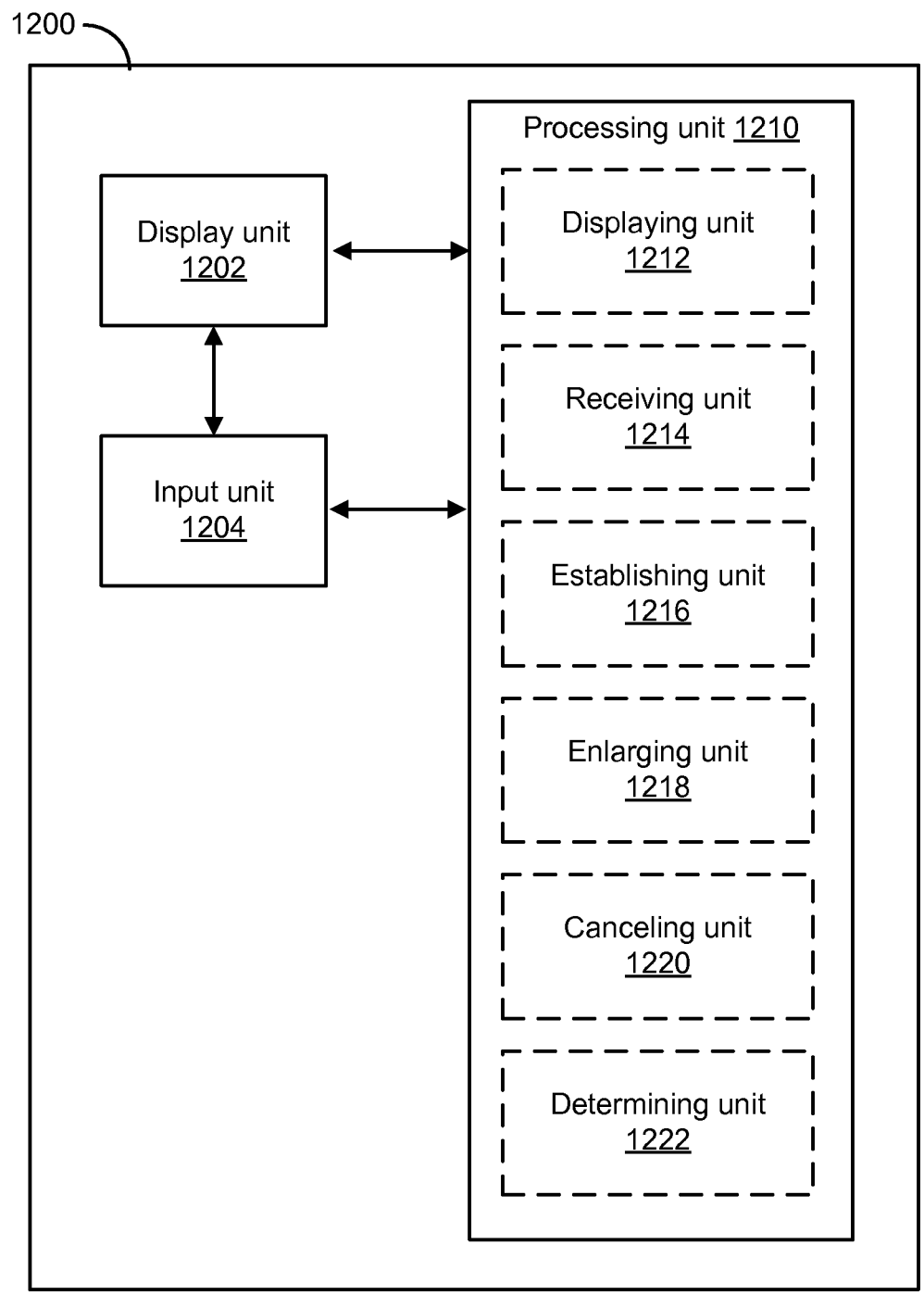
FIG. 12 is a functional block diagram of an electronic device in accordance with some embodiments.

The operations described with respect to FIG. 7 are optionally implemented by components depicted in FIG. 12. In accordance with some embodiments, FIG. 12 shows a functional block diagram of an electronic device 1200 configured in accordance with the principles of various described embodiments. The functional blocks of the device are, optionally, implemented by hardware, software, or a combination of hardware and software to carry out the principles of various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 adapted to display a user interface including windows associated with an application, an input unit 1204 adapted to receive user inputs, and a processing unit 1210 coupled to the display unit 1202 and the input unit 1204. In some embodiments, the processing unit 1210 includes a displaying unit 1212, a receiving unit 1214, an establishing unit 1216, an enlarging unit 1218, a canceling unit 1220, and a determining unit 1222.

The processing unit 1210 is configured to display (e.g., with the displaying unit 1212) a first window generated by a first application concurrently with a second window generated by a second application. The processing unit 1210 is also configured to receive (e.g., with the receiving unit 1214) a window-movement request that is associated with the second window. Responsive to receiving the window-movement request, the processing unit 1210 is configured to display (e.g., with the displaying unit 1212) the second window proximate to the first window and establish (e.g., with the establishing unit 1216) a spatial relationship between the first window and the second window. While the spatial relationship is established, the processing unit 1210 is configured to receive (e.g., with the receiving unit 1214) a window-enlargement request. Responsive to receiving the window-enlargement request, in accordance with a determination that the window-enlargement request is associated with the first window, the processing unit 1210 is configured to enlarge (e.g., with the enlarging unit 1218) the first window such that the spatial relationship is maintained and a size of the second window is maintained.

In some embodiments, the processing unit 1210 is configured to establish the spatial relationship by establishing (e.g., with the establishing unit 1216) a boundary between the first window and the second window.

In some embodiments, the first window and one or more other windows with which the first window has an established spatial relationship move independently of each other.

In some embodiments, the processing unit 1210 is also configured to, responsive to receiving the window-enlargement request, in accordance with a determination that the window-enlargement request is associated with the second window, enlarge (e.g., with the enlarging unit 1218) the second window such that the spatial relationship is maintained and a size of the first window is maintained.

In some embodiments, the processing unit 1210 is also configured to display (e.g., with the displaying unit 1212) a third window concurrently with the first window and the second window. The processing unit 1210 is also configured to receive (e.g., with the receiving unit 1214) a second window-movement request that is associated with the third window. Responsive to receiving the second window-movement request, the processing unit 1210 is configured to display (e.g., with the displaying unit 1212) the third window proximate to either the first window or the second window and establish (e.g., with the establishing unit 1216) a second spatial relationship between the third window and either the first window or the second window. While the second spatial relationship is established, the processing unit 1210 is configured to receive (e.g., with the receiving unit 1214) a second window-enlargement request. Responsive to receiving the second window-enlargement request, in accordance with a determination that the second window-enlargement request is associated with the third window, the processing unit 1210 is configured to enlarge (e.g., with the enlarging unit 1218) the third window such that the second spatial relationship is maintained, the spatial relationship is maintained, a size of the first window is maintained, and the size of the second window is maintained.

In some embodiments, the processing unit 1210 is configured to receive the window-enlargement request by receiving a first portion of the window-enlargement request and is configured to enlarge the first window by displaying (e.g., with the displaying unit 1212) a preview of the enlargement of the first window that represents an appearance of the first window if enlargement of the first window is confirmed. The processing unit 1210 is also configured to receive (e.g., with the receiving unit 1214) a second portion of the window enlargement request. Responsive to receiving the second portion of the window-enlargement request, in accordance with a determination that the second portion of the window-enlargement request is a confirmation input, the processing unit 1210 is configured to enlarge (e.g., with the enlarging unit 1218) the first window such that the spatial relationship is maintained and the size of the second window is maintained. In accordance with a determination that the second portion of the window-enlargement request is a cancellation input, the processing unit 1210 is configured to cancel (e.g., with the cancelling unit 1220) the enlargement.

In some embodiments, the processing unit 1210 is configured to display (e.g., with the displaying unit 1212) the first window and one or more other windows with which the first window has an established spatial relationship at a same value of a Z-axis, such that setting a Z-axis value of the first window to a particular value causes a Z-axis value of the one or more other windows to be set to the particular value.

In some embodiments, responsive to receiving the window-movement request, the processing unit 1210 is also configured to determine (e.g., with the determining unit 1222) whether the window-movement request exceeds a threshold. Responsive to determining that the window-movement request exceeds the threshold, the processing unit 1210 is configured to display (e.g., with the displaying unit 1212) the second window as the second window passes the first window.

Figure 13:
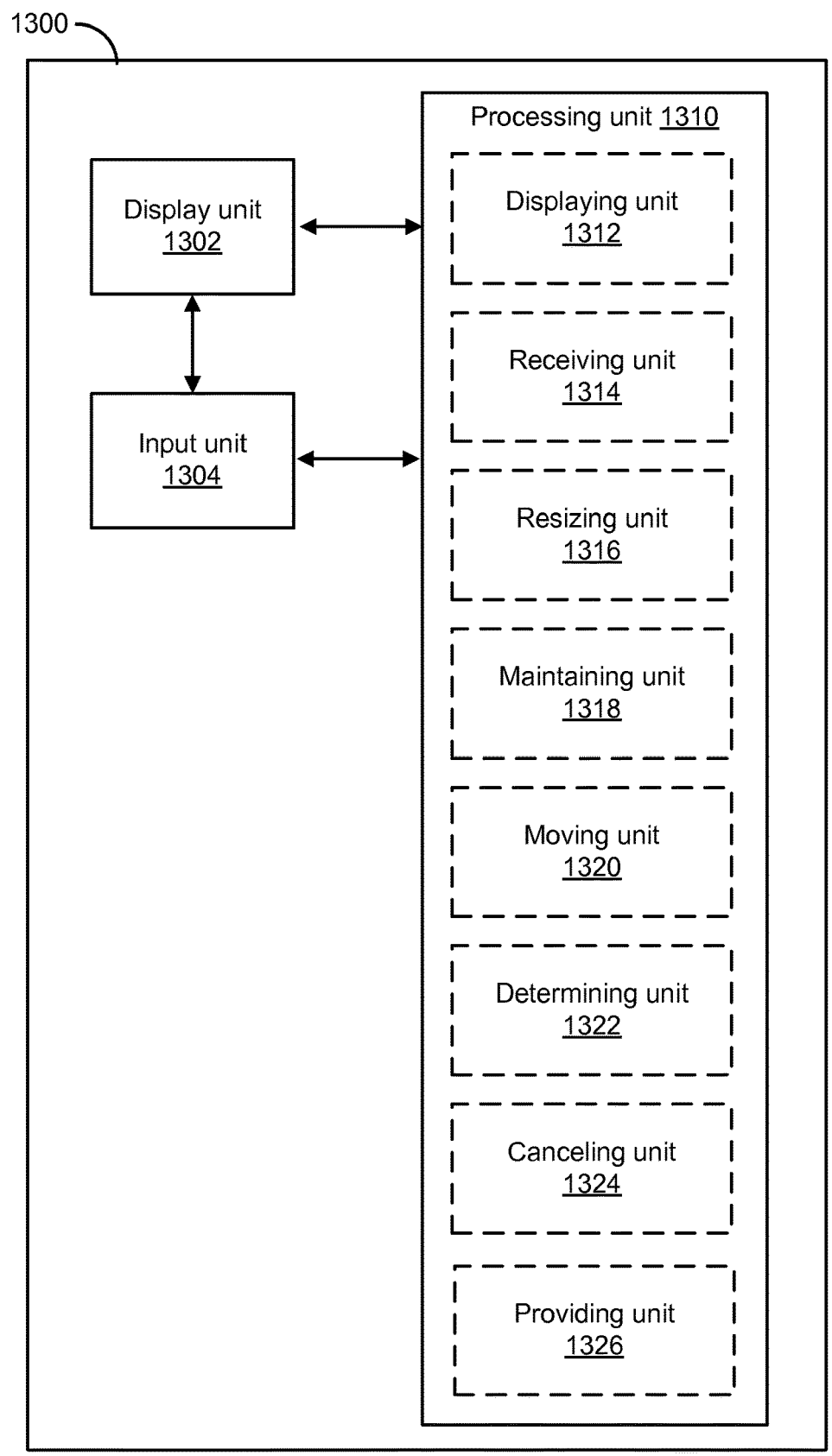
FIG. 13 is a functional block diagram of an electronic device in accordance with some embodiments

The operations described with respect to FIG. 9 are optionally implemented by components depicted in FIG. 13. In accordance with some embodiments, FIG. 13 shows a functional block diagram of an electronic device 1300 configured in accordance with the principles of various described embodiments. The functional blocks of the device are, optionally, implemented by hardware, software, or a combination of hardware and software to carry out the principles of various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 adapted to display a user interface including windows associated with an application, an input unit 1304 adapted to receive user inputs, and a processing unit 1310 coupled to the display unit 1302 and the input unit 1304. In some embodiments, the processing unit 1310 includes a displaying unit 1312, a receiving unit 1314, resizing unit 1316, a maintaining unit 1318, a moving unit 1320, a determining unit 1322, a canceling unit 1324, and a providing unit 1326.

The processing unit 1310 is configured to display (e.g., with the displaying unit 1312) a first window, generated by a first application, at a first size such that the first window occupies a region of a display. While displaying the first window at the first size, the processing unit 1310 is configured to display (e.g., with the displaying unit 1312) a second window, generated by a second application, concurrently with the first window and receive (e.g., with the receiving unit 1314) a window-movement request associated with the second window. Responsive to receiving the window-movement request, in accordance with a determination that the window-movement request meets a window-resizing criterion, the processing unit 1310 is configured to resize (e.g., with the resizing unit 1316) the first window and display (e.g., with the displaying unit 1312) the second window in the region of the display.

In some embodiments, the processing unit 1310 is also configured to, in accordance with a determination that the window-movement request does not meet the window-resizing criterion, maintain (e.g., with the maintaining unit 1318) the first window at the first size and move (e.g., with the moving unit 1320) the second window.

In some embodiments, the region of the display is an entirety of the display, such that the processing unit 1310 resizes the first window and displays the second window in the region of the display by displaying (e.g., with the displaying unit 1312) the first window and the second window in a full-screen arrangement.

In some embodiments, the processing unit 1310 is also configured to display (e.g., with the displaying unit 1312) a third window concurrently with the first window and the second window. The processing unit 1310 is also configured to receive (e.g., with the receiving unit 1314) a second window-movement request associated with the third window.

In some embodiments, the processing unit 1310 is also configured to, responsive to receiving the second window-movement request and in accordance with a determination that the second window-movement request meets a second window-resizing criterion, resize (e.g., with the resizing unit 1316) the first window or the second window and display (e.g., with the displaying unit 1312) the third window in the region of the display.

In some embodiments, the processing unit 1310 is also configured to, responsive to receiving the second window-movement request and in accordance with a determination that the second window-movement request meets a second window-resizing criterion, determine (e.g., with the determining unit 1322), based on a location to which the third window was moved, whether to resize the first window and whether to resize the second window.

In some embodiments, the processing unit 1310 is also configured to, responsive to receiving the second window-movement request, in accordance with a determination that the second window-movement request meets a second window-resizing criterion, determine (e.g., with the determining unit 1322) whether to divide the region of the display in thirds or in two quarters and one half.

In some embodiments, the processing unit 1310 determines whether to divide the region of the display in thirds or in two quarters and one half based on a dimension of the region of the display.

In some embodiments, the processing unit 1310 determines whether to divide the region of the display in thirds or in two quarters and one half based on how many windows are being displayed.

In some embodiments, the window-movement request meets the window-resizing criterion when the second window is dragged to an edge of the region of the display and dropped.

In some embodiments, the processing unit 1310 receives the window-movement request by receiving (e.g., with the receiving unit 1314) a first portion of the window-movement request and resizes the first window and displays the second window in the region of the display by displaying (e.g., with the displaying unit 1312) a preview of the movement of the second window that represents an appearance of the second window if movement of the second window is confirmed. The processing unit 1310 is also configured to receive (e.g., with the receiving unit 1314) a second portion of the window-movement request. Responsive to receiving the second portion of the window-movement request, the processing unit 1310 is configured to, in accordance with a determination that the second portion of the window-movement request is a confirmation input, resize (e.g., with the resizing unit 1316) the first window and displaying the second window in the region of the display. In accordance with a determination that the second portion of the window-movement request is a cancellation input, the processing unit 1310 is configured to cancel (e.g., with the cancelling unit 1324) the movement.

In some embodiments, the processing unit 1310 is configured to display the second window in the region of the display by resizing (e.g., with the resizing unit 1316) the second window.

In some embodiments, the processing unit 1310 is further configured to receive (e.g., with the receiving unit 1314) a second window-movement request associated with the second window. Responsive to receiving the second window-movement request, in accordance with a determination that the second window-movement request meets a pull-out criterion, the processing unit 1310 is configured to resize (e.g., with the resizing unit 1316) the first window to the first size and display (e.g., with the displaying unit 1312) the second window overlaid on top of the first window.

In some embodiments, the processing unit 1310 is also configured to provide (e.g., with the providing unit 1326) an option to resize the first window and display the second window in the region of the display.

In some embodiments, the processing unit 1310 is also configured to receive (e.g., with the receiving unit 1314) a boundary-movement request associated with a boundary between the first window and the second window. Responsive to receiving the boundary-movement request, the processing unit 1310 is configured to move (e.g., with the moving unit 1320) the boundary such that the first window and the second window are resized.

In some embodiments, the processing unit 1310 is configured to resize the first window and displaying the second window in the region of the display by determining (e.g., with the determining unit 1322), depending on to which edge of the region of the display the second window is dragged, whether to divide the region of the display vertically or horizontally.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
concurrently displaying a linked arrangement including a first window, generated by a first application, at a first size and a second window, generated by a second application, at a second size, wherein the linked arrangement of the first window and the second window occupies a region of a display;
while displaying the linked arrangement of the first window and the second window, displaying a third window, generated by a third application, at a third size, wherein the third window is separate from the linked arrangement of the first window and the second window; and
receiving a window-movement request associated with the third window;
responsive to receiving the window-movement request, in accordance with a determination that the window-movement request meets a window-resizing criterion:
reducing at least one of the first size of the first window or the second size of the second window;
increasing the third size of the third window; and
modifying the linked arrangement to include the first, second, and third windows, wherein the linked arrangement of the first, second, and third windows occupies the region of the display;
after modifying the linked arrangement to include the first, second, and third windows, receiving a subsequent window-movement request associated with the linked arrangement; and
responsive to receiving the subsequent window-movement request, moving the linked arrangement including the first, second, and third windows based on a direction and a magnitude of the subsequent window-movement request.

2. The method of claim 1, further comprising:
in accordance with a determination that the window-movement request does not meet the window-resizing criterion:
maintaining the first window at the first size and the second window at the second size; and
moving the third window according to the window-movement request.

3. The method of claim 1, further comprising:
determining, based on a location to which the third window was moved according to the window-movement request, whether to resize the first window and whether to resize the second window.

4. The method of claim 1, further comprising:
determining, based on the window-movement request, whether to divide the region of the display in thirds or in two quarters and one half.

5. The method of claim 4, wherein the determination whether to divide the region of the display in thirds or in two quarters and one half is performed based on a dimension of the region of the display.

6. The method of claim 4, wherein the determination whether to divide the region of the display in thirds or in two quarters and one half is performed based on how many windows are being displayed.

7. The method of claim 1, wherein the window-movement request meets the window-resizing criterion when the third window is dragged to an edge of the region of the display and dropped.

8. The method of claim 1, further comprising:
displaying an option to resize the first window and display the second window in the region of the display.

9. The method of claim 1, further comprising:
receiving a boundary-movement request associated with a boundary between the first window and the second window; and
responsive to receiving the boundary-movement request, moving the boundary such that the first window and the second window are resized.

10. The method of claim 1, wherein reducing at least one of the first size of the first window or the second size of the second window comprises determining, depending on to which edge of the region of the display the third window is dragged, whether to divide the region of the display vertically or horizontally.

11. The method of claim 1, wherein the third window is overlaid on the linked arrangement of the first window and the second window prior to receiving the window-movement request.

12. A non-transitory computer readable storage medium storing executable code, the code when executed causing a processor to perform steps comprising:
concurrently displaying a linked arrangement including a first window, generated by a first application, at a first size and a second window, generated by a second application at a second size, wherein the linked arrangement of the first window and the second window occupies a region of a display;
while displaying the linked arrangement of the first window and the second window, displaying a third window, generated by a third application, at a third size, wherein the third window is separate from the linked arrangement of the first window and the second window;
receiving a window-movement request associated with the third window;
responsive to receiving the window-movement request, in accordance with a determination that the window-movement request meets a window-resizing criterion:
reducing at least one of the first size of the first window or the second size of the second window;
increasing the third size of the third window; and
modifying the linked arrangement to include the first, second, and third windows, wherein the linked arrangement of the first, second, and third windows occupies the region of the display;
after modifying the linked arrangement to include the first, second, and third windows, receiving a subsequent window-movement request associated with the linked arrangement; and
responsive to receiving the subsequent window-movement request, moving the linked arrangement including the first, second, and third windows based on a direction and a magnitude of the subsequent window-movement request.

13. The non-transitory computer readable storage medium of claim 12, further comprising:
in accordance with a determination that the window-movement request does not meet the window-resizing criterion:
maintaining the first window at the first size and the second window at the second size; and
moving the third window according to the window-movement request.

14. The non-transitory computer readable storage medium of claim 12, wherein the window-movement request meets the window-resizing criterion when the third window is dragged to an edge of the region of the display and dropped.

15. A system comprising:
an input device;
a display;
one or more processors; and
a non-transitory computer readable storage medium including instructions, which, when executed by the one or more processors, cause the system to:
concurrently display, on the display, a linked arrangement including a first window, generated by a first application, at a first size and a second window, generated by a second application, at a second size, wherein the linked arrangement of the first window and the second window occupies a region of the display;
while displaying the linked arrangement of the first window and the second window, display, on the display, a third window, generated by a third application, at a third size, wherein the third window is separate from the linked arrangement of the first window and the second window; and
receive, with the input device, a window-movement request associated with the third window;
responsive to receiving the window-movement request, in accordance with a determination that the window-movement request meets a window-resizing criterion:
reduce at least one of the first size of the first window or the second size of the second window;
increase the third size of the third window; and
modify the linked arrangement to include the first, second, and third windows, wherein the linked arrangement of the first, second, and third windows occupies the region of the display;

after modifying the linked arrangement to include the first, second, and third windows, receive a subsequent window-movement request associated with the linked arrangement; and responsive to receiving the subsequent window-movement request, move the linked arrangement including the first, second, and third windows based on a direction and a magnitude of the subsequent window-movement request.

16. The system of claim 15, wherein the instructions further cause the system to:
in accordance with a determination that the window-movement request does not meet the window-resizing criterion:
maintain the first window at the first size and the second window at the second size; and
move the third window according to the window-movement request.

17. The system of claim 15, wherein the instructions further cause the system to:
determine, based on the window-movement request, whether to divide the region of the display in thirds or in two quarters and one half.

18. The system of claim 17, wherein the determination whether to divide the region of the display in thirds or in two quarters and one half is performed based on a dimension of the region of the display.

19. The system of claim 17, wherein the determination whether to divide the region of the display in thirds or in two quarters and one half is performed based on how many windows are being displayed.

20. The system of claim 15, wherein the window-movement request meets the window-resizing criterion when the third window is dragged to an edge of the region of the display and dropped.

* * * * *